US012699521B2

(12) United States Patent
Wesley et al.

(10) Patent No.: US 12,699,521 B2
(45) Date of Patent: Aug. 4, 2026

(54) CORE GROUP MEMORY PROCESSING CHIP DESIGN

(71) Applicant: MemryX Incorporated, Ann Arbor, MI (US)

(72) Inventors: Timothy Wesley, Ann Arbor, MI (US); Jacob Botimer, Ann Arbor, MI (US); Mohammed Zidan, Ann Arbor, MI (US); Chester Liu, Ann Arbor, MI (US); Wei Lu, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 0 days.

(21) Appl. No.: 18/534,487

(22) Filed: Dec. 8, 2023

(65) Prior Publication Data

US 2024/0272821 A1      Aug. 15, 2024

Related U.S. Application Data

(63) Continuation-in-part of application No. 18/368,493, filed on Sep. 14, 2023, and a continuation-in-part of application No. 18/109,788, filed on Feb. 14, 2023, and a continuation-in-part of application No. 18/109,736, filed on Feb. 14, 2023, and a continuation-in-part of application No. 18/109,790, filed on Feb. 14, 2023.

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G06F 3/0656; G06F 3/0673; G06F 3/0613
See application file for complete search history.

(56) References Cited

U.S. PATENT DOCUMENTS

| | | | |
|---|---|---|---|
| 2019/0361620 A1* | 11/2019 | Sasamoto | G06F 3/0613 |
| 2022/0137869 A1* | 5/2022 | Kim | G06F 3/0679 |
| | | | 711/154 |
| 2023/0083282 A1* | 3/2023 | Petre | G06F 3/0679 |
| | | | 706/26 |
| 2023/0097344 A1* | 3/2023 | Greathouse | G06F 12/0607 |
| | | | 711/154 |

* cited by examiner

*Primary Examiner* — Masud K Khan

(57) ABSTRACT

A memory processing unit (MPU) includes processing regions and a first memory having memory regions configured in memory blocks. The processing regions are interleaved between the memory regions and include core groups including compute cores. One or more of the core groups of a respective one of the processing regions are coupled between adjacent ones of the memory blocks of adjacent ones of the memory regions. Components of the MPU and dataflow between adjacent compute cores in respective ones of the processing regions through one or more corresponding memory blocks of corresponding memory regions, are configured based on one or more of an impact of a number of parameters and a number of layers of one or more neural network models on memory balance, core utilization and memory reuse on bandwidth balance, design points, supported operations, target models, and supported memory organizations.

20 Claims, 63 Drawing Sheets

Output Feature Map 850
840
830
820
810

Output
Channels

Output Feature Map

Output
Channels

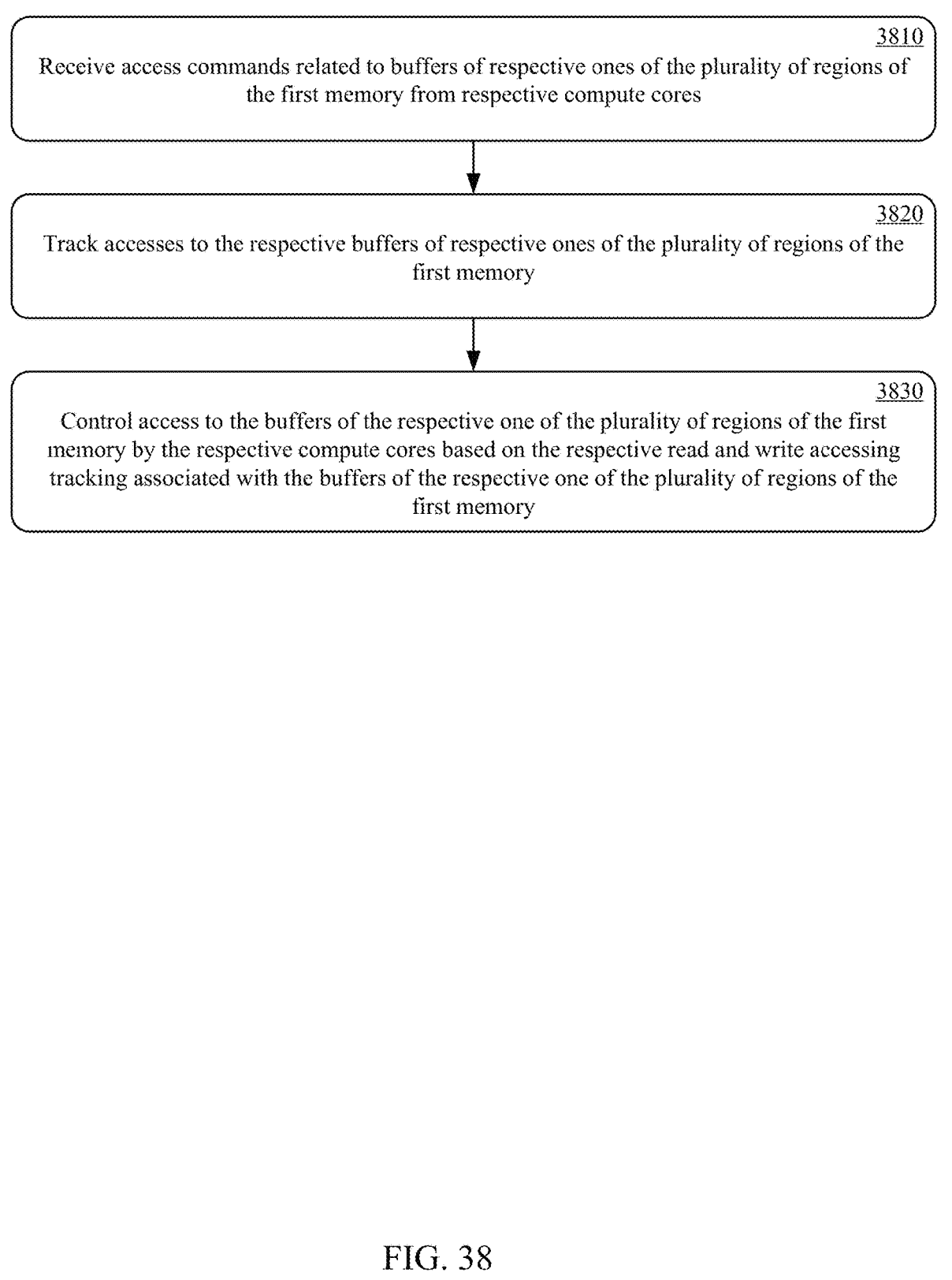

3810

Receive access commands related to buffers of respective ones of the plurality of regions of the first memory from respective compute cores

3820

Track accesses to the respective buffers of respective ones of the plurality of regions of the first memory

3830

Control access to the buffers of the respective one of the plurality of regions of the first memory by the respective compute cores based on the respective read and write accessing tracking associated with the buffers of the respective one of the plurality of regions of the first memory

FIG. 38

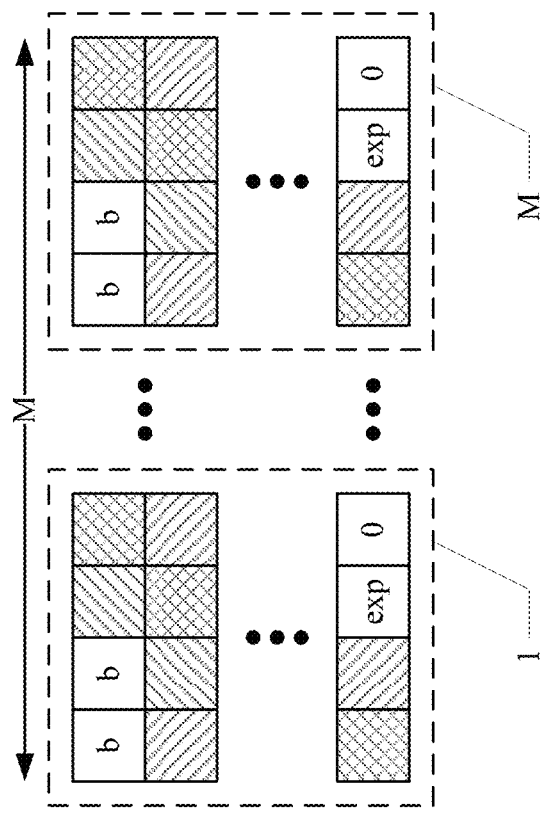
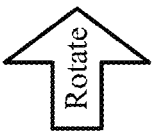
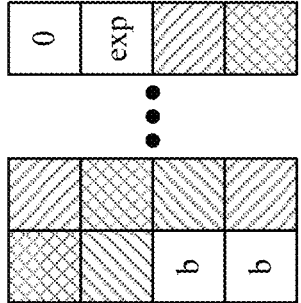
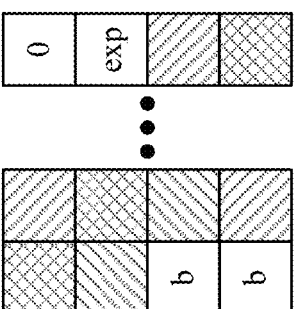
FIG. 51

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| | | | | | | | |
| | | | | | | | |
| | | | | | | | |
| | | | | | | | |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| | | | | | | | |
| | | | | | | | |
| | | | | | | | |
| | | | | | | | |

| 24 | 25 | 26 | 27 | 28 | 29 | 30 | 31 |
|---|---|---|---|---|---|---|---|
| 8 | 9 | 10 | 11 | 12 | 13 | 14 | 15 |
| 16 | 17 | 18 | 19 | 20 | 21 | 22 | 23 |

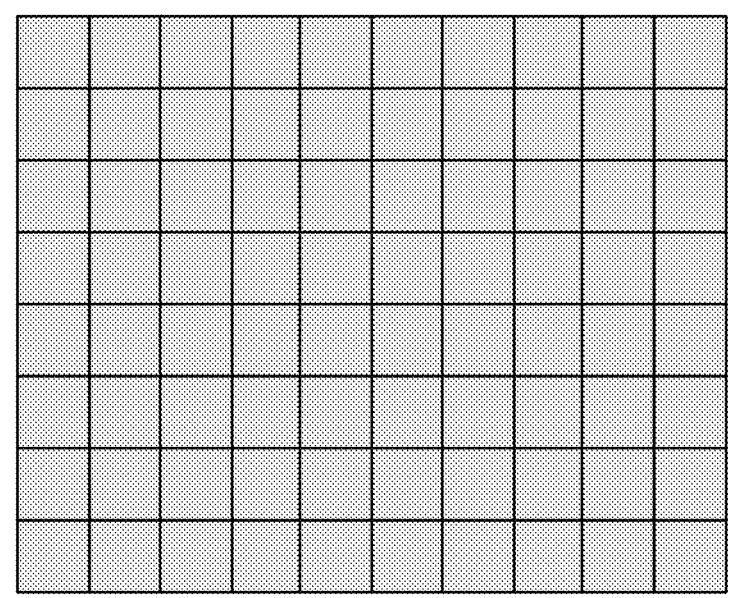
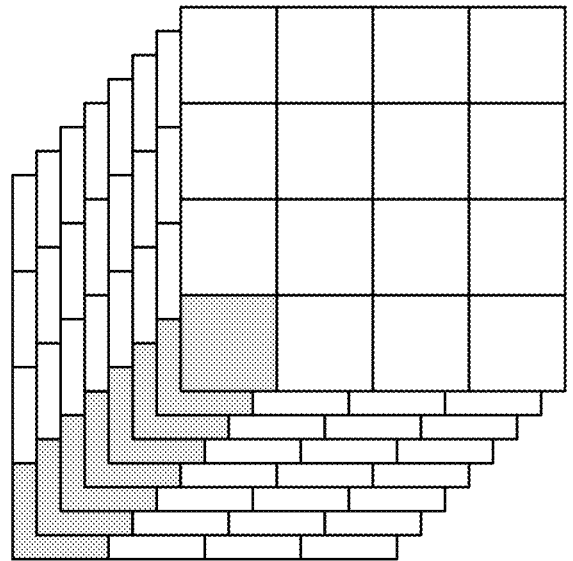
FIG. 54A

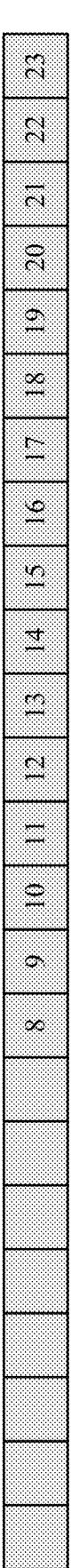
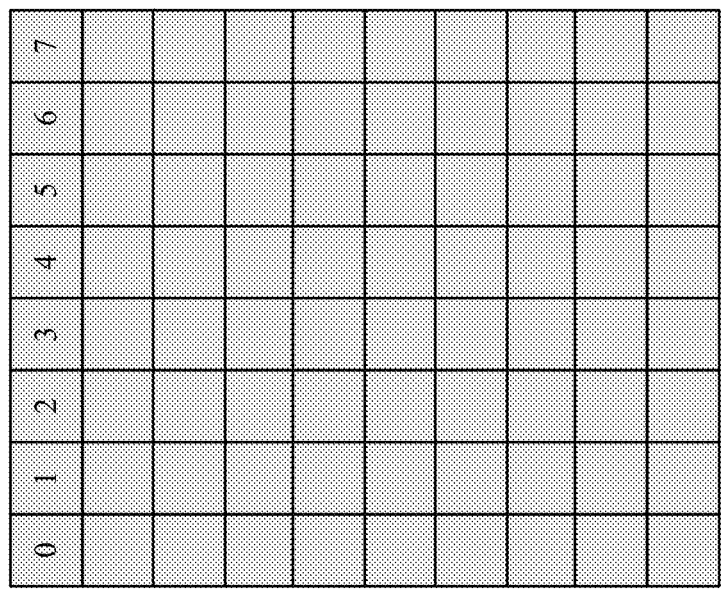
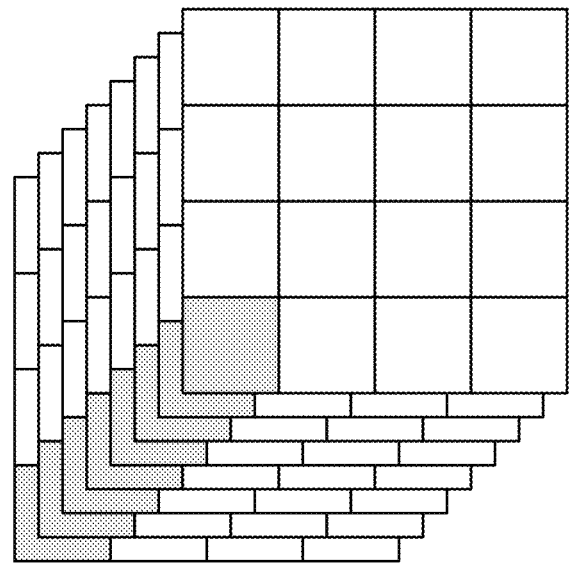
FIG. 54B

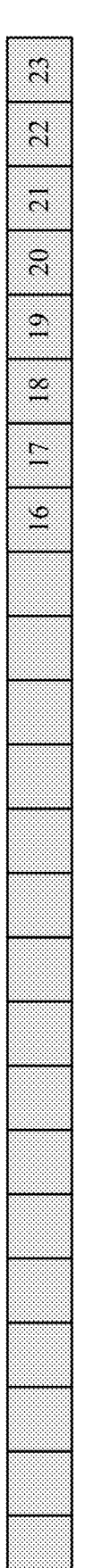
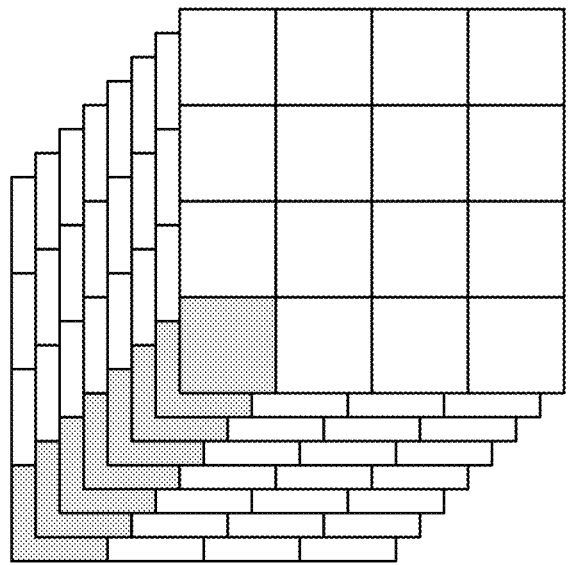
FIG. 54C

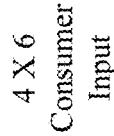
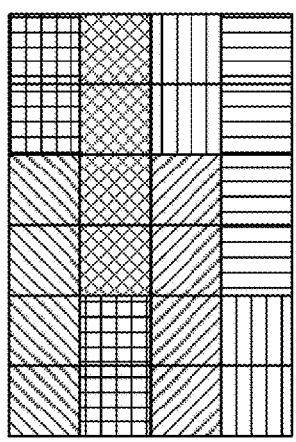
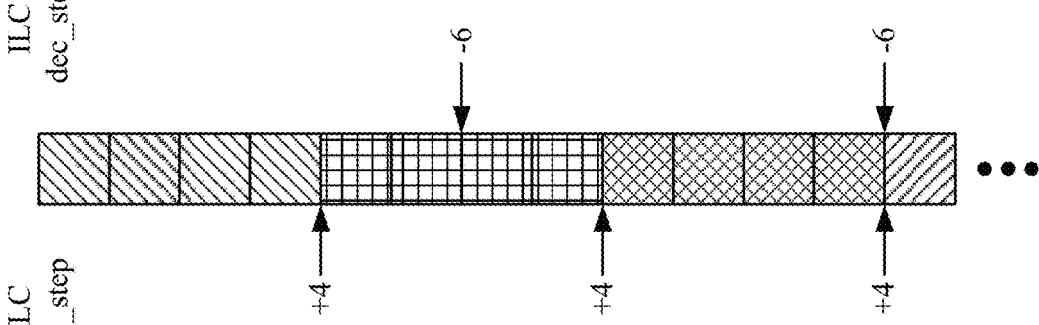
FIG. 55

6000

6000

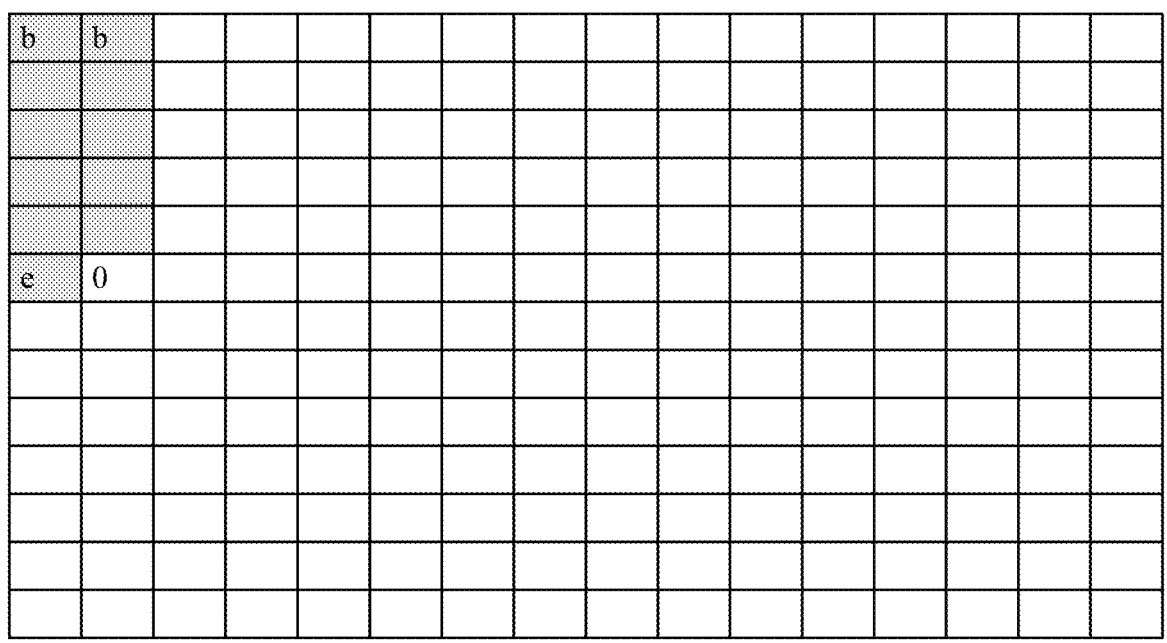
FIG. 64A
4-bit
FIG. 64B 4-bit

| b | b | b | b | b | b | | | | | | | | | |
|---|---|---|---|---|---|---|---|---|---|---|---|---|---|---|
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
| e | 0 | e | 0 | e | 0 |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |

FIG. 64C 4-bit

| b | b | b | b | b | b | b | b | b | b | b | b |   |   |   |
|---|---|---|---|---|---|---|---|---|---|---|---|---|---|---|
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
| e | 0 | e | 0 | e | 0 | e | 0 | e | 0 | e | 0 |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |

FIG. 64D

Figure 65:
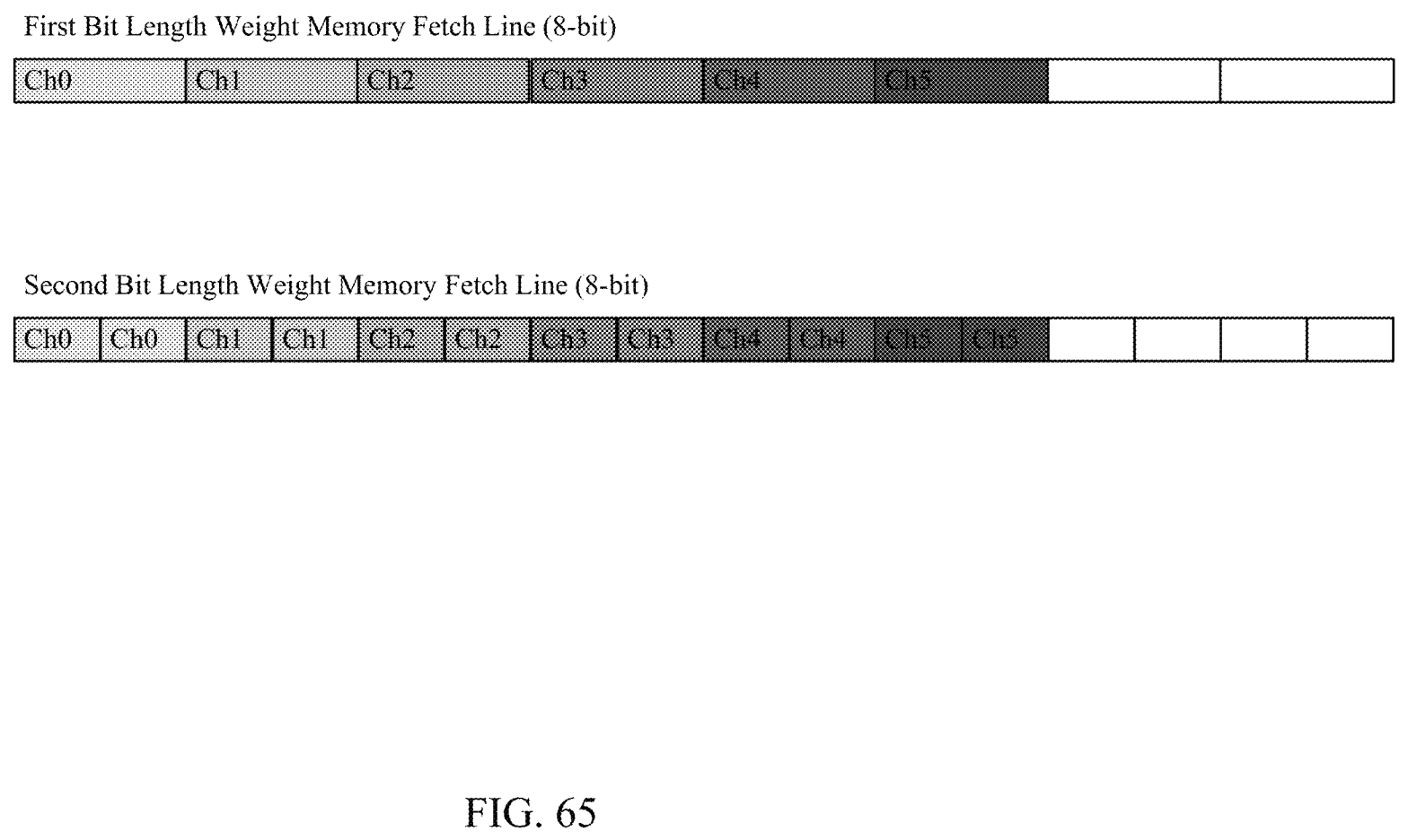

First Bit Length Weight Memory Fetch Line (8-bit)

| Ch0 | Ch1 | Ch2 | Ch3 | Ch4 | Ch5 | | |

Second Bit Length Weight Memory Fetch Line (8-bit)

| Ch0 | Ch0 | Ch1 | Ch2 | Ch3 | Ch4 | Ch5 | | | |

Considering the impact of the number of parameter and the number of layer for a number of different neural network models on memory balance

6620

Consider the impact of core utilization and memory reuse on bandwidth balance

6630

Consider the impact of design point

6640

Consider supported operations

6650

Consider target models

6660

Consider supported memory organizations

CORE GROUP MEMORY PROCESSING CHIP DESIGN

CROSS-REFERENCE TO RELATED APPLICATIONS

This application is a continuation in part of U.S. patent application Ser. No. 18/368,493 filed Sep. 14, 2023, U.S. patent application Ser. No. 18/109,736 filed Feb. 14, 2023, U.S. patent application Ser. No. 18/109,788 filed Feb. 14, 2023 and U.S. patent application Ser. No. 18/109,790 filed Feb. 14, 2023, and also claims the benefit of U.S. Provisional Patent Application No. 63/310,031 filed Feb. 14, 2022, all of which are incorporated herein in their entirety.

BACKGROUND OF THE INVENTION

Computing systems have made significant contributions toward the advancement of modern society and are utilized in a number of applications to achieve advantageous results. Applications such as artificial intelligence, machine learning, big data analytics, and the like perform computations on large amounts of data. In conventional computing systems, data is transferred from memory to one or more processing units, the processing units perform calculations on the data, and the results are then transferred back to memory. The transfer of large amounts of data from memory to the processing unit and back to memory takes time and consumes power. Accordingly, there is a continuing need for improved computing systems that reduce processing latency, data latency, and/or power consumption.

SUMMARY OF THE INVENTION

The present technology may best be understood by referring to the following description and accompanying drawings that are used to illustrate embodiments of the present technology directed toward memory processing architectures.

In one embodiment, method of designing a memory processing unit (MPU), wherein the MPU includes a first memory including a plurality of memory regions, wherein one or more of the plurality of memory regions are configured in a corresponding pluralities of memory blocks. The MPU further includes a plurality of processing regions interleaved between the plurality of regions of the first memory, wherein the processing regions include a plurality of core groups, wherein the core groups include one or more compute cores, and wherein one or more of the plurality of core groups of a respective one of the plurality of processing regions are coupled between adjacent ones of the memory blocks of adjacent ones of the plurality of memory regions of the first region. The method comprising configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of corresponding memory regions, based on one or more of an impact of a number of parameters and a number of layers of one or more neural network models on memory balance, core utilization and memory reuse on bandwidth balance, design points, supported operations, target models, and supported memory organizations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 38 shows an inter-layer-communication method, in accordance with aspect of the present technology.

FIG. 51 illustrates rotating of a reshaped array, in accordance with aspects of the present technology.

FIGS. 54A-54C illustrate a write back to a wise memory block, in accordance with aspects of the present technology.

FIG. 55 illustrates a reshape function, in accordance with aspects of the present technology.

FIGS. 64A-64D illustrate storage of weight values having a second precision, in accordance with aspects of the present technology.

FIG. 65 shows a fetch line for a weight having a first precision as compared to a fetch line for a weight having a second precision.

DETAILED DESCRIPTION OF THE INVENTION

Figure 1:
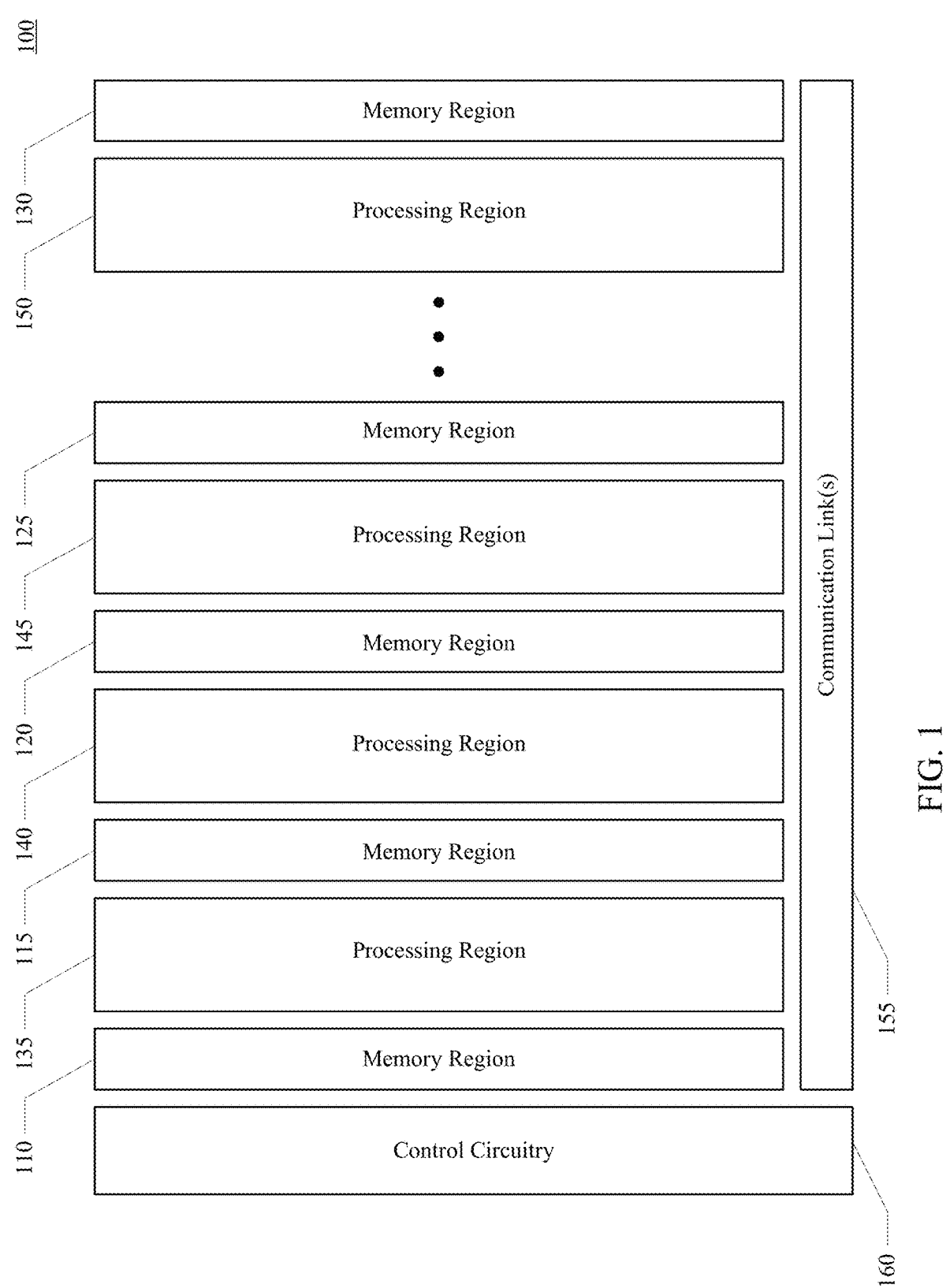
FIG. 1 shows a memory processing unit (MPU), in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring now to FIG. 1, a memory processing unit, in accordance with aspects of the present technology, is shown. The memory processing unit 100 can include a plurality of memory regions 110-130, a plurality of processing regions 135-150, one or more communication links 155, and one or more centralized or distributed control circuitry 160. The plurality of memory regions 110-130 can also be referred to as activation memory. The plurality of processing regions 135-150 can be interleaved between the plurality of memory regions 110-130. The processing regions 135-150 can be interleaved in an alternating regular pattern of a processing region 135, a memory region 115, a processing region 140, a memory region 120, a processing region 145, and so on. In one implementation, the plurality of memory regions 110-130 and the plurality of processing regions 135-150 can have respective predetermine sizes. The plurality of processing regions 135-150 can have the same design. Similarly, the plurality of memory region 110-130 can also have the same design. In one implementation, the plurality of memory regions 110-130 can be static random access memory (SRAM), and the plurality of processing regions 135-150 can include one or more arrays of static random access memory (SRAM), resistive random access memory (ReRAM), magnetic random access memory (MRAM), phase change random access memory (PCRAM), Flash memory (FLASH), or the like.

One or more of the plurality of processing regions 135-150 can be configured to perform one or more computation functions, one or more instances of one or more computation functions, one or more segments of one or more computation functions, or the like. For example, a first processing region 135 can be configured to perform two computation functions, and a second processing region 140 can be configured to perform a third computation function. In another example, the first processing region 135 can be configured to perform three instances of a first computation function, and the second processing region 140 can be configured to perform a second and third computation function. In yet another example, a given computation function can have a size larger than the predetermined size of the one or more processing regions. In such case, the given computation function can be segmented, and the computation function can be configured to be performed on one or more of the plurality of processing units 135-150. The processing regions 135-150 can each include one or more memory processing units, memory processing unit cores, or the like. The memory processing units and or cores can implement computation functions in arrays of memory cells without changing the basic memory array structure. The one or more centralized or distributed control circuitry 160 can configure the one or more computation functions of the one or more of the plurality of processing regions 135-150. The computation functions can include, but are not limited to, vector products, matrix-dot-products, convolutions, min/max pooling, averaging, scaling, and or the like.

A central data flow direction can be utilized with the plurality of memory regions 110-130 and plurality of processing regions 135-150. The one or more centralized or distributed control circuitry 160 can control data flow into each given one of the plurality of processing regions 135-150 from a first adjacent one of the plurality of memory regions 110-130 to a second adjacent one of the plurality of memory regions 110-130. For example, the one or more control circuitry 160 can configure data to flow into a first processing region 135 from a first memory region 110 and out to a second memory region 115. Similarly, the one or more control circuitry 160 can configure data to flow into a second processing region 140 from the second memory region 115 and out to a third memory region 120. The control circuitry 160 can include a centralized control circuitry, distributed control circuitry or a combination thereof. If distributed, the control circuitry 160 can be local to the plurality of memory regions 110-130, the plurality of processing regions 135-150, and or one or more communication links 155.

In one implementation, the plurality of memory regions 110-130 and the plurality of processing regions 135-150 can be columnal interleaved with each other. The data can be configured by the one or more centralized or distributed control circuitry 160 to flow between adjacent columnal interleaved processing regions 135-150 and memory regions 110-130 in a cross-columnal direction. In one implementation, the data can flow in a unidirectional cross-columnal direction between adjacent processing regions 135-150 and memory regions 110-130. For example, data can be configured to flow from a first memory region 110 into a first processing region 135, from the first processing region 135 out to a second memory region 115, from the second memory region 115 into a second processing region 140, and so on. In another implementation, the data can flow in a bidirectional cross-columnal direction between adjacent processing regions 135-150 and memory regions 110-130. In addition or alternatively, data within respective ones of the processing region 135-150 can flow between functions within the same processing region. For example, for a first processing region 135 configured to perform two computation functions, data can flow from the first computation function directly to the second computation function without being written or read from an adjacent memory region.

The one or more communication links 155 can be coupled between the interleaved plurality of memory region 110-130 and plurality of processing regions 135-150. The computation functions of the plurality of processing regions 135-150 and the dataflow between the plurality of processing regions 135-150 and the memory regions 110-130 can be conceptualized as a plurality of producers and consumers. Computation functions of a given processing region can consume data from a given memory region and produce output data to a next memory region. The output data stored in the given memory region can then be consumed by computation functions of a next given processing region. Accordingly, producers and consumers communicate through shared memory regions 110-130. The computation functions and dataflow between adjacent processing regions 135-150 and memory regions 110-130 can be mapped to ensure adjacency requirements are met. The shared data can therefore be synchronized in a dataflow manner without a global centralized control unit.

Figure 2:
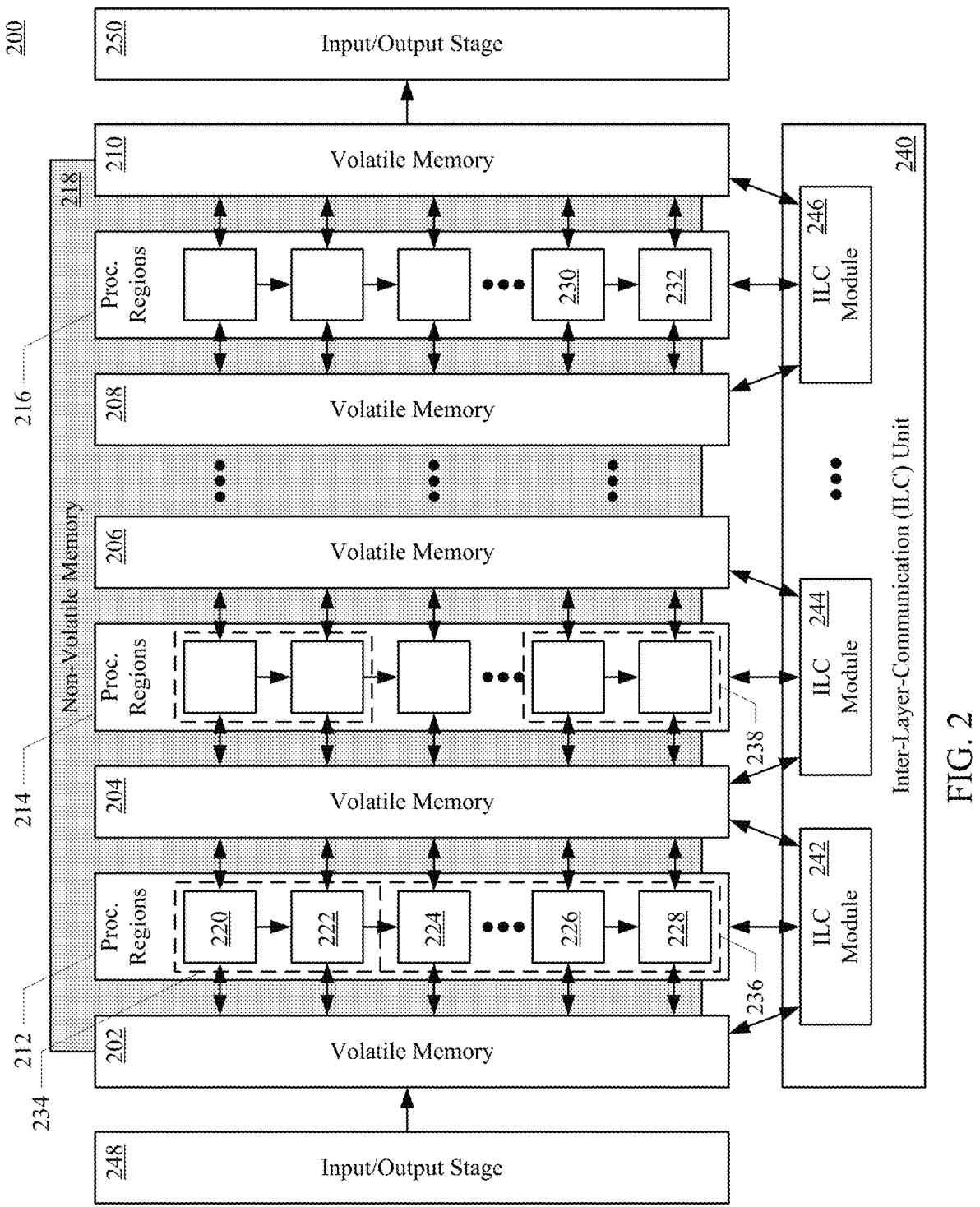
FIG. 2 shows a memory processing unit (MPU), in accordance with aspects of the present technology.

Referring to FIG. 2, a memory processing unit (MPU), in accordance with aspects of the present technology, is shown. The memory processing unit 200 can include a first memory 202-210 and a plurality of processing regions 212-216. The first memory 202-210 can include a plurality of memory regions. The plurality of processing regions 212-216 can be interleaved between the plurality of regions 202-210 of the first memory. The processing regions 212-216 and plurality of first memory regions 202-210 can be interleaved in an alternating regular pattern of a processing region 212, a memory region 204, a processing region 214, a memory region 206, a processing region, and so on. The plurality of first memory regions 202-210 can be volatile memory, such as static random-access memory (SRAM) or the like. The processing regions 212-216 can include a plurality of compute cores 220-232. The plurality of compute cores 220-232 of respective ones of the plurality of processing regions 212-216 can be coupled between adjacent ones of the plurality of regions of the first memory 202-210. For example, the compute cores 220-228 of a first processing region 212 can be coupled between a first region 202 and a second region 204 of the first memory 202-210. The compute cores 220-232 in each respective processing region 212-216 can be configurable in one or more clusters 234-238. For example, a first set of compute cores 220, 222 in a first processing region 212 can be configurable in a first cluster 234. Similarly, a second set of compute cores 224-

228 in the first processing region can be configurable in a second cluster 236. The plurality of compute cores 220-232 of respective ones of the plurality of processing regions 212-216 can also be configurably couplable in series. For example, a set of compute cores 220-224 in a first processing region 212 can be communicatively coupled in series, with a second compute core 222 receiving data and or instructions from a first compute core 220, and a third compute core 224 receiving data and or instructions from the second compute core 222.

The memory processing unit 200 can also include a second memory 218. The second memory 218 can be coupled to the plurality of processing regions 212-216. The second memory 218 can optionally be logically or physically organized into a plurality of regions. The plurality of regions of the second memory 218 can be associated with corresponding ones of the plurality of processing region 212-216. In addition, the plurality of regions of the second memory 218 can include a plurality of blocks organized in one or more macros. The second memory can be a non-volatile memory, such as resistive random-access memory (RRAM), magnetic random-access memory (MRAM), flash memory (FLASH), or the like. The second memory can alternatively be a volatile memory, such as static random-access memory (SRAM) or the like.

One or more of the plurality of processing regions 212-216 can be configured to perform one or more computation functions, one or more instances of one or more computation functions, one or more segments of one or more computation functions, or the like. For example, a first processing region 212 can be configured to perform two computation functions, and a second processing region 214 can be configured to perform a third computation function. In another example, the first processing region 212 can be configured to perform three instances of a first computation function, and the second processing region 214 can be configured to perform a second and third computation function. Similarly, the compute cores 220-232 can be configured to perform one or more computation functions, one or more instances of one or more computation functions, one or more segments of one or more computation functions, or the like. The compute cores 220-232 of the plurality of processing regions 212-216 can each include one or more memory processing units, memory processing unit cores, or the like.

The memory processing unit 200 can further include an inter-layer-communication (ILC) unit 240. The ILC unit 240 can be global or distributed across the plurality of processing regions 212-216. The inter-layer-communication unit 240 can be configured to synchronize data movement between one or more compute cores producing given data and one or more other compute cores consuming the given data.

The memory processing unit 200 can further include one or more input/output stages 242, 244. The one or more input/output stages 242, 244 can be coupled to one or more respective regions of the first memory 202-210. The one or more input/output stages 242, 244 can include one or more input ports, one or more output ports, and or one or more input/output ports. The one or more input/output stages 242, 244 can be configured to stream data into or out of the memory processing unit 200. For example, one or more of the input/output (I/O) stages can be configured to stream data into a first one of the plurality of regions of the first memory 202-210. Similarly, one or more input/output (I/O) stages can be configured to stream data out of a last one of the plurality of regions of the first memory 202-210.

The plurality of processing regions 212-216 can be configurable for memory-to-core dataflow from respective ones of the plurality of regions of the first memory 202-210 to one or more cores 220-232 within adjacent ones of the plurality of processing regions 212-216. The plurality of processing regions 212-216 can also be configurable for core-to-memory dataflow from one or more cores 220-232 within ones of the plurality of processing regions 212-216 to adjacent ones of the plurality of regions of the first memory 202-210. The plurality of processing regions 212-216 and plurality of regions of the first memory 202-210 can also be configured for memory-to-core-to-memory data flow. For example, the dataflow can be configured for a given direction from given ones of the plurality of regions of the first memory 202-210 through respective ones of the plurality of processing regions to adjacent ones of the plurality of regions of the first memory 202-210. In one implementation, the computation functions of compute cores and dataflow between processing regions 212-216 and first memory 202-210 can be organized to ensure adjacency requirements so that dataflow of shared data can be synchronized therebetween without a global centralized control unit.

The plurality of processing regions 212-216 can also be configurable for memory-to-core data flow from the second memory 218 to one or more cores 220-232 of corresponding ones of the plurality of processing regions 212-216. If the second memory 218 is logically or physically organized in a plurality of regions, respective ones of the plurality of regions of the second memory 218 can be configurably couplable to one or more compute cores in respective ones of the plurality of processing regions 212-216.

The plurality of processing regions 212-216 can be further configurable for core-to-core data flow between select adjacent compute cores 220-232 in respective ones of the plurality of processing regions 212-216. For example, a given core 224 can be configured to share data, accessed from an adjacent portion of the first memory 202, with one or more other cores 226-228 configurably coupled in series with the given compute core 224. In another example, a given core 220 can be configured to pass data accessed from the second memory 218 with one or more other cores 222 configurably coupled in series with the given compute core 220. In yet another example, a given compute core 220 can pass a result, such as a partial sum, computed by the given compute core 220, to one or more other cores 222 configurably coupled in series with the given compute core 220.

Figure 3:
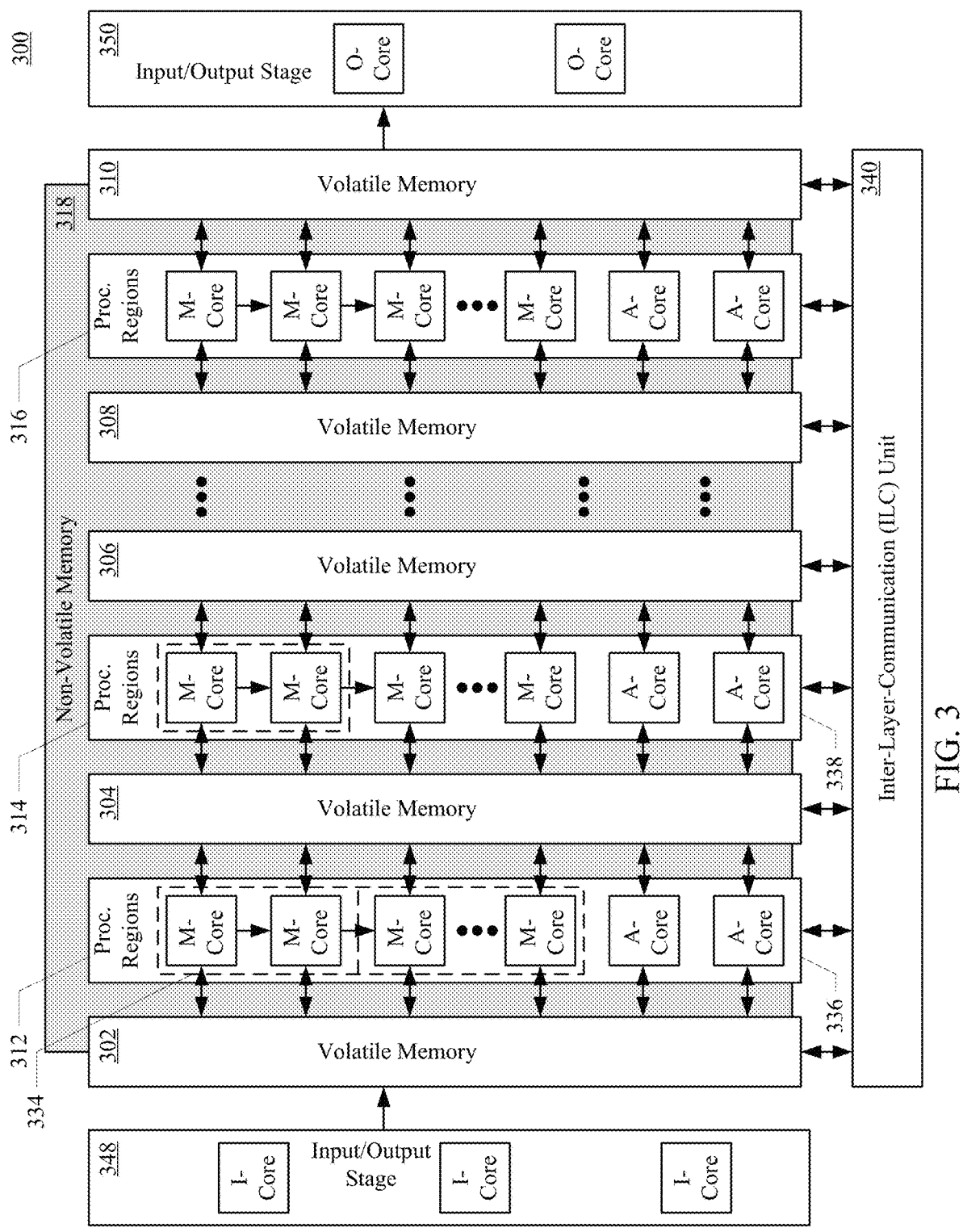
FIG. 3 shows a memory processing unit (MPU), in accordance with aspects of the present technology.

Referring to FIG. 3, a memory processing unit (MPU), in accordance with aspects of the present technology, is shown. The memory processing unit 300 can include a first memory and a plurality of processing regions 312-316. The first memory can include including a plurality of regions 302-310. The plurality of processing regions 312-316 can be interleaved between the plurality of regions of the first memory 302-310. The processing regions 312-316 can include a plurality of compute cores 320-332. The plurality of compute cores 320-332 of respective ones of the plurality of processing regions 312-316 can be coupled between adjacent ones of the plurality of regions of the first memory 302-310. For example, the compute cores 320-328 of a first processing region 312 can be coupled between a first region 302 and a second region 304 of the first memory 302-310. The compute cores 320-332 in each respective processing region 312-316 can be configurable in one or more clusters 334-338. For example, a first set of compute cores 320, 322 in a first processing region 312 can be configurable in a first cluster 334. Similarly, a second set of compute cores 324-328 in the first processing region can be configurable in a second cluster 336. The plurality of compute cores 320-332 of respective ones of the plurality of processing regions 312-316 can also be configurably couplable in series. For example, a set of compute cores 320-324 in a first processing region 312 can be communicatively coupled in series, wherein a second compute core 322 receiving data and or instructions from a first compute core 320, and a third compute core 324 receiving data and or instructions from the second compute core 322.

The memory processing unit 300 can also include a second memory 318. The second memory 318 can be coupled to the plurality of processing regions 312-316. The second memory 318 can optionally be logically or physically organized into a plurality of regions. The plurality of regions of the second memory 318 can be associated with corresponding ones of the plurality of processing region 312-316. In addition, the plurality of regions of the second memory 318 can include a plurality of blocks organized in one or more macros. The first memory 302-310 can be volatile memory, such as static random-access memory (SRAM) or the like. The second memory can be a non-volatile memory, such as resistive random-access memory (RRAM), magnetic random-access memory (MRAM), flash memory (FLASH) or the like. The second memory can alternatively be a volatile memory, such as static random-access memory (SRAM) or the like.

The memory processing unit 300 can further include an inter-layer-communication (ILC) unit 340. The ILC unit 340 can be global or distributed across the plurality of processing regions 312-316. In one implementation, the ILC unit 340 can include a plurality of ILC modules, wherein each ILC module can be coupled to respective processing regions 312-316. Each ILC module can also be coupled to the respective regions of the first memory 302-310 adjacent to the corresponding respective processing regions 312-316. The inter-layer-communication unit 340 can be configured to synchronize data movement between one or more compute cores producing given data and one or more other compute cores consuming the given data. The inter-layer communication unit 340 can map the computations functions of compute cores and dataflow between processing regions 312-316 and first memory 302-310 on an adjacency basis so that dataflow of shared data can be synchronized therebetween.

The memory processing unit 300 can further include one or more input/output stages 348, 350. The one or more input/output stages 348, 350 can be coupled to one or more respective regions of the first memory 302-310. The one or more input/output stages 348, 350 can include one or more input ports, one or more output ports, and or one or more input/output ports. The one or more input/output stages 348, 350 can be configured to stream data into or out of the memory processing unit 300. For example, one or more of the input/output (I/O) stages can be configured to stream data into a first one of the plurality of regions of the first memory 302-310. Similarly, one or more input/output (I/O) stages can be configured to stream data out of a last one of the plurality of regions of the first memory 302-310.

The plurality of processing regions 312-316 can be configurable for memory-to-core dataflow from respective ones of the plurality of regions of the first memory 302-310 to one or more cores 320-332 within adjacent ones of the plurality of processing regions 312-316. The plurality of processing regions 312-316 can also be configurable for core-to-memory dataflow from one or more cores 320-332 within ones of the plurality of processing regions 312-316 to adjacent ones of the plurality of regions of the first memory 302-310. In one implementation, the dataflow can be configured for a given direction from given ones of the plurality of regions of the first memory 302-310 through respective ones of the plurality of processing regions to adjacent ones of the plurality of regions of the first memory 302-310.

The plurality of processing regions 312-316 can also be configurable for memory-to-core data flow from the second memory 318 to one or more cores 320-332 of corresponding ones of the plurality of processing regions 312-316. If the second memory 318 is logically or physically organized in a plurality of regions, respective ones of the plurality of regions of the second memory 318 can be configurably couplable to one or more compute cores in respective ones of the plurality of processing regions 312-316.

The plurality of processing regions 312-316 can be further configurable for core-to-core data flow between select adjacent compute cores 320-332 in respective ones of the plurality of processing regions 312-316. For example, a given core 324 can be configured to share data, accessed from an adjacent portion of the first memory 302, with one or more other cores 326-328 configurably coupled in series with the given compute core 324. In another example, a given core 320 can be configured to pass data, accessed from the second memory 318, with one or more other cores 322 configurably coupled in series with the given compute core 320. In yet another example, a given compute core 320 can pass a result, such as a partial sum, computed by the given compute core 320, to one or more other cores 322 configurably coupled in series with the given compute core 320.

The plurality of processing regions 312-316 can include one or more near memory (M) compute cores. The one or more near memory (M) compute cores can be configurable to compute neural network functions. For example, the one or more near memory (M) compute cores can be configured to compute vector-vector products, vector-matrix products, matrix-matrix products, and the like, and or partial products thereof.

The plurality of processing regions 312-316 can also include one or more arithmetic (A) compute cores. The one or more arithmetic (A) compute cores can be configurable to compute arithmetic operations. For example, the arithmetic (A) compute cores can be configured to compute merge operations, arithmetic calculations that are not supported by the near memory (M) compute cores, and or the like.

The plurality of input and output regions 348, 350 can also include one or more input/output (I/O) cores. The one or more input/output (I/O) cores can be configured to access input and or output ports of the memory processing unit (MPU) 300. The term input/output (I/O) core as used herein can refer to cores configured to access input ports, cores configured to access output ports, or cores configured to access both input and output ports.

The compute cores 320-332 can include a plurality of physical channels configurable to perform computations, accesses and the like, simultaneously with other cores within respective processing regions 312-316, and or simultaneously with other cores in other processing regions 312-316. The compute cores 320-332 of respective ones of the plurality of processing regions 312-316 can be associated with one or more blocks of the second memory 318. The compute cores 320-332 of respective ones of the plurality of processing regions 312-316 can be associated with respective slices of the second plurality of memory regions. The cores 320-332 can also include a plurality of configurable virtual channels.

Figure 4:
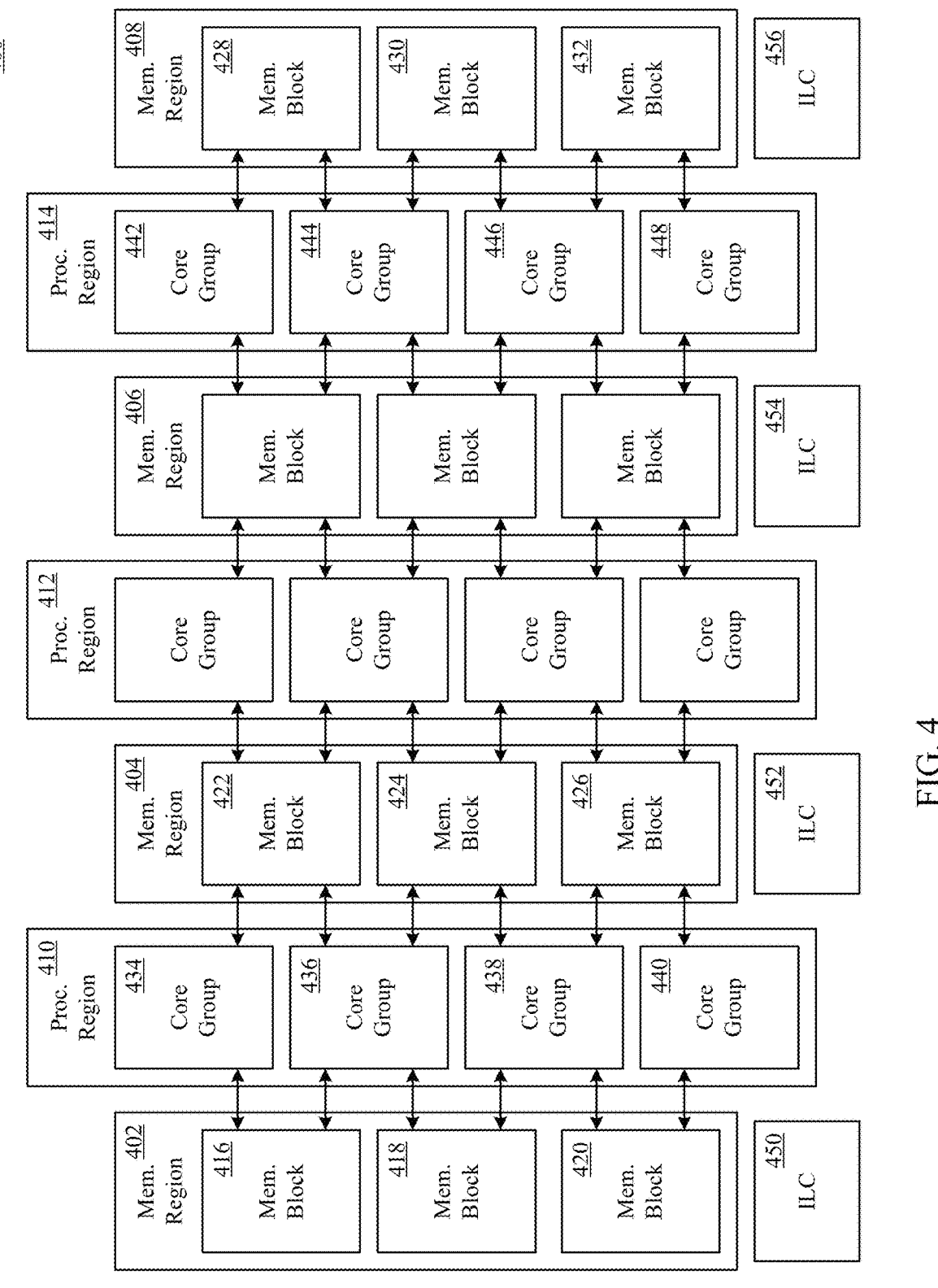
FIG. 4 shows a memory processing unit (MPU), in accordance with aspects of the present technology.

Referring now to FIG. 4, a memory processing unit, in accordance with aspects of the present technology, is shown. The memory processing unit 400 can include a first memory and a plurality of processing regions 410-414. The first memory can include a plurality of memory regions 402-408. The plurality of processing regions 410-414 can be interleaved between the plurality of memory regions 402-408 of the first memory. In one implementation, the plurality of memory regions 402-408 and the plurality of processing regions 410-414 can have respective predetermine sizes. One or more of the plurality of memory regions 402-408 can include a plurality of memory blocks 416-432. One or more processing regions 410-414 can also include a plurality of core groups 434-448. A core group 434-448 can include one or more compute cores. The compute cores in a respective core group can be arranged in one or more compute clusters. One or more of the plurality of core groups of a respective one of the plurality of processing regions can be coupled between adjacent ones of the plurality of memory regions of the first memory. In one implementation, a given core group can be coupled to a set of directly adjacent memory blocks, while not coupled to the other memory blocks of the adjacent memory regions. In other words, a core group of a respective processing region can be coupled to a set of memory blocks that are proximate to the given core group, while not coupled to memory blocks in the adjacent memory regions that are distal from the given core group. For example, a first core group 434 of a first processor region 410 can be coupled between a first memory block 416 of a first memory region 402 and a first memory block 422 of a second memory region 404. A second core group 436 of the first processor region 410 can be coupled to the first and a second memory block 416, 418 of the first memory region 402 and the first and a second memory block 422, 424 of the second memory region 404. The second core group 436 of the first processor region 410 can also be coupled between the first and a third core groups 434, 438 of the first processor region 410.

One or more of the compute cores, and or one or more core groups of the plurality of processing regions 410-414 can be configured to perform one or more computation functions, one or more instances of one or more computation functions, one or more segments of one or more computation functions, or the like. For example, a first compute core, a first core group 434 or a first processing region 410 can be configured to perform two computation functions, and a second compute core, second core group or second processing region 412 can be configured to perform a third computation function. In another example, a first compute core, the first core group 434 or the first processing region 410 can be configured to perform three instances of a first computation function, and a second compute core, second core group or second processing region 412 can be configured to perform a second and third computation function. In yet another example, a given computation function can have a size larger than the predetermined size of a compute core, core group or one or more processing regions. In such case, the given computation function can be segmented, and the computation function can be configured to be performed on one or more compute cores, one or more core groups or one or more of the processing regions 410-414. The computation functions can include, but are not limited to, vector products, matrix-dot-products, convolutions, min/max pooling, averaging, scaling, and or the like.

The memory processing unit 400 can also include one or more inter-layer communication (ILC) units 450-456. The ILC unit 450-456 can be global or distributed across the plurality of processing regions 410-414. In one implementation, the ILC unit 450-456 can include a plurality of ILC modules 450-456, wherein each ILC module can be coupled to adjacent respective processing regions 410-414. Each ILC module 450-456 can also be coupled to adjacent respective regions of the first memory 402-408. The inter-layer-communication units 450-456 can be configured to synchronize data movement between one or more compute cores producing given data and one or more other compute cores consuming the given data. Again, the inter-layer communication unit 450-456 can map the computation functions of compute cores and dataflow between processing regions 410-414 and first memory 402-408 based on adjacency so that dataflow of shared data can be synchronized therebetween.

The compute cores of the core groups 434-448 of the processing regions 410-414 can include a plurality of physical channels configurable to perform computations, accesses and the like, simultaneously with other cores within respective core groups 434-448 and or processing regions 410-414, and or simultaneously with other cores in other core groups 434-448 and or processing regions 410-414. The compute cores can also include a plurality of configurable virtual channels.

Relatively large flat memory regions such as the plurality of first memory regions described above with reference to FIGS. 1-3 may not be able to provide enough memory bandwidth to achieve a target performance level. Therefore, organizing each of the memory regions 402-408 into a plurality of memory blocks 416-432 and coupling a core group 436 of a respective processing region 410 to a set of memory blocks 416, 418, 422, 424 that are proximate to the given core group 436, while not coupled to memory blocks in the adjacent memory regions that are distal from the given core group as described above with reference to FIG. 4, can increase memory bandwidth throughput. Accordingly, providing more, but smaller, flat memory bocks by organizing each of the plurality of memory regions 402-408 into respective sets of a plurality of memory blocks 416-432 can provide increased memory bandwidth for increased performance. The smaller flat memory blocks can also provide the potential for better chip layout as compared to larger flat memory organizations. However, the increased number of the smaller flat memory blocks can make adjacency mapping for dataflow more challenging.

Figure 5:
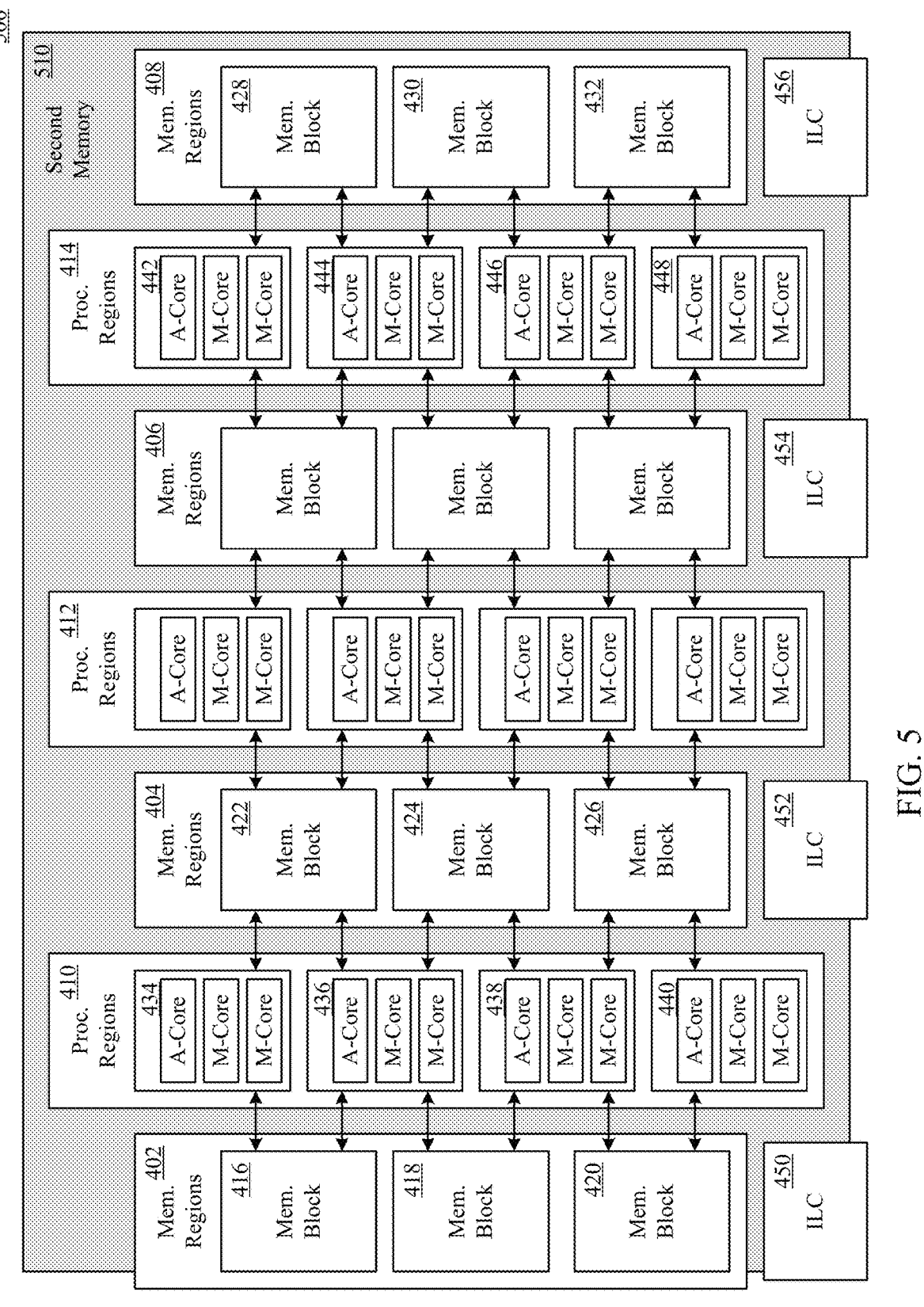
FIG. 5 shows a memory processing unit (MPU), in accordance with aspects of the present technology.

Referring now to FIG. 5, a memory processing unit, in accordance with aspects of the present technology, is shown. The memory processing unit 500 can include a first memory and a plurality of processing region 410-414. The first memory can include a plurality of memory regions 402-408. The plurality of processing regions 410-414 can be interleaved between the plurality of memory regions 402-408 of the first memory. In one implementation, the plurality of first memory regions 402-408 and the plurality of processing regions 410-414 can have respective predetermine sizes. One or more of the plurality of memory regions 402-408 can include a plurality of memory blocks 416-432. One or more processing regions 410-414 can also include a plurality of core groups 434-448. A core group 434-448 can include one or more compute cores. The compute cores in a respective core group can be arranged in one or more compute clusters. One or more of the plurality of core groups of a respective one of the plurality of processing regions can be coupled between adjacent memory blocks of adjacent ones of the plurality of memory regions of the first memory. In one implementation, a given core group can be coupled to a set of directly adjacent memory blocks, while not coupled to the other memory blocks of the adjacent memory regions. In other words, a core group of a respective processing region can be coupled to a set of memory blocks that are proximate to the given core group, while not coupled to memory blocks in the adjacent memory regions that are distal from the given core group. For example, a first core group 434 of a first processor region 410 can be coupled between a first memory block 416 of a first memory region 402 and a first memory block 422 of a second memory region 404. A second core group 436 of the first processor region 410 can be coupled to the first and a second memory block 416, 418 of the first memory region 402 and the first and a second memory block 422, 424 of the second memory region 404. The second core group 436 of the first processor region 410 can also be coupled between the first and a third core group 434, 438 of the first processor region 410.

The memory processing unit 500 can also include a second memory 510. The second memory 510 can be coupled to the plurality of processing regions 410-414. The second memory 510 can optionally be logically or physically organized into a plurality of regions (not shown). The plurality of regions of the second memory 510 can be associated with corresponding ones of the plurality of processing region 410-414. In addition, the plurality of regions of the second memory 510 can include a plurality of blocks organized in one or more macros. The second memory can be non-volatile memory, such as resistive random-access memory (RRAM), magnetic random-access memory (MRAM), flash memory (FLASH) or the like. The second memory can alternatively be volatile memory.

One or more of the compute cores, and or one or more core groups of the plurality of processing regions 410-414 can be configured to perform one or more computation functions, one or more instances of one or more computation functions, one or more segments of one or more computation functions, or the like. For example, a first compute core, a first core group 434 or a first processing region 410 can be configured to perform two computation functions, and a second compute core, second core group or second processing region 412 can be configured to perform a third computation function. In another example, the first compute core, the first core group 434 or the first processing region 410 can be configured to perform three instances of a first computation function, and the second compute core, second core group or the second processing region 412 can be configured to perform a second and third computation function. In yet another example, a given computation function can have a size larger than the predetermined size of a compute core, core group or one or more processing regions. In such case, the given computation function can be segmented, and the computation function can be configured to be performed on one or more compute cores, one or more core groups or one or more of the processing regions 410-414. The computation functions can include, but are not limited to, vector products, matrix-dot-products, convolutions, min/max pooling, averaging, scaling, and or the like.

The dataflow can be configured by the one or more centralized or distributed control circuitry inter-layer communication (ILC) units 450-456 to flow between adjacent columnal interleaved processing regions 410-414 and memory regions 402-408 in a cross-columnal direction. In one implementation, one or more communication links can be coupled between the interleaved plurality of memory region 402-408 and plurality of processing regions 410-414. The one or more communication links can also be configured for moving data between non-adjacent ones of the plurality of memory regions 402-408, between non-adjacent ones of the plurality of processing regions 410-414, or between non-adjacent ones of a given memory region and a given processing region.

The plurality of processing regions 410-414 can be configurable for memory-to-core dataflow from respective ones of the plurality of regions of the first memory 402-408 to one or more cores within adjacent ones of the plurality of processing regions 410-414. The plurality of processing regions 410-414 can also be configurable for core-to-memory dataflow from one or more cores within ones of the plurality of processing regions 410-414 to adjacent ones of the plurality of regions of the first memory 402-408. In one implementation, the dataflow can be configured for a given direction from given ones of the plurality of regions of the first memory 402-408 through respective ones of the plurality of processing regions to adjacent ones of the plurality of regions of the first memory 402-408.

The plurality of processing regions 410-414 can also be configurable for memory-to-core data flow from the second memory 510 to one or more cores of corresponding ones of the plurality of processing regions 410-414. If the second memory 510 is logically or physically organized in a plurality of regions, respective ones of the plurality of regions of the second memory 510 can be configurably couplable to one or more compute cores in respective ones of the plurality of processing regions 410-414.

The plurality of processing regions 410-414 can be further configurable for core-to-core data flow between select adjacent compute cores in respective ones of the plurality of processing regions 410-414. For example, a given core can be configured to pass data accessed from an adjacent portion of the first memory 402 with one or more other cores configurably coupled in series with the given compute core. In another example, a given core can be configured to pass data accessed from the second memory 510 with one or more other cores configurably coupled in series with the given compute core. In yet another example, a given compute core can pass a result, such as a partial sum, computed by the given compute core to one or more other cores configurably coupled in series with the given compute core.

Again, relatively large flat memory regions, such as the plurality of first memory regions described above with reference to FIGS. 1-3, may not be able to provide enough memory bandwidth to achieve a target performance level. Therefore, organizing each of the memory regions 402-408 into a plurality of memory blocks 416-432 and coupling a core group 436 of a respective processing region 410 to a set of memory blocks 416, 418, 422, 424 that are proximate to the given core group 436, while not coupled to memory blocks in the adjacent memory regions that are distal from the given core group as described above with reference to FIG. 4, can increase memory bandwidth throughput. Accordingly, providing more, but smaller, flat memory bocks by organizing each of the plurality of memory regions 402-408 into respective sets of a plurality of memory blocks 416-432 can provide increased memory bandwidth for increased performance. The smaller flat memory blocks can also provide the potential for better chip layout as compared to larger flat memory organizations. However, the increased number of the smaller flat memory blocks can make adjacency mapping for dataflow more challenging.

The plurality of processing regions 410-414 can include one or more near memory (M) compute cores. The one or more near memory (M) compute cores can be configurable to compute neural network functions. For example, the one or more near memory (M) compute cores can be configured to compute vector-vector products, vector-matrix products, matrix-matrix products, and the like, and or partial products thereof.

The plurality of processing regions 410-414 can also include one or more arithmetic (A) compute cores. The one or more arithmetic (A) compute cores can be configurable to compute arithmetic operations. For example, the arithmetic (A) compute cores can be configured to compute merge operations, arithmetic calculations that are not supported by the near memory (M) compute cores, and or the like.

A plurality of input and output regions (not shown) can also include one or more input/output (I/O) cores. The one or more input/output (I/O) cores can be configured to access input and or output ports of the memory processing unit (MPU) 500. The term input/output (I/O) core as used herein can refer to cores configured to access input ports, cores configured to access output ports, or cores configured to access both input and output ports.

The compute cores can also include other types of compute cores. The compute cores of the core groups 434-448 of the processing regions 410-414 can include a plurality of physical channels configurable to perform computations, accesses and the like, simultaneously with other cores within respective core groups 434-448 and or processing regions 410-414, and or simultaneously with other cores in other core groups 434-448 and or processing regions 410-414. The compute cores can also include a plurality of configurable virtual channels.

The plurality of memory regions 402-408 can also be organized into a plurality of memory blocks arranged in a plurality of columns and rows for each memory region 402-408. For example, each given memory region 404 can be organized into a plurality of memory blocks of m blocks wide and n blocks long, wherein m and n can be different or equal. A fetch unit for a respective processing region, core group, or compute core can be configured to fetch from sets of memory blocks of respective adjacent memory regions. Similarly, a write-back unit for a respective processing region, core group, or compute core can be configured to write back to a set of memory blocks of respective adjacent memory regions. The organization of the plurality of memory blocks in a plurality of columns and rows can provide further increased memory bandwidth for increased performance. The organization of the plurality of memory blocks arranged in a plurality of columns and rows is further explained below with reference to FIGS. 53A-53D and 54A-54C.

It is to be appreciated, that the memory processing architectures, in accordance with aspects of the present technology, can advantageously enable the design selection of the number of processing regions, the number of groups of compute cores, the number of compute cores, the number of compute clusters, the types of compute cores, the organization of memories, the types of memories, the size of the memories, the number of memory regions, the number of memory blocks and the like.

Figure 6:
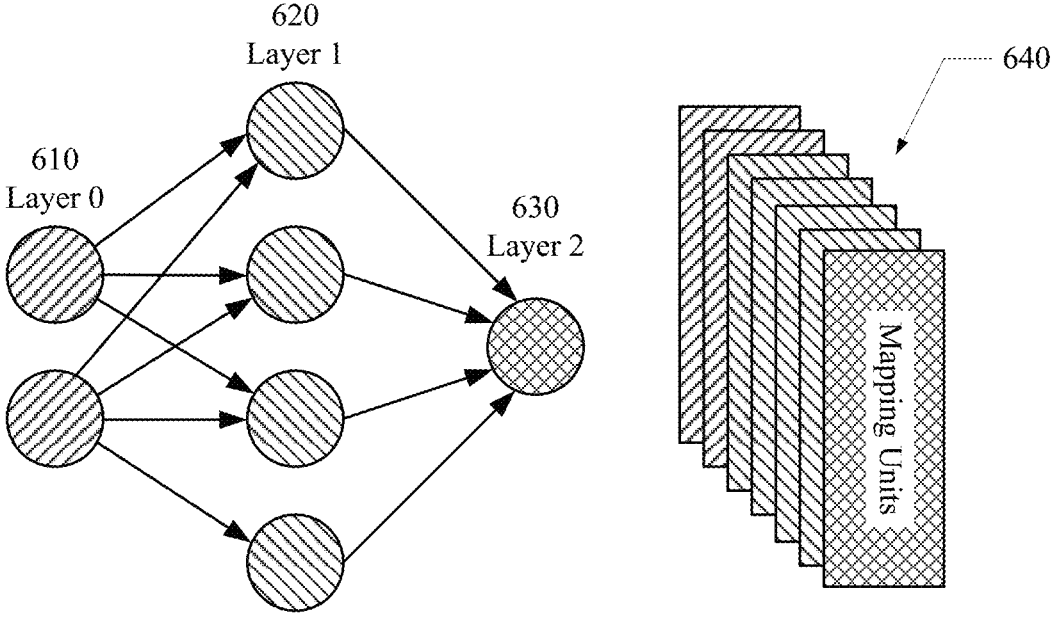
FIG. 6 illustrates an exemplary mapping of a neural network to compute cores, in accordance with aspects of the present technology.
Figure 7:
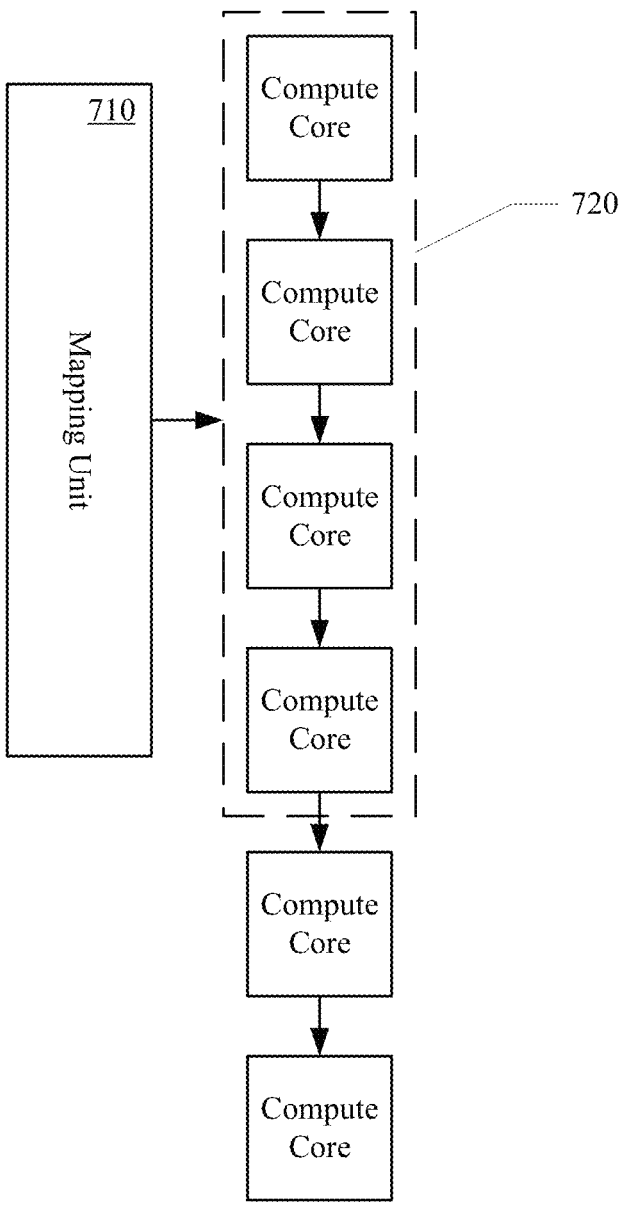
FIG. 7 illustrates an exemplary compute core mapping, in accordance with aspects of the present technology.

In accordance with aspects of the present technology, a neural network layer, a part of a neural network layer, or a plurality of fused neural network layers can be mapped to a single cluster of compute cores or a core group as a mapping unit. A cluster of compute cores is a set of cores of a given processing region that are configured to work together to compute a mapping unit. For example, the nodes of a first layer 610 of a neural network can be mapped as a mapping unit to a first set of compute cores, the nodes of a second layer 620 can be mapped to a second set of compute cores, while the node of a third layer 630 can be mapped to a third set of compute cores, as illustrated in FIG. 6. Furthermore, a mapping unit 710 can be computed by a compute core cluster 720 as illustrated in FIG. 7. Optionally, more compute cores than are needed to compute a mapping unit can be configured in a compute cluster to improve computing performance.

Figure 8A:
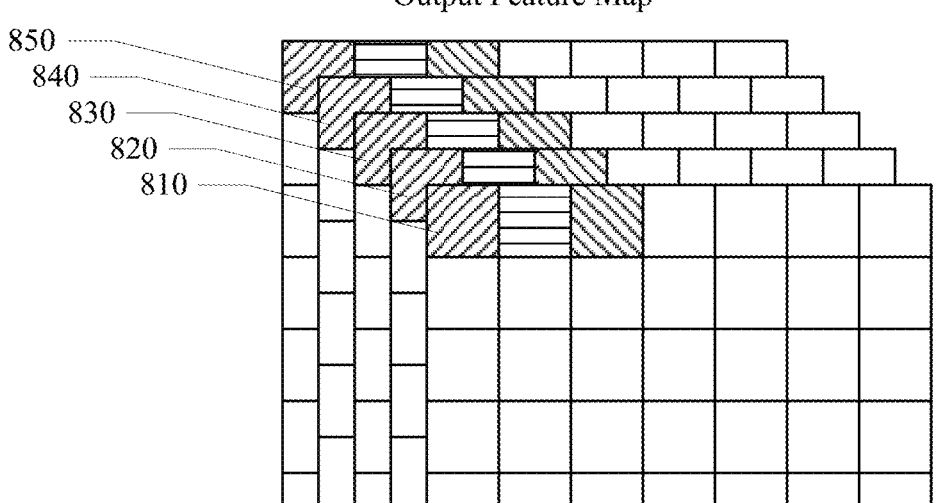
FIGS. 8A-8B show an exemplary computation of multiple output feature map pixels, in accordance with aspects of the present technology.
Figure 8B:
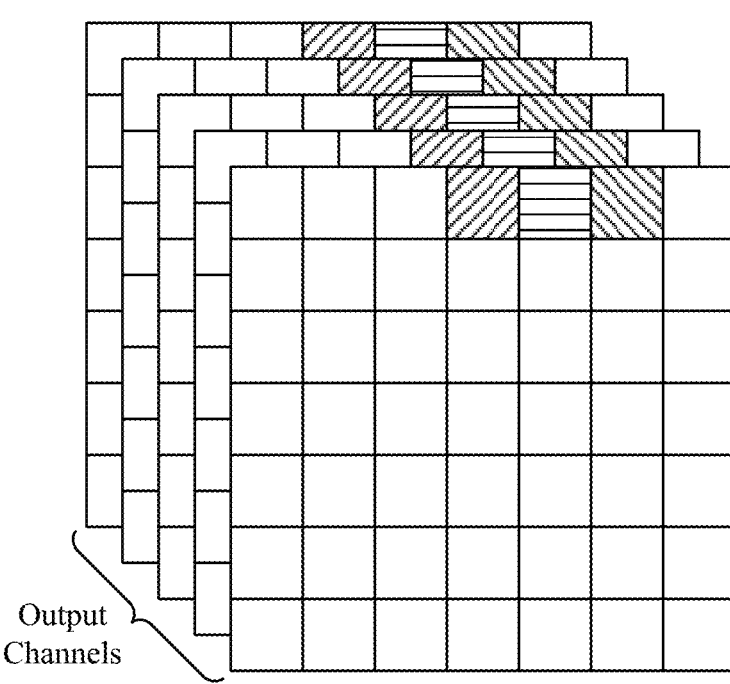

Referring now to FIGS. 8A-8B, an exemplary computation of multiple output feature map pixels, in accordance with aspects of the present technology, is illustrated. One or more compute cores can be configured to compute a corresponding output feature map pixel from an input feature map pixel value and a kernel data (weight) value. As illustrated, compute cores can be configured as three pixel workers to compute output feature map pixel values for each of the output channels. For example, a given pixel worker can compute output feature map pixel values 810-850 for each of the output channels of the output feature map. The pixel workers can then step to the next set of three pixel values to compute the corresponding output channels of the output feature map, as illustrated in FIG. 8B. In a polymorphic implementation, multiple compute cores can work together as pixel workers. The maximum number of pixel workers for a given layer is limited to the output feature map width of the given layer. The kernel, weight data or the like can be reused without reloading them from the second memory region.

Figure 9:
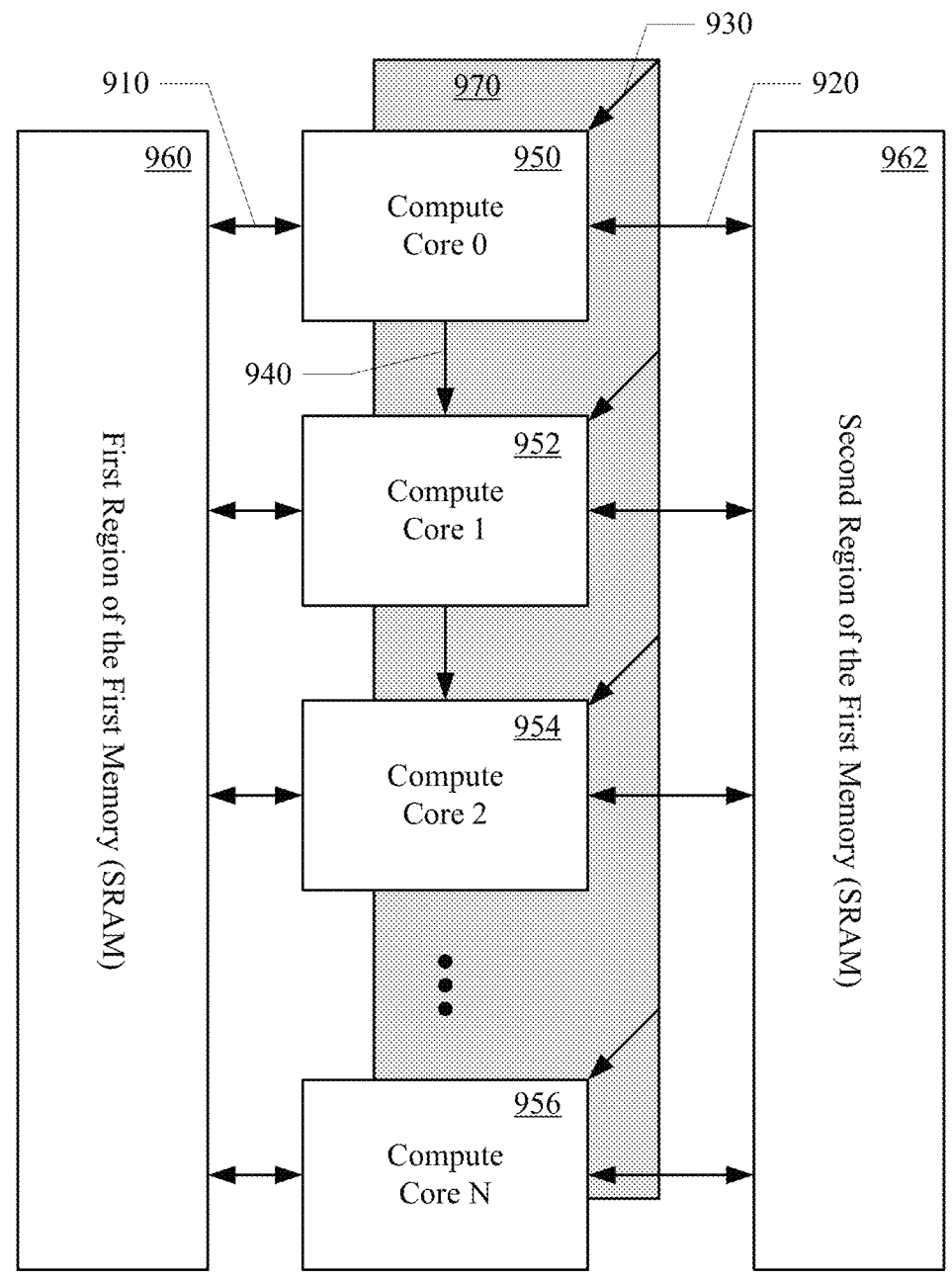
FIG. 9 shows configuration of dataflows in a memory processing unit (MPU), in accordance with aspects of the present technology.

Referring now to FIG. 9, configuration of dataflows in the memory processing unit, in accordance with aspects of the present technology, is illustrated. The dataflow 910, 920 between the compute cores 950-956 of the processing regions and adjacent regions of first memory 960, 962 can be configured in either direction. For example, the compute cores 950-956 and the adjacent portions of the first memory region 960, 962 can be configured for dataflow from a first region of the first memory 960, through the compute cores 950-956, and to a second region of the first memory 962. Alternatively, the dataflow can be configured from the second region of the first memory 962, through the compute cores 950-956, to the first region of the first memory 960. In one implementation, the dataflow between the compute cores 950-956 of the processing regions and adjacent regions of first memory 960-962 can provide a direct route to access feature map data or the like.

The dataflow 930 from the second memory 970 to the compute cores of the processing regions can also be configured. In one implementation, the dataflow from the second memory 970 to the compute cores 950-956 can provide a direct route to access kernel data (weight data) or the like. The dataflow 940 between the compute cores 950-956 can also be configured. In one implementation, the dataflow between the compute cores 950-956 can provide for the sharing of data from the second memory with others of the compute cores 950-956 in a corresponding core group and or processing region.

The plurality of processing regions can include one or more near memory (M) compute cores, one or more arithmetic (A) compute cores, and one or more input/output (I/O) cores. The one or more near memory (M) compute cores can be configurable to compute neural network functions. The one or more arithmetic (A) compute cores can be configurable to compute arithmetic operations. The one or more input/output (I/O) cores can be configured to access input and or output ports of the memory processing unit (MPU).

Figure 10:
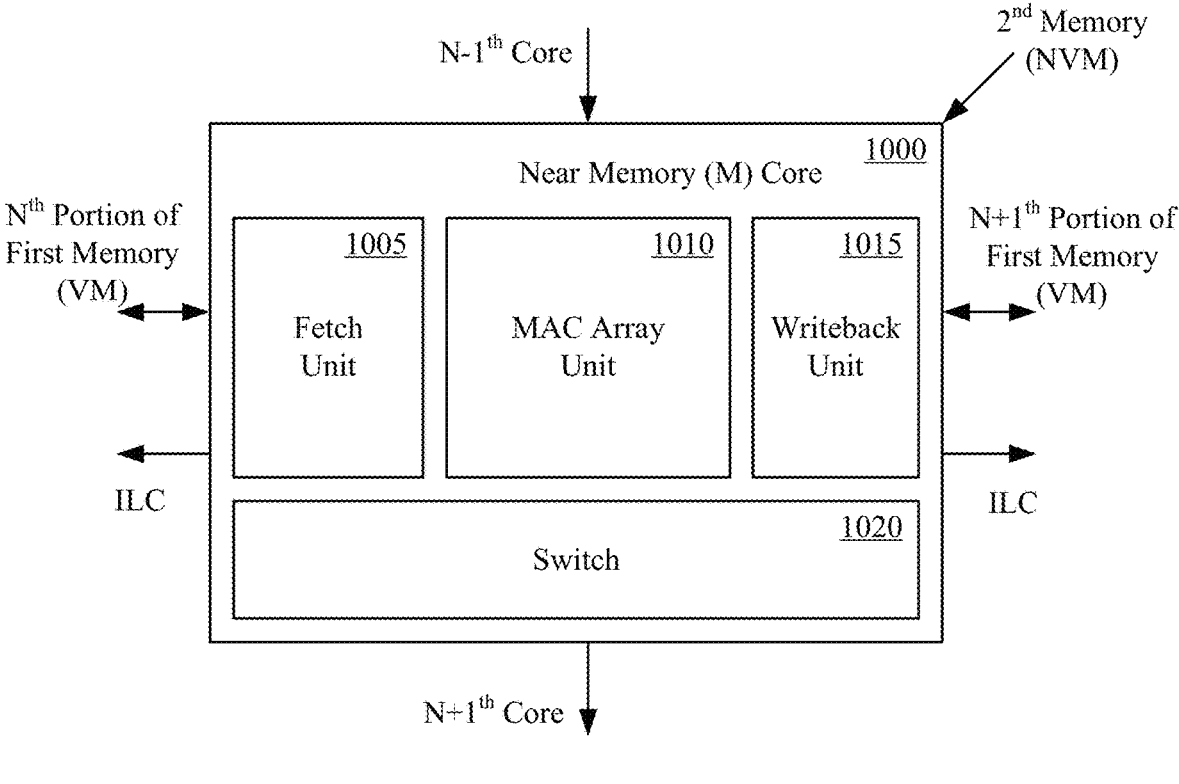
FIG. 10 shows a near memory (M) compute core, in accordance with aspects of the present technology.

Referring now to FIG. 10, a near memory (M) compute core, in accordance with aspects of the present technology, is shown. The near memory (M) compute core 1000 can include a fetch unit 1005, a multiply-and-accumulate (MAC) array unit 1010, a writeback unit 1015 and a switch 1020. The fetch unit 1005 can be configured to fetch data from an $N^{th}$ portion of the first memory for the multiply-and-accumulate (MAC) array unit 1010. The fetch unit 1005 can also be configured to receive data from a $N-1^{th}$ compute core and or pass data to a $N+1^{th}$ compute core within a respect processing region. The fetch unit 1005 can also be configured to receive data from the second memory. The fetch unit 1005 can also be configured to synchronize data movement the $N^{th}$ portion of the first memory with the inter-layer-communication (ILC) unit. In one implementation, the fetch unit 1005 can be configured to control an operation sequence of the near memory (M) compute core 1000, to fetch data from the second memory or an adjacent one of a sequence of the plurality of compute cores in a respective processing region, to fetch data from an adjacent one of the plurality of regions of the first memory, to decrement an inter-layer-communication (ILC) counter, and to trigger other units of the near memory (M) core.

The multiply-and-accumulate (MAC) array unit 1010 can be configured to compute neural network functions. For example, the multiply-and-accumulate (MAC) array unit 1010 can be configured to compute vector-vector products, vector-matrix products, matrix-matrix products, and the like, and or partial products thereof. The multiply-and-accumulate (MAC) array unit 1010 can also be configured to perform pre-channel and bias scaling. In one implementation, the multiply-and-accumulate (MAC) array unit 1010 can be configured to perform main operations such as, but not limited to, dense or fully connected convolutions, n-dimensional convolutions, depth-wise convolutions, and separable convolutions. Circuitry of the near memory (M) compute cores can also be configured to perform fused operations such as, but not limited to, max pooling, average pooling, rectify linear (ReLU) activation, ReLU-x activation, and up-sampling, and provide the results to the multiply-and-accumulate (MAC) array unit 1010. Circuitry of the near memory (M) compute cores can also be configured to perform virtually fused operations such as, but not limited to, zero padding (folded into kernel corners), average pooling (folded into weights and biases), ReLU activation, ReLU-x activation, and up-sampling, and provide the results to the multiply-and-accumulate (MAC) array unit 1010.

The writeback unit 1015 can be configured to write data to an $N+1^{th}$ portion of the first memory for the multiply-and-accumulate (MAC) array unit 1010. The writeback unit 1015 can also be configured to synchronize data movement the $N^{th}$ portion of the first memory with the inter-layer-communication (ILC) unit. In one implementation, the writeback unit 1015 can be configured to perform a fuse operation, send data to an adjacent region of the first memory or adjacent compute core in the respective processing region, and to increment an inter-layer-communication (ILC) counter.

The switch 1020 can configure memory accesses, and chain directions and interfaces of the fetch unit and writeback units to ports of the respective near memory (M) compute core based on configuration information. The switch 1020 can be preconfigured with memory access and chain directions. The switch 1020 can therefore interface the fetch 1005 and writeback units 1015 based on the data-flow configuration.

The near memory (M) compute core 1000 can include a plurality of physical channels configurable to perform computations simultaneously. The near memory (M) compute core 1000 can also be associated with one or more blocks of the second memory. The physical channels of the near memory (M) compute core 1000 can be associated with respective slices of the second plurality of memory regions. The near memory (M) compute core 1000 can also include a plurality of configurable virtual channels.

Figure 11:
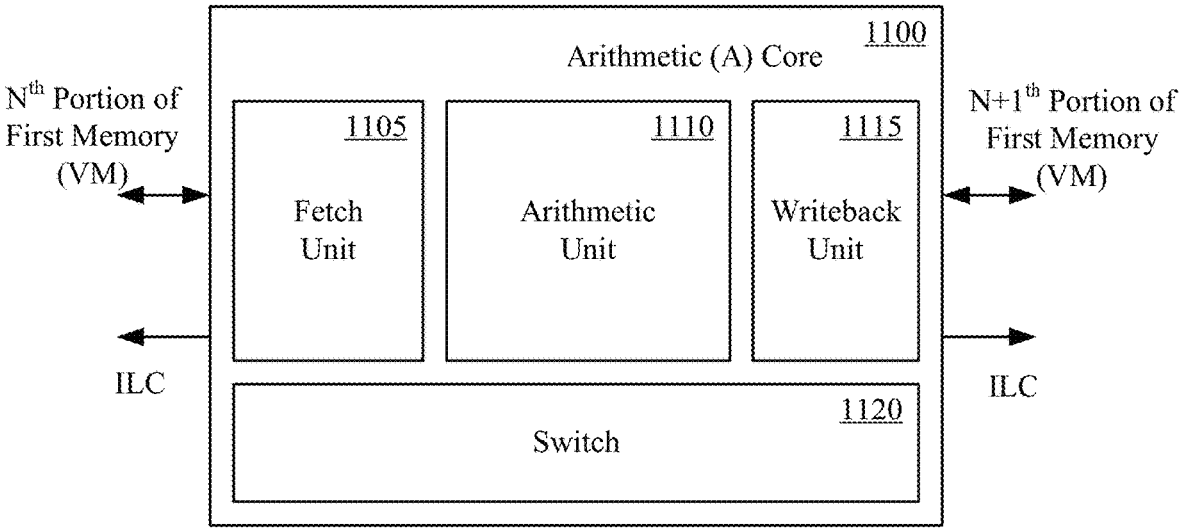
FIG. 11 shows an arithmetic (A) compute core, in accordance with aspects of the present technology.

Referring now to FIG. 11, an arithmetic (A) compute core, in accordance with aspects of the present technology, is shown. The arithmetic (A) compute core 1100 can include a fetch unit 1105, an arithmetic unit 1110, a writeback unit 1115, and a switch 1120. Again, the fetch unit 1105 can be configured to fetch data from an $N^{th}$ portion of the first memory for the arithmetic unit 1110. The fetch unit 1105 can also be configured to synchronize data movement in the $N^{th}$ portion of the first memory with the inter-layer-communication (ILC) unit. In one implementation, the fetch unit 1105 can be configured to control an operation sequence of the arithmetic unit 1110, to fetch data from an adjacent one of the plurality of regions of the first memory, decrement an inter-layer-communication (ILC) counter, and trigger other units of the arithmetic (A) compute core 1100.

The arithmetic unit 1110 can be configured to compute arithmetic operations not supported by the multiply accumulate (MAC) array unit 1010. For example, the arithmetic unit 1110 can be configured to compute merge operations and or the like. The arithmetic unit 1110 can compute one or more output channels at a time. The arithmetic unit 1110 may not have access to the second memory. The arithmetic unit 1110 may have no means to pass data between adjacent cores in the same processing region. In one implementation, the arithmetic unit 1110 can be configured to perform main operations such as, but not limited to, add, multiply and bypass. The arithmetic unit 1110 can also be configured to fuse operations such as, but not limited to, ReLU activation, ReLU-x activation, and leaky ReLU-x activation.

The writeback unit 1115 can be configured to write data to an $N+1^{th}$ portion of the first memory for the arithmetic unit 1110. The writeback unit 1115 can also be configured to synchronize data movement the $N^{th}$ portion of the first memory with the inter-layer-communication (ILC) unit. In one implementation, the writeback unit 1115 can be configured to perform a fuse operation, send data to an adjacent region of the first memory or an adjacent compute core in the respective processing region, and to increment an inter-layer-communication (ILC) counter.

The switch 1120 can be configured to configure memory accesses, chain directions and interfaces of the fetch unit and writeback units to ports of the arithmetic compute core based on configuration information.

Figure 12:
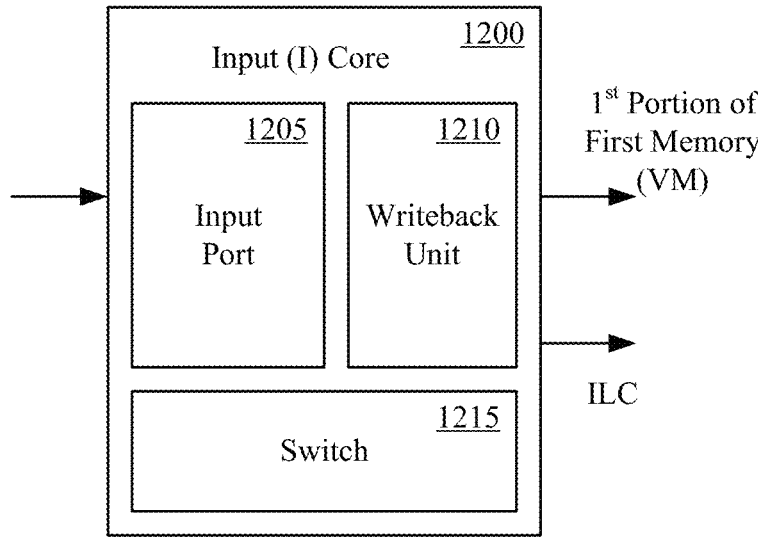
FIG. 12 shows an input (I) core, in accordance with aspects of the present technology.

Referring now to FIG. 12, an input (I) core, in accordance with aspects of the present technology, is shown. The input (I) core 1200 can include an input port 1205, a writeback unit 1210 and switch 1215. The input port 1205 can be configured to receive data into the memory processing unit and trigger the writeback unit 1210. The writeback unit 1210 can be configured to stream the received data into a first portion of the first memory and increment an inter-layer-communication (ILC) counter. The switch 1215 can be configured to connect the writeback unit 1210 to the adjacent regions of the first memory based on configuration information. In one implementation, an input stage can be comprised of a single or multiple input (I) cores 1200.

Figure 13:
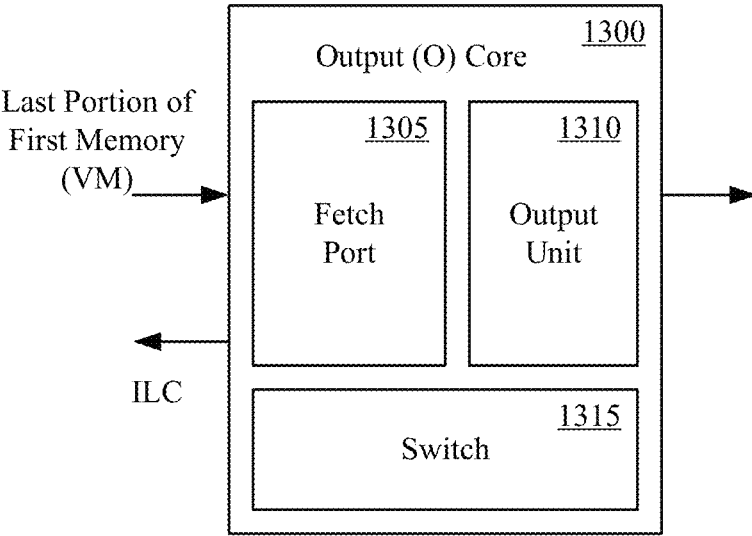
FIG. 13 shows an output (O) core, in accordance with aspects of the present technology.

Referring now to FIG. 13, an output (O) core, in accordance with aspects of the present technology, is shown. The output (O) core 1300 can include a fetch port 1305, an output unit 1310 and a switch 1315. The fetch port 1305 can be configured to stream data out from a last portion of the first memory and trigger the output unit 1310. The output unit 1310 can be configured to output data out of the memory processing unit. The switch 1315 can be configured to connect the fetch port 1305 to the adjacent regions of the first memory and the inter-layer-communication (ILC) unit based on configuration information. In one implementation, an output stage can be comprised of a single or multiple output (O) cores 1300.

Figure 15:
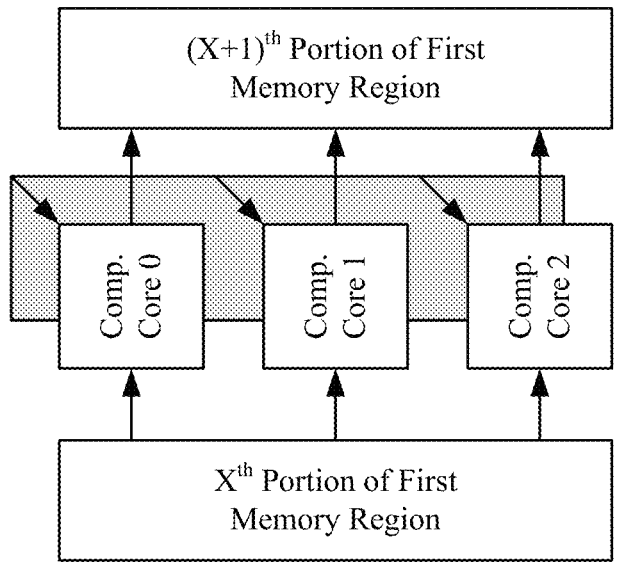
FIGS. 14-17 illustrate a whole channel compute core configuration, in accordance with aspects of the present technology.
Figure 14:
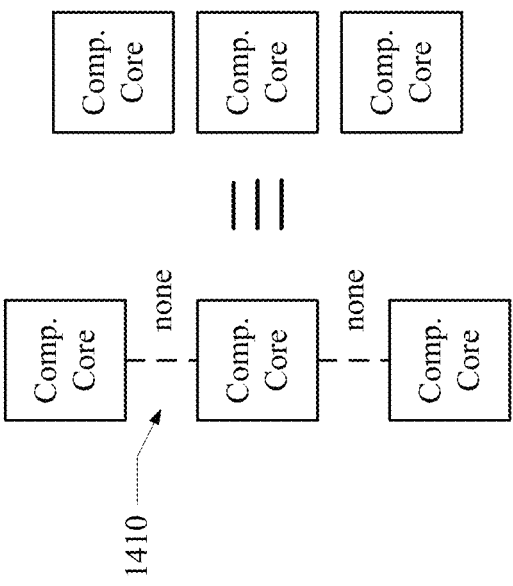
Figure 16:
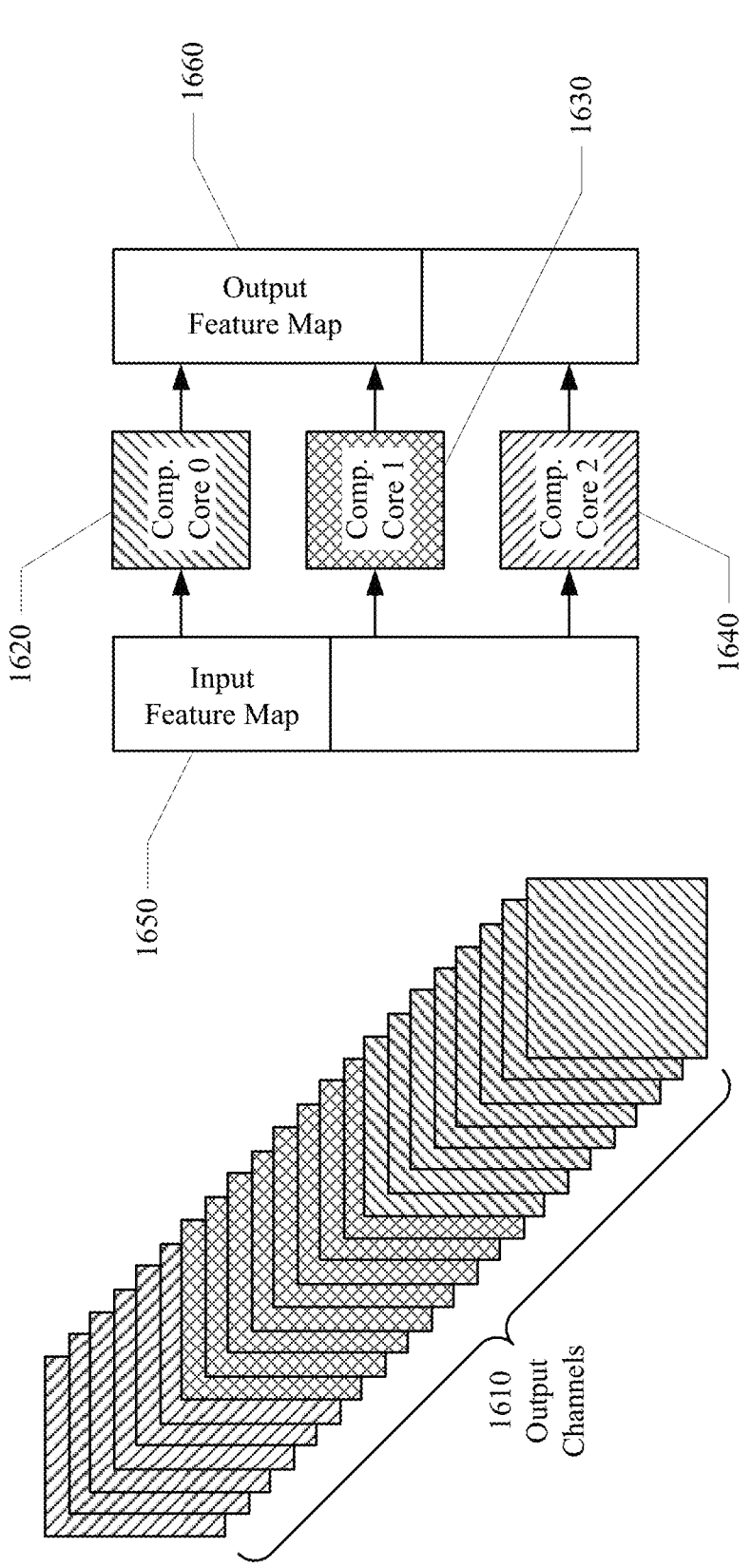
Figure 17:
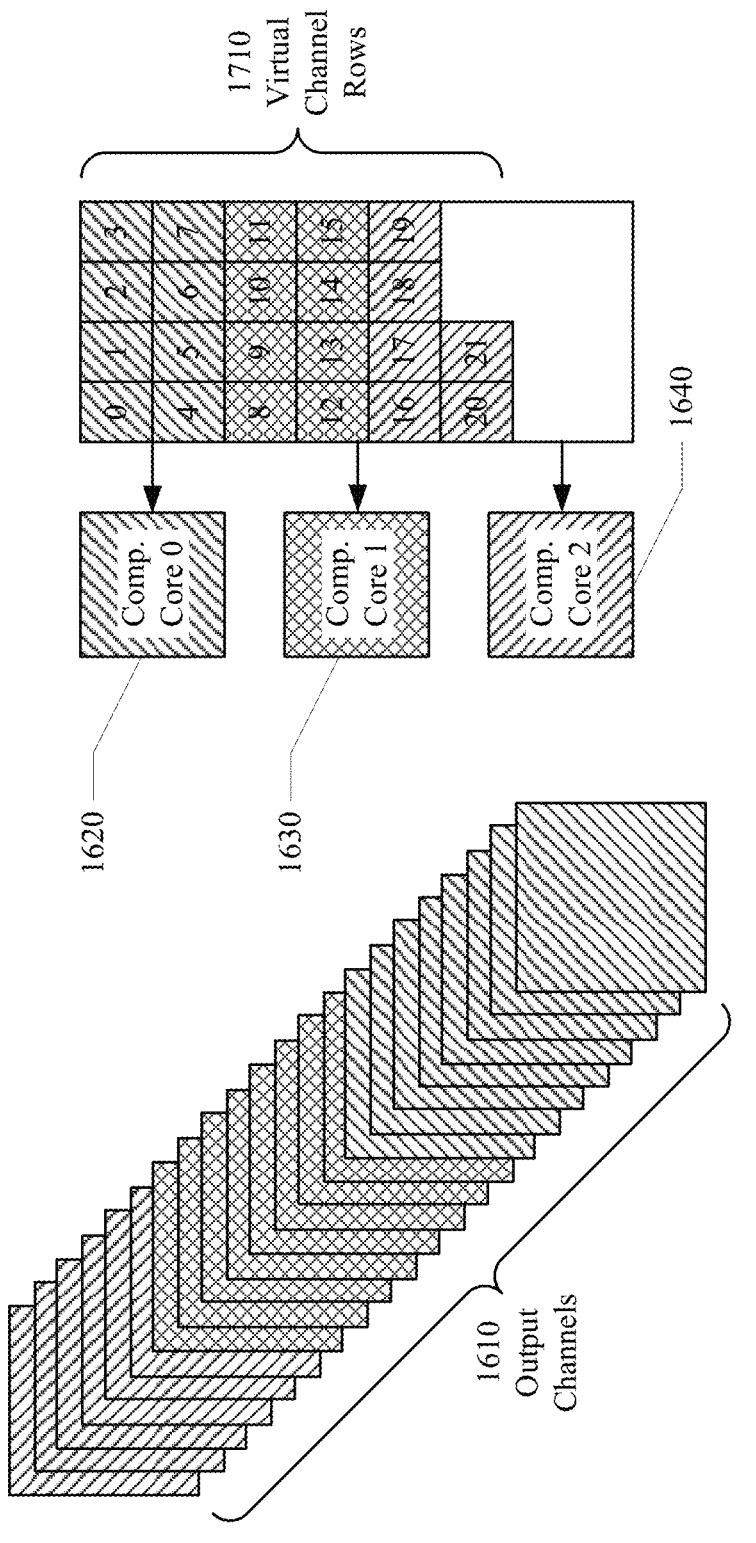

Referring now to FIG. 14, a whole channel compute core configuration, in accordance with aspects of the present technology, is shown. The compute cores, of a given processing region, can be configured in whole channel mode, wherein one or more compute cores perform computations independently of the other compute cores in a respective processing region. In the whole channel mode, the compute cores do not pass data 1410 sequentially from a given compute core to an adjacent compute core. Referring now to FIG. 15, in the whole channel mode, each compute core in the cluster computes a designated number of channels. Each of the cores is responsible for reading data and writing the output result on their own. For example, a whole channel mode configured compute core reads data from the $X^{th}$ portion of the first memory region, and optionally the second memory region, performs a corresponding calculation and stores the result in the $(X+1)^{th}$ portion of the first memory region. The compute cores in whole channel mode do not share data with other compute cores and work as standalone compute cores. Referring now to FIG. 16, an exemplary whole channel compute core configuration is illustrated. In the illustrated example, the mapping unit has 22 output channels 1610 and is mapped to a three-compute core cluster 1620-1640. As illustrated, each compute core has four output physical channels. However, in other implementations, each compute core can have 64 or more output physical channels. An input feature map 1650 is stored in an adjacent first portion of the first memory region, and an output feature map 1660 is stored in an adjacent second portion of the first memory region. As further illustrated in FIG. 17, each compute core 1620-1640 is configured to access weights for the respective output channels. Each compute core is configured to compute a product of the input feature map and the weights of respective sets of the 22 output channels 1710 of the output feature map. Each compute core is responsible for almost one-third of the computation workload. The second memory region can be organized based on output channels, and result in the 22 output channels 1710 mapped into five and halve virtual channel rows. Although, the compute core cluster is illustrated as mapped over a single macro of the second memory region, the compute core cluster can also be mapped over a plurality of macros of the second memory region.

Figure 18:
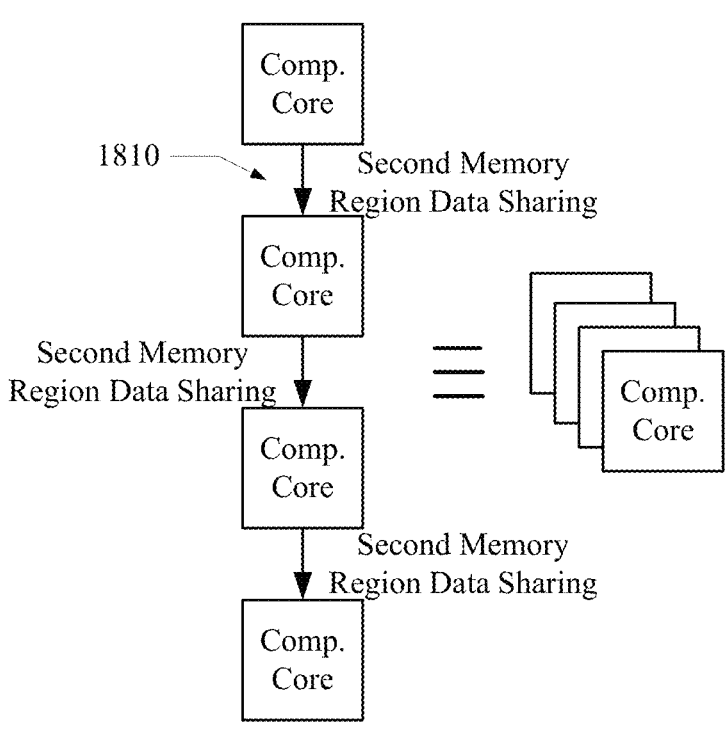
FIGS. 18-21 show a second memory region polymorphic compute core configuration, in accordance with aspects of the present technology.
Figure 19:
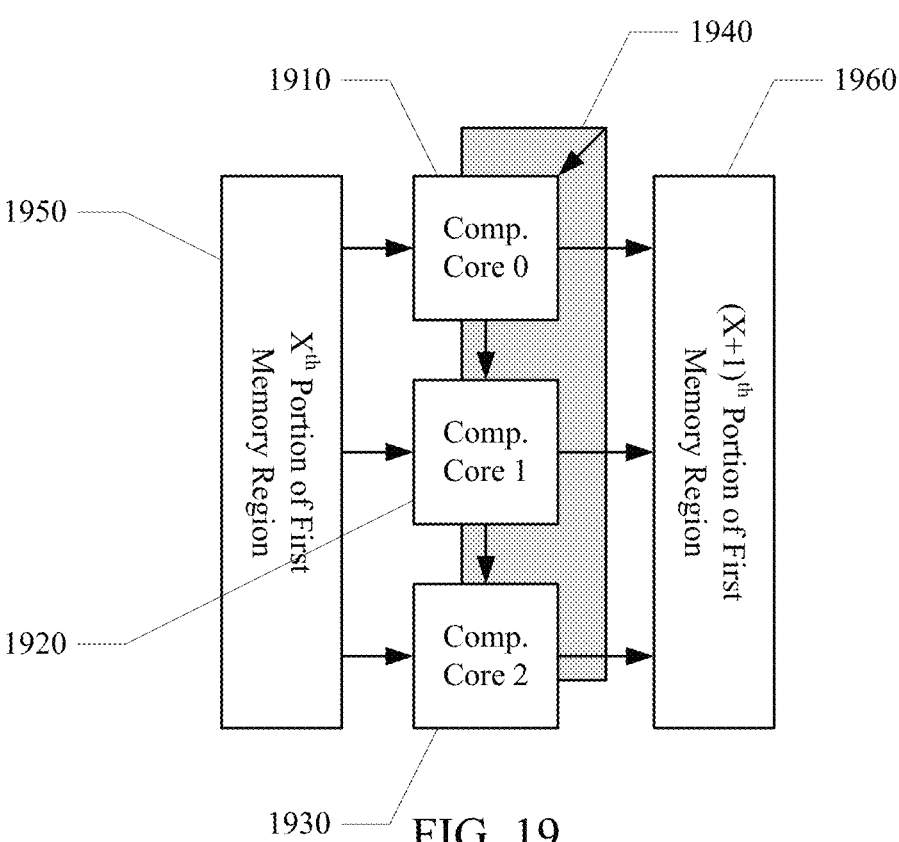
Figure 20:
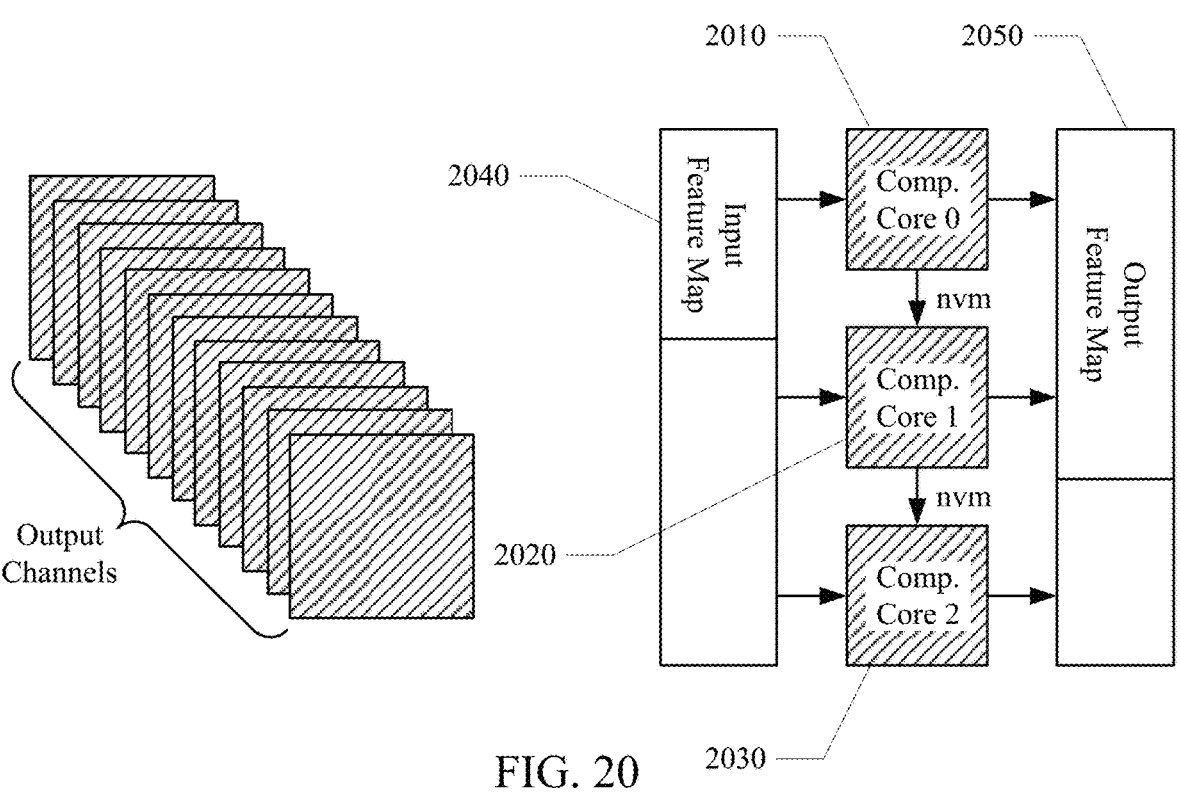
Figure 21:
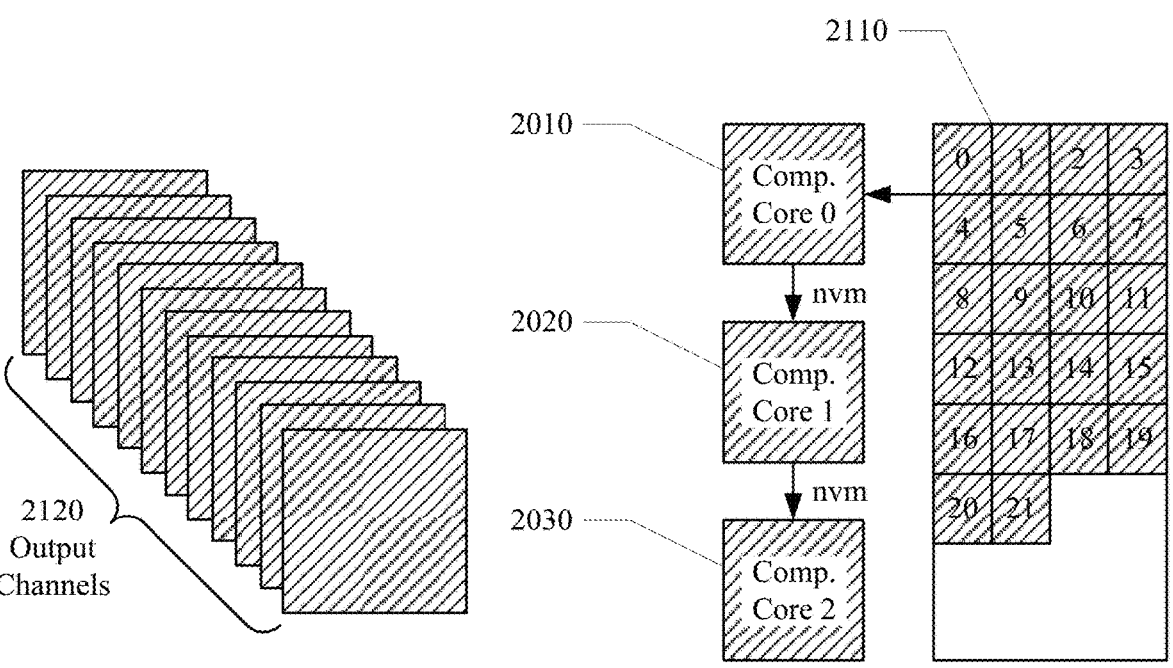

Referring now to FIG. 18, a polymorphic second memory compute core configuration, in accordance with aspects of the present technology, is shown. The compute cores, of a given processing region, can be configured in a polymorphic configuration, wherein one or more compute cores share data from a given portion of the second memory region 1810 with adjacent compute cores. In the polymorphic second memory compute core configuration, each compute core of the cluster can compute all the output channels, but work on different pixels of an output feature map. Accordingly, the other compute cores in the cluster operate as workers for the first compute core. The number of compute cores that can be assigned is the number of mapping unit output feature map pixels. The compute cores of the cluster access a different sequence of data in the second memory region since they are working on different pixels. Such a configuration can be used to reduce the number of access to the second memory region by sharing the data among cores in the cluster. The first compute core 1910 in a polymorphic second memory cluster has access to data in the corresponding portion of the second memory region 1940 and can share the data with the other compute cores 1920, 1930 in the cluster. All the compute cores 1910-1930 in the polymorphic second memory cluster have access to data in the first memory region 1950, and all of the compute cores 1910-1930 can write results to the other adjacent portion of the first memory region 1960, as illustrated in FIG. 19. Referring now to FIGS. 20 and 21, an exemplary polymorphic second memory compute core configuration is illustrated. In the illustrated example, the compute cores 2010-2030 of a cluster can all access input feature map data in a first adjacent portion of the first memory region 2040, as illustrated in FIG. 20. The first compute core 2010 can access data in the second memory region 2110, and share the data with the other compute cores of the cluster 2020, 2030, as illustrated in FIG. 21. In one implementation, the cluster can include 3 compute cores 2010-2030 mapped with a total of 22 output channels. Each compute core can have four physical channels 2120. The top compute core 2010 of the chain is assigned the whole portion of the second memory region 2110 needed by the mapping, and access the whole 22 output channels of data. Each compute core computes all 22 output channels, but for different pixels. The other two compute cores 2020, 2030 of the cluster will access the first compute core 2010 rather than the second memory region 2110 to get weight data. The neighbor access can be done in a dataflow manner without special synchronization. Each compute core 2010-2030 in the cluster can then perform a respective computation and write the results as output feature map data to the other adjacent portion of the first memory region 2050, as illustrated in FIG. 20.

Figure 22:
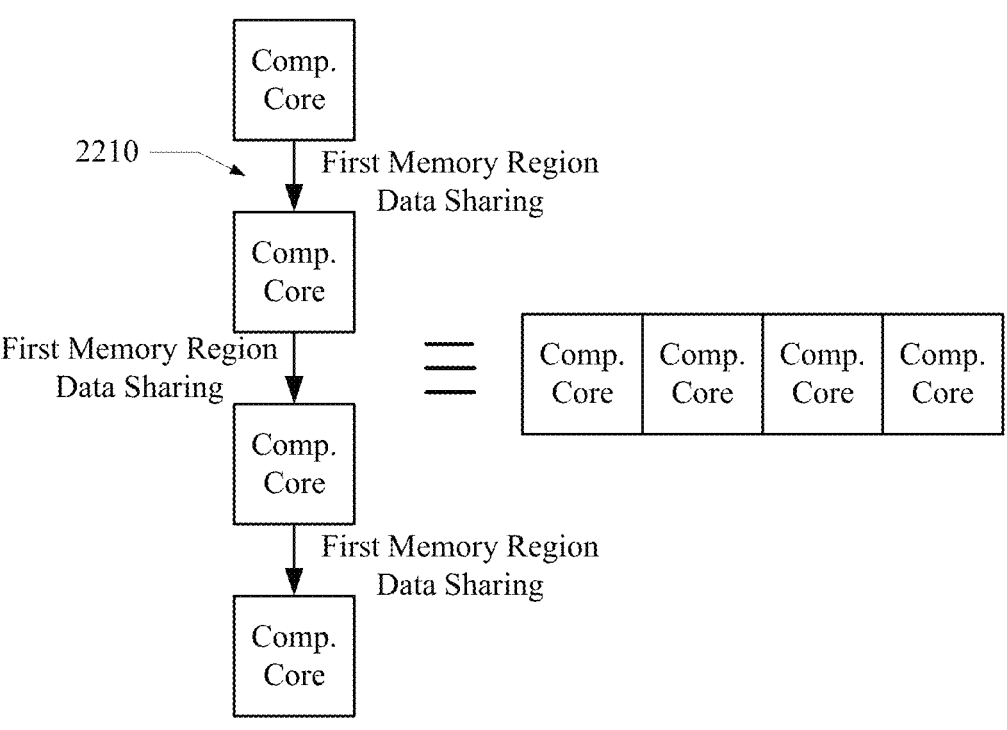
FIGS. 22-25 show a first memory region polymorphic compute core configuration, in accordance with aspects of the present technology.
Figure 23:
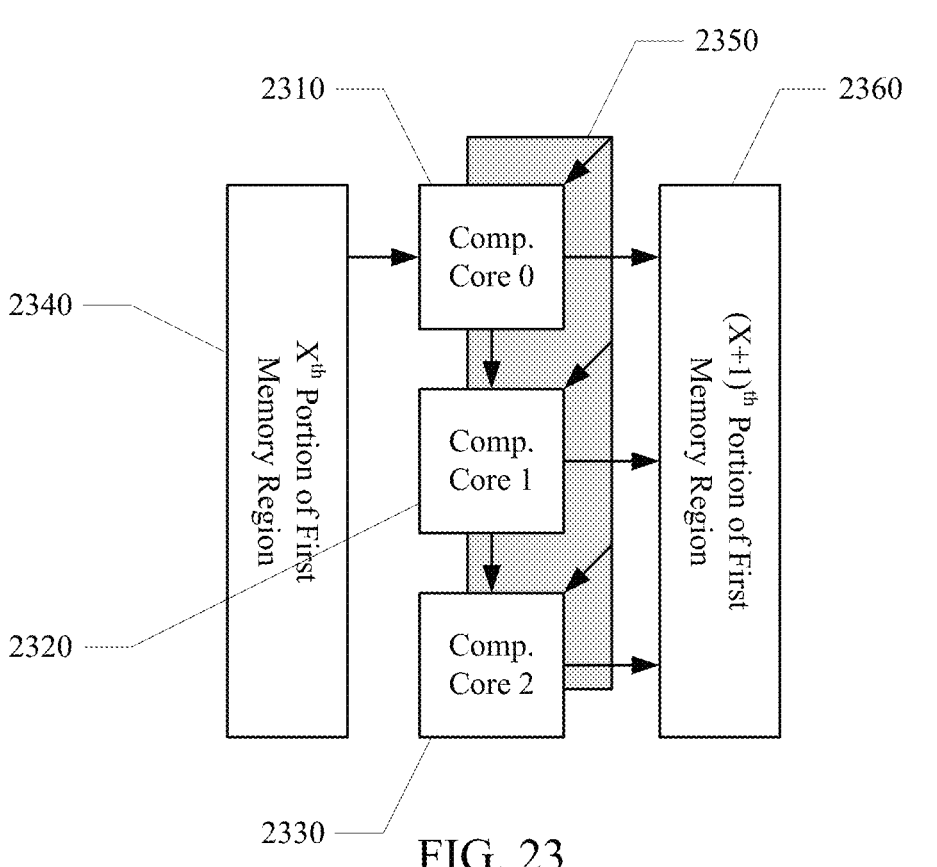
Figure 24:
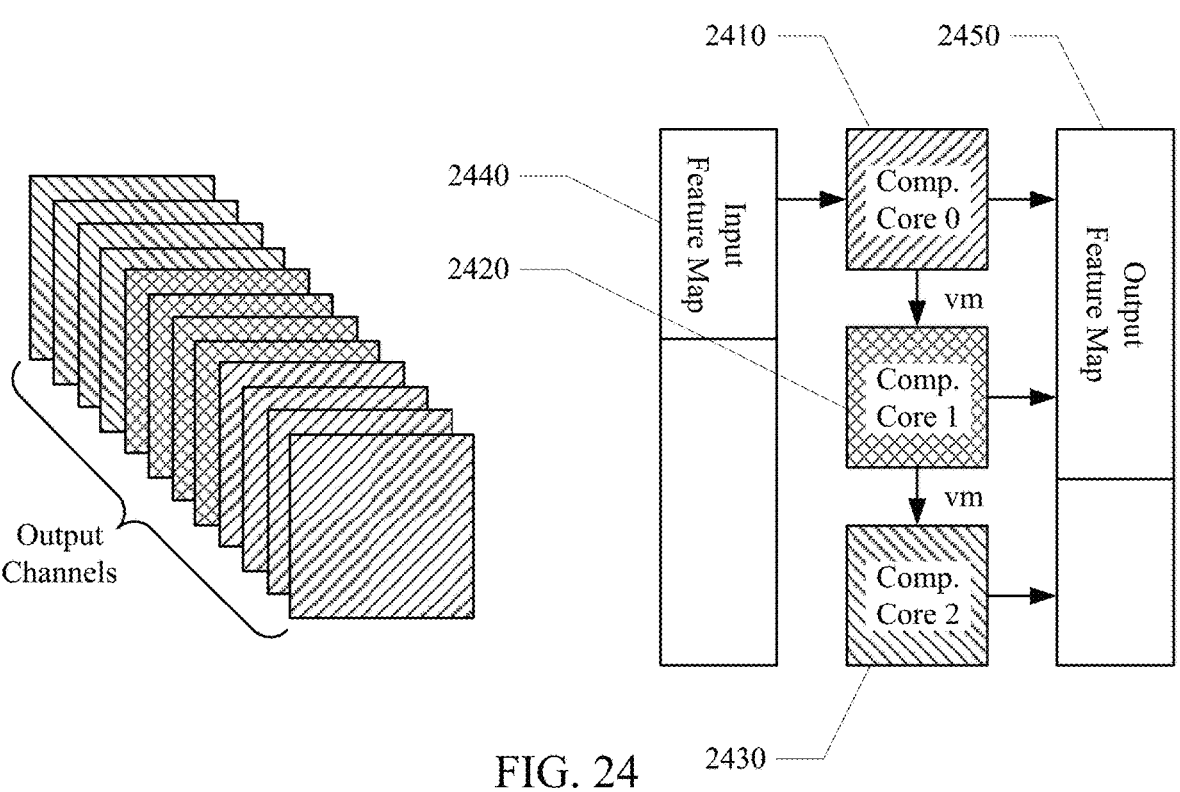
Figure 25:
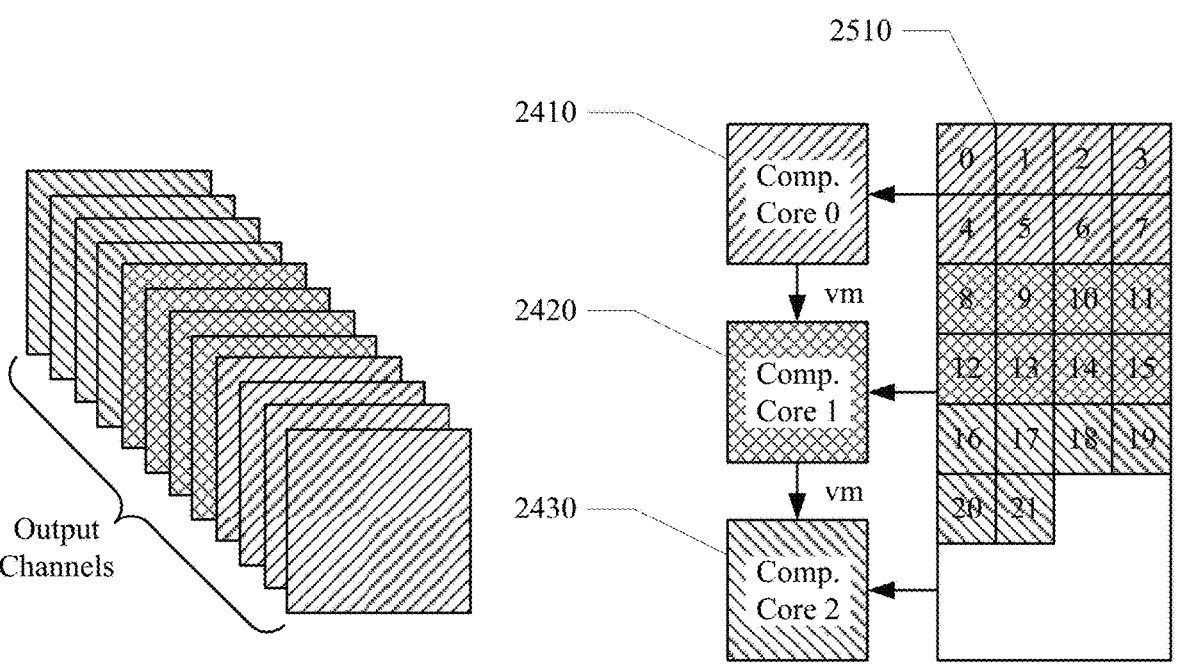

Referring now to FIG. 22, a polymorphic first memory compute core configuration, in accordance with aspects of the present technology, is shown. The compute cores, of a given processing region, can be configured in software in a polymorphic configuration, wherein one or more cores share data from a given portion of the first memory region 2210 with adjacent compute cores. The polymorphic first memory compute core configured cluster is equivalent to a wider core with more physical channels. Such a configuration can be used to improve reuse of data in the first memory region and reduce the total number of accesses to the corresponding portion of the first memory region. It should also be noted that reuse of data in the first memory region is also an inherent property of the compute core configuration of the plurality of processing region in accordance with aspects of the present technology because the compute cores can share data among the physical channels. The first compute core 2310 in a polymorphic first memory compute cluster has access to data in the corresponding portion of the first memory region 2340 and can share the data with the other compute cores 2320, 2330 in the cluster. All the compute cores 2310-2330 in the polymorphic first memory configuration have access to data in the second memory region 2350, and all of the compute cores 2310-2330 can write results to the other adjacent portion of the first memory region 2360, as illustrated in FIG. 23. Referring now to FIGS. 24 and 25, an exemplary polymorphic first memory region compute core configuration is illustrated. In the illustrated example, the first compute core 2410 of a cluster can access input feature map data in a first adjacent portion of the first memory region 2440. The first compute core 2410 can share the data of the input feature map with the other compute cores 2420, 2430 of the cluster, as illustrated in FIG. 24. Each compute core 2410-2430 in the cluster can also access data in the second memory region 2510, as illustrated in FIG. 25. Each compute core 2410-2430 in the cluster can then perform a respective computation and write the results as output feature map data to the other adjacent portion of the first memory region 2450, as illustrated in FIG. 24. The polymorphic first memory compute cluster can be configured by a mapping algorithm that starts by creating a whole-channel cluster, then converting to the first memory region polymorphic compute cluster. In the illustrated three compute core cluster, each core can be responsible for up to one third of the compute workload. The second memory region 2510 can be configured to have four output channels, that can be mapped into five and a half virtual channel rows in the second memory region 2510, as illustrated in FIG. 25.

Figure 26:
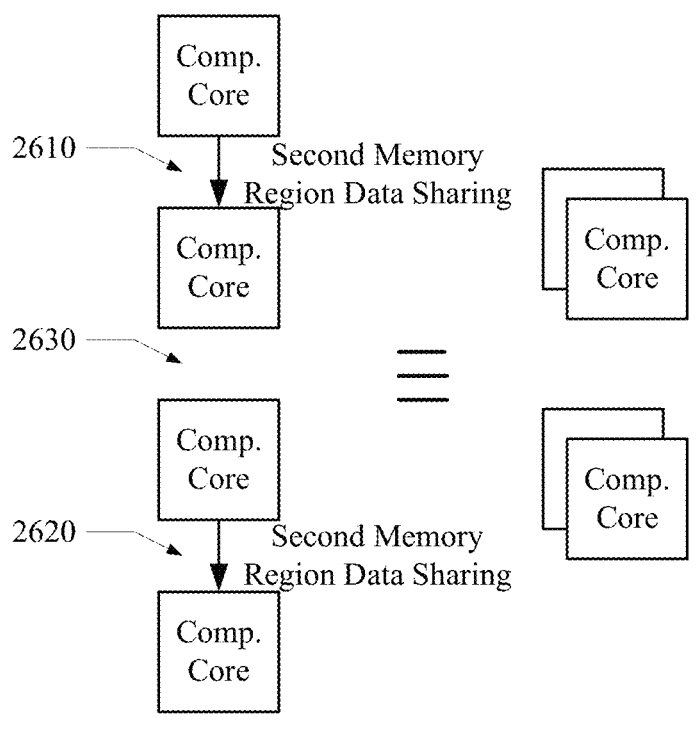
FIGS. 26-29 show a compound compute core configuration, in accordance with aspects of the present technology.
Figure 27:
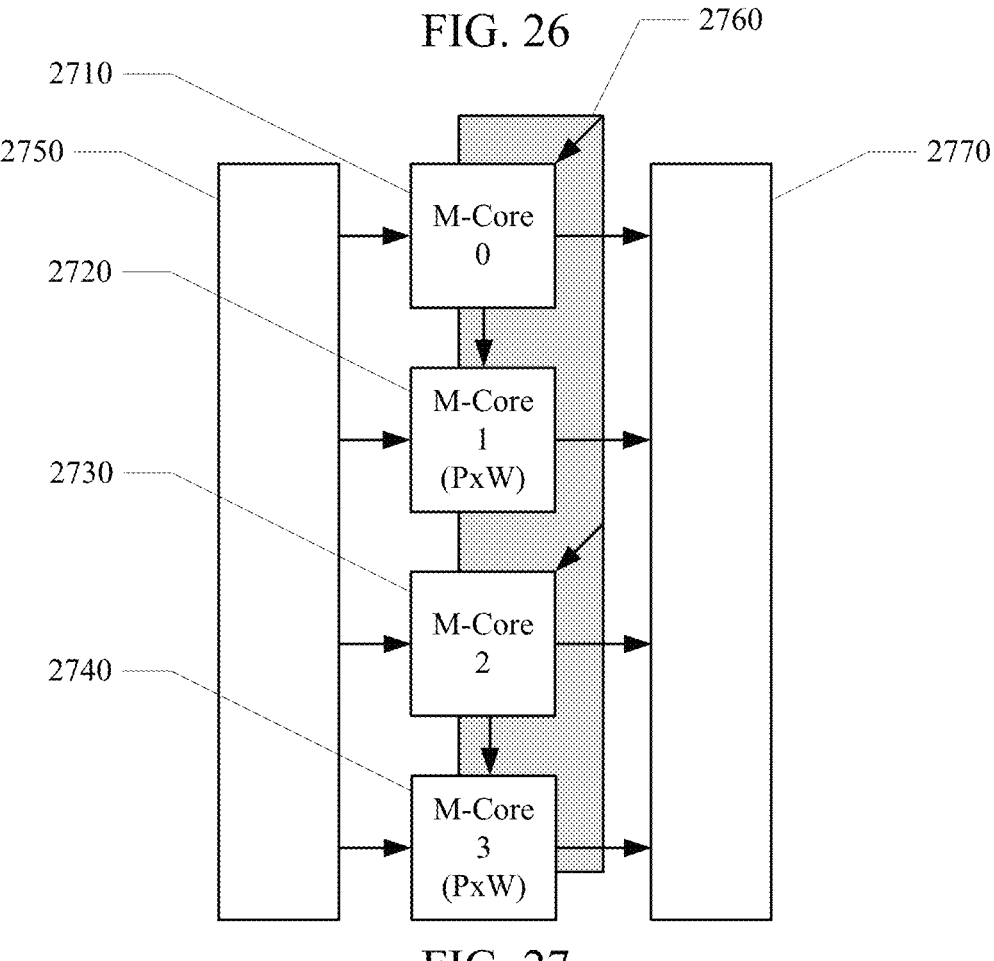
Figures 28, 29:
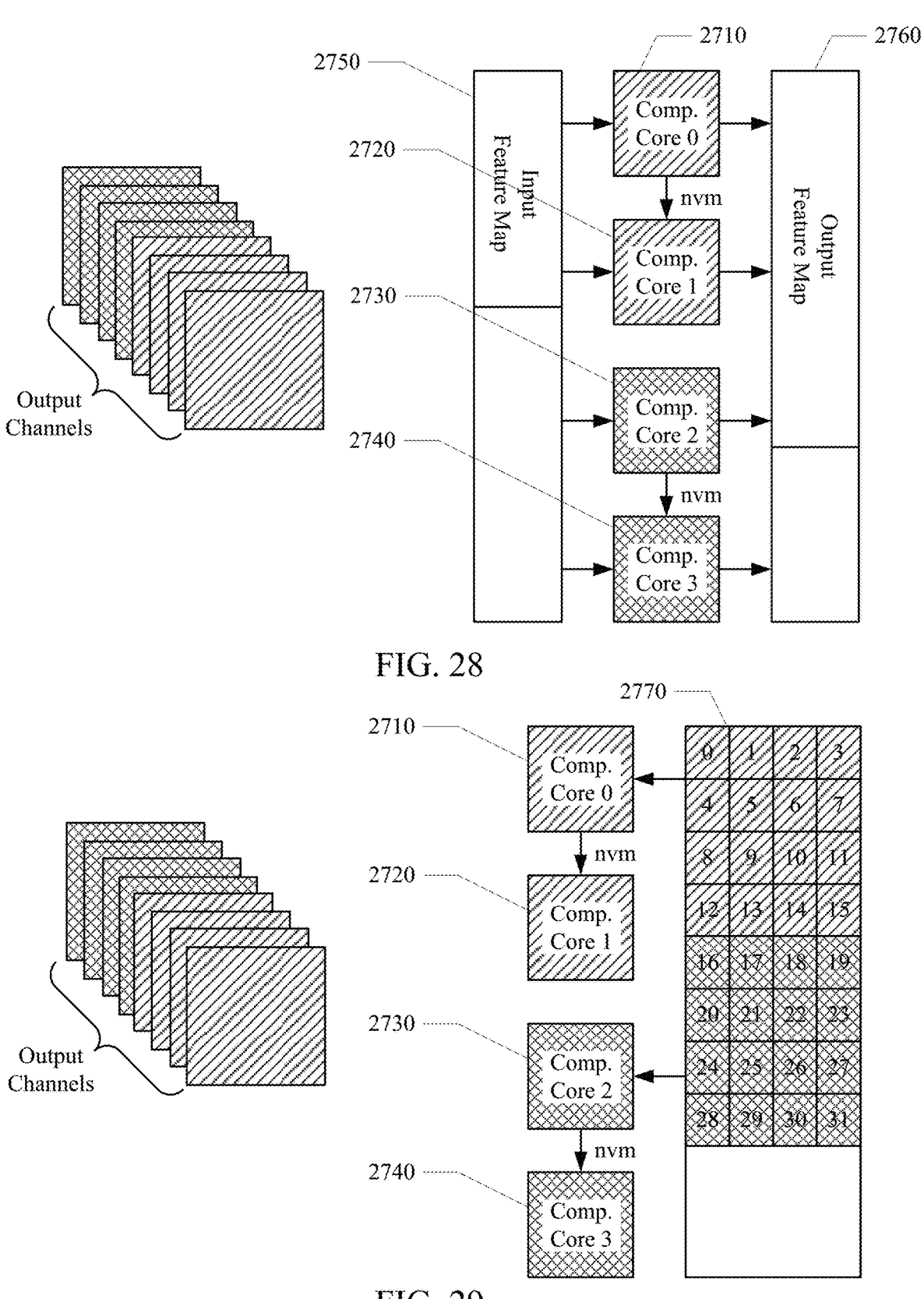

Referring now to FIG. 26, a compound compute core configuration, in accordance with aspects of the present technology, is shown. Each compute core in a cluster, of a given processing region, can access an adjacent portion of the first memory region. The compute cores can also be configured to share data from a given portion of the second memory region 2610, 2620 with adjacent compute cores within the same set. However, compute cores in different sets do not share 2630 data with other compute cores in other sets. The compute cores in each set compute a designated number of output channels and store results into the other adjacent portion of the first memory region. Referring now to FIG. 27, an exemplary compound compute core configuration is illustrated. In the illustrated example, the mapping unit has 22 output channels and is mapped to a four-compute core cluster 2710-2840 including two sets of two compute cores each. For example, a first set can include first and second compute cores 2710, 2720, and a second set can include third and fourth compute cores 2730, 2740. Each set of compute cores can have four physical channels per core. Each compute core 2710-2740 in each set can access input feature map data in the first memory 2750 as illustrated in FIG. 28. The first compute cores 2710, 2730 in a respective set can access weight data in a respective set of output channels in the second memory 2770, as illustrated in FIG. 29. The first compute core in a first set 2710 can be configured to share data from the second memory 2770 with the other compute cores in the first set 2720. Similarly, a first compute core in a second set 2730 can be configured to share data from the second memory 2770 with the other compute cores in the second set 2740. Each compute core 2710-2740 of each set can store result back as output feature map data to the other adjacent portion of the first memory 2760. Accordingly, each set of two compute cores act as standalone pixel computing groups. However, the whole result is computed using the two sets of pixel computing groups. At a top level, each of the pixel computing groups can be treated as a standalone compute core set, and the workload can be distributed between them in a whole-channel way.

Figure 30:
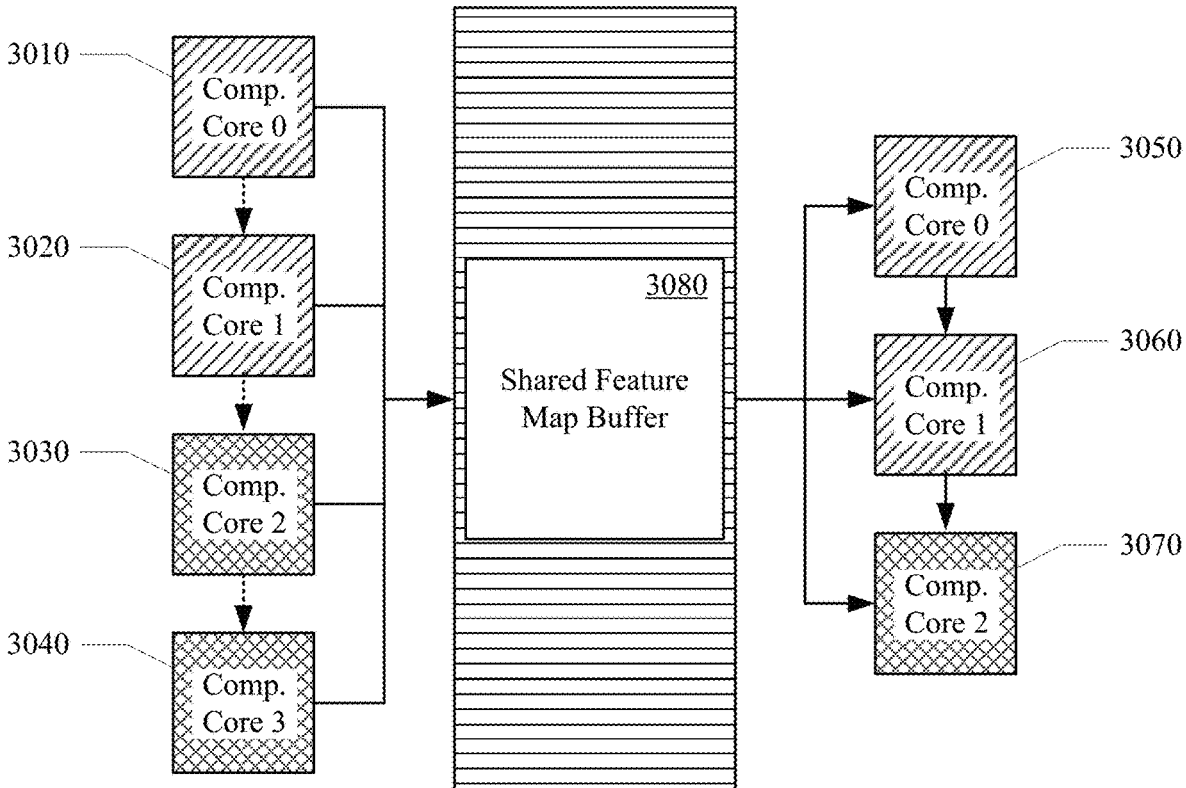
FIG. 30 shows a first memory region sharing feature of the memory processing unit (MPU), in accordance with aspects of the present technology.

Referring now to FIG. 30, a first memory region sharing feature of the memory processing unit (MPU), in accordance with aspects of the present technology, is shown. As illustrated, the dataflow of computations by the MPU can be visualized as a series of producers 3010-3040 and consumers 3050-3070. For example, a compute core cluster 3010-3040 can consume input feature map data from a first portion of the first memory region and produce feature map data that can be an input to a next compute core cluster 3050-3070 to use. It is to be appreciated that data sharing in general between conventional computing units tends to be a significant obstacle to conventional dataflow accelerators. Therefore, conventional processing units may utilize network-on-chip and or data duplications. In contrast, the MPU in accordance with aspects of the present technology enables a much simpler data sharing technique, wherein producers and consumers write and read to a shared memory buffer 3080.

The buffers 3080 are interleaved portions of the first memory between the plurality of processing regions. Accordingly, data can flow between clusters in the same processing region and or adjacent processing regions. In one implementation, a software layer can be configured to organize the clusters to ensure such adjacency. In the example of FIG. 30, two compute core clusters 3010-3040 and 3050-3070 in two different processing regions share a buffer 3080 in a portion of the first processing region. It is to be appreciated that there is no direct communication between the producer and the consumer compute cores. Compute cores in a compute cluster do not directly synchronize with each other. However, compute cores in a compute cluster can be configured to directly communicate data with each other.

Figures 31A, 31B:
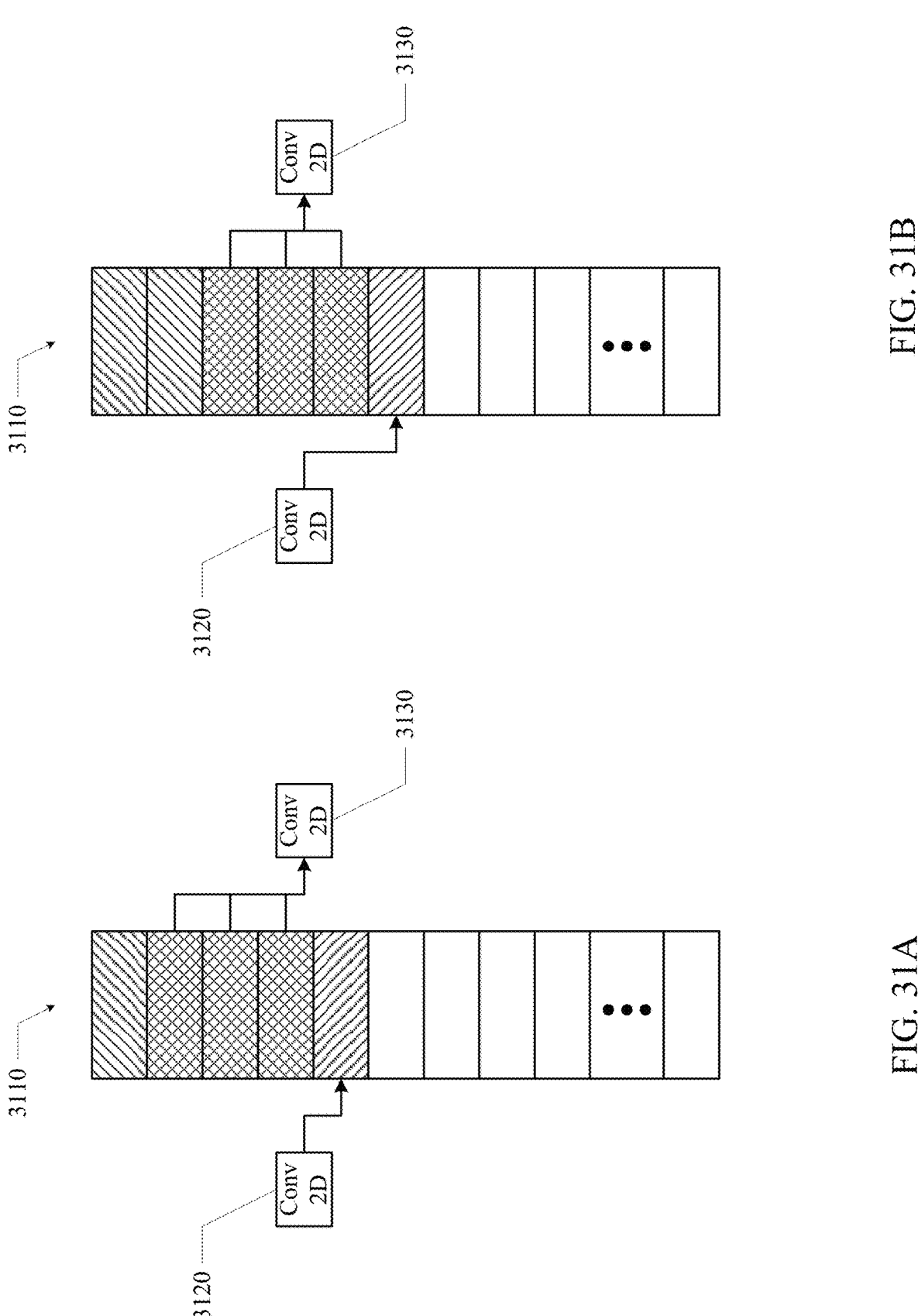
FIGS. 31A and 31B illustrate an exemplary buffer utilization by a consumer and a producer, in accordance with aspects of the present technology.
Figures 32A, 32B, 32C, 32D:
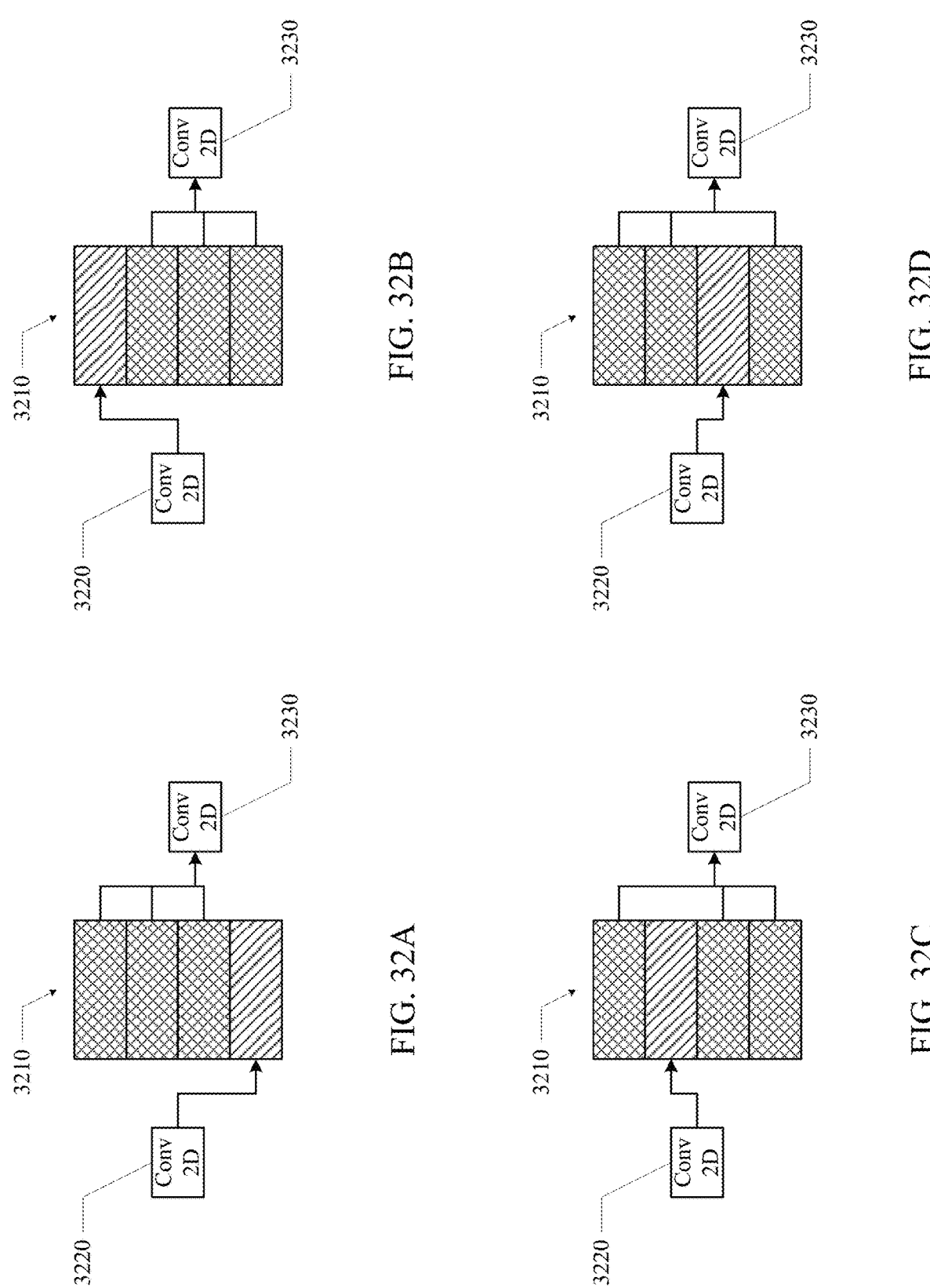
FIGS. 32A-32D illustrate an exemplary shared partial buffer for a 3×3 kernel size, in accordance with aspects of the present technology.

In one implementation, data can be shared between processing regions by assigning a large enough buffer in the corresponding portion of the first memory. For example, the buffer can be allocated to carry a whole feature map shared between adjacent processing regions. However, assigning the whole feature map size as a buffer is not enough for the data to flow. Consumers need to avoid reading a buffer entry that is not filled yet by the producer. Assuming a coarse-grain synchronization of the feature map row level, the consumer cannot read from a feature map row that is still being produced. For the sake of simplicity, each feature map row will be illustrated as a single buffer entry in FIGS. 31-36. However, it is appreciated that a single row may require the storage of hundreds, thousands, or even more entries. Referring now to FIGS. 31A and 31B, an exemplary buffer utilization by a consumer and a producer is illustrated. The illustrated buffer 3110 is sized to store a full feature map. The producer 3120, for example, can be performing a two-dimensional convolution, and the consumer 3130 can be performing a two-dimensional convolution having a 3×3 kernel size. The producer core 3120 can generate the pixels of a given feature map row before producing the pixels of a next row. In such case, the producer core 3120 only blocks a single row entry as illustrated in FIG. 31A. As the producer core 3120 generates the pixels of a given feature map row, the consumer core 3130 can access the pixels values of the previous three rows. After the producer core 3120 is done generating the pixels of the given row, the producer core 3120 can move to generate the pixels of the next row as illustrated in FIG. 31B. At that point, the consumer core 3130 can shift its consumption to a next three row window if the consumer core 3130 is ready to start processing the next three row window. Furthermore, it is noted that the rows that have already been consumed can remain in the buffer 3110 until overwritten by the producer core 3120 as processing continues. It is appreciated that the consumer 3130 of a 3×3 kernel consumes three buffer entries simultaneously while the producer 3120 generates data for one entry before moving to the next one. Furthermore, a number of entries in the buffer 3110 are not in use at any given time. Therefore, the full feature map sized buffer 3110 can waste resources in the memory processing unit (MPU).

In another implementation, a smaller partial buffer can be sufficient for the dataflow to support the computations. For example, a circular queue can be utilized as a partial buffer. The partial buffer can be configured to carry enough data for the consumer to operate and have extra entries to allow the producer to generate data while the consumer is working. For example, the partial buffer can include three feature map rows in the case where the consumer is performing a convolution having a 3×3 kernel size. The partial buffer can also include extra entries, referred to as a pipeline margin. Without such a margin, the dataflow performance will degrade since the producer and consumer will not be able to work concurrently. The producer also cannot overwrite data that is not yet consumed, and the consumer needs to wait for the producer to finish writing a new row in the partial buffer before starting to consume it. In certain situations, if the system lacks adequate feature-map memory, the compiler may choose to forgo the use of the margin buffer. This could potentially lead to a drop in performance, yet it enables the accommodation of larger neural networks on smaller systems. Referring now to FIGS. 32A-32D, an exemplary shared partial buffer 3410 for a 3×3 kernel size is illustrated. As illustrated, a producer 3220 generates pixel data for a given row before moving on to the next row, and the consumer 3230 accesses three rows of data at a time. By utilizing a partial buffer 3210, the size of the shared buffer 3210 can be reduced to as littles as four rows. For example, in a first cycle the consumer 3230 can be accessing the first three rows of pixel data, and the producer 3220 can be generating data for storing in the fourth row. In a second cycle, the consumer 3230 can be accessing the second through four rows of data, while the producer 3220 is storing data in the first row. In a third cycle, the consumer 3230 can access data in the third, fourth and first rows, while the producer 3220 stores data in the second row. In a fourth cycle, the consumer 3230 can access the fourth, first and second rows, while the producer 3220 stores data in the third row. Thereafter, the first through fourth cycles can be iteratively repeated any number of times. Accordingly, the four-row shared partial buffer can allow the producer and consumer to work smoothly.

Figures 33A, 33B:
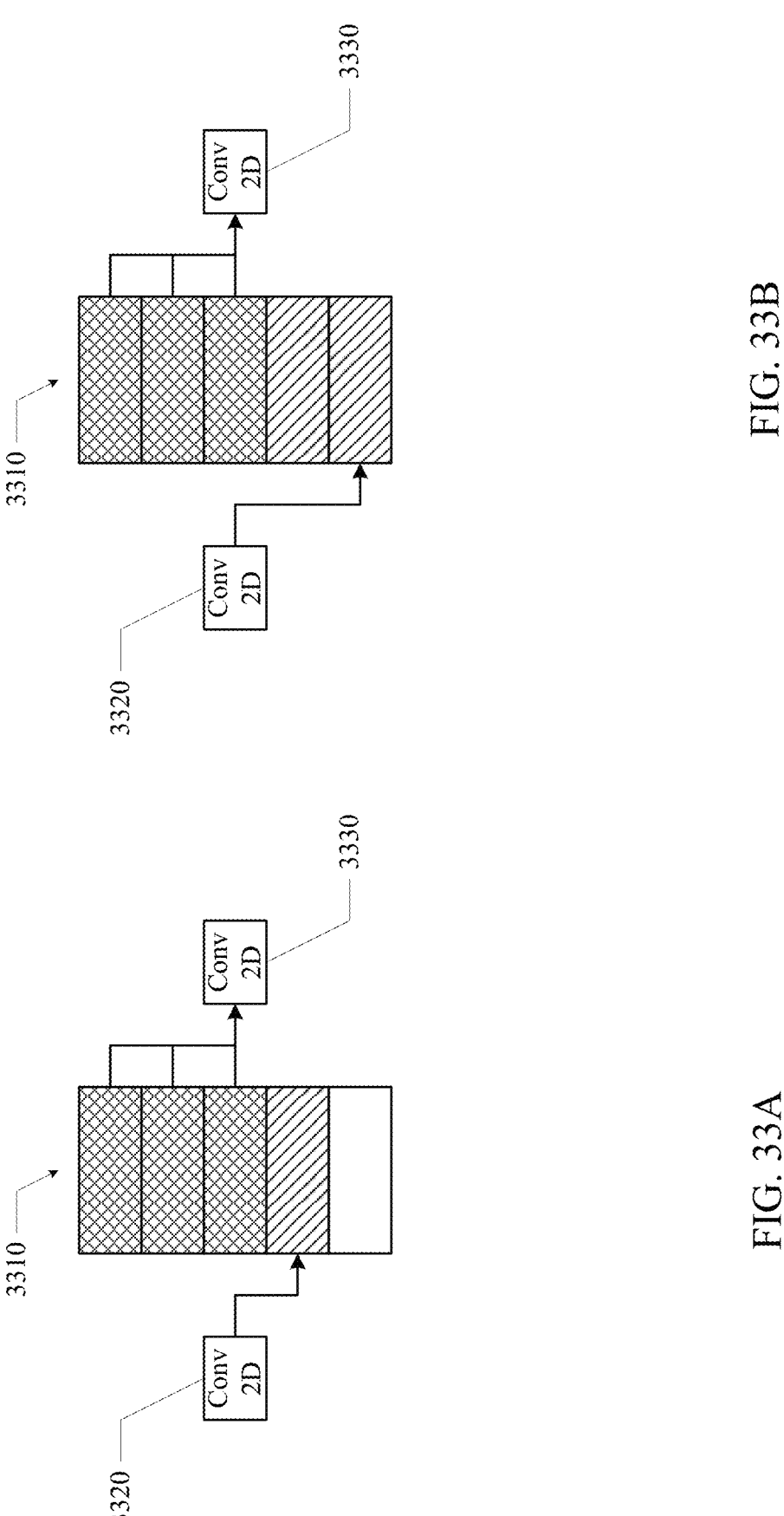
FIGS. 33A and 33B illustrate an exemplary shared partial buffer for a 3×3 kernel size with a 2×2 stride, in accordance with aspects of the present technology.

Referring now to FIGS. 33A and 33B, an exemplary shared partial buffer for a 3×3 kernel size with a 2×2 stride is illustrated. A consumer 3330 having a stride of 2×2 moves its window two rows at a time. Therefore, a pipeline margin of two is needed to allow the producer to generate the necessary rows for the consumer window shift. For example, a producer 3320 can store data in a fourth and fifth row, while the consumer 3330 accesses data in the first through third rows. After the producer 3320 stores data in the fourth and fifth rows, the consumer 3330 can move to accessing data in the third through fifth rows, while the producer 3320 stores data in the first and second rows.

Figure 34:
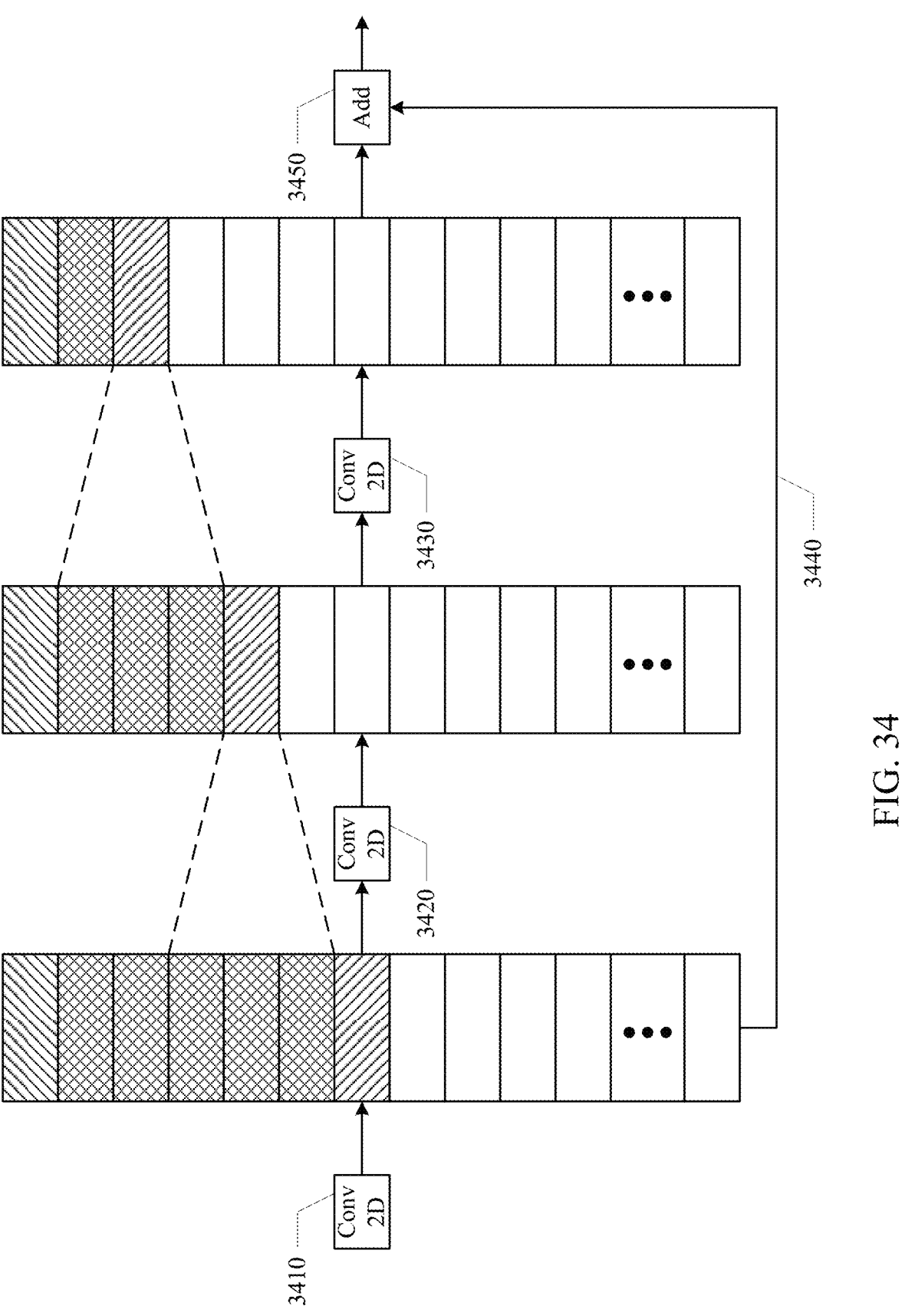
FIG. 34 illustrates an example branching dataflow utilizing a full feature-map buffer, in accordance with aspects of the present technology.

For ease of explanation, aspects of the present technology have been described with regard to a single producing cluster and a single consuming cluster. However, dataflow in the memory processing unit (MPU) can involve dataflow branching into multiple paths that can for example end as different outputs, merge again, and the like. While branching output can be treated the same as multiple single dataflow paths, merging branches can involve additional considerations. If a neural network with merging branches, for example, is not allocated the correct buffer size, the dataflow pipeline might end up in a deadlock or produce incorrect data. With data having multiple consumers, the data validity should be set by the slowest consumer. Typically, a longer data lifetime results in a need for a larger buffer size. Referring now to FIG. 34, an example branching dataflow utilizing a full feature-map buffer is illustrated. As illustrated, a first producer 3410 can perform a convolution (Conv2D) operation, which is consumed by two branches. A first branch, can for example, include a series of two convolution (Conv2D) operations 3420, 3430 of a kernel size of 3×3. A second branch can include a skip connection 3440, for example. The two branches can then be merged together, for example, with the aid of an addition (Add) operation 3450. Each of the convolution (Conv2D) operations 3420, 3430 in the first branch need three ready rows to access for input data. In addition, an extra row is also needed as a pipeline margin. The add operation 3450 does not have any kernels and therefore only needs a single ready row to operate. However, the producer data cannot be outdated based on the convolution (Conv2D) consumers 3420, 3430. Data needs to stay in the buffer until the Add merge node 3450 is ready to use it.

Figure 35:
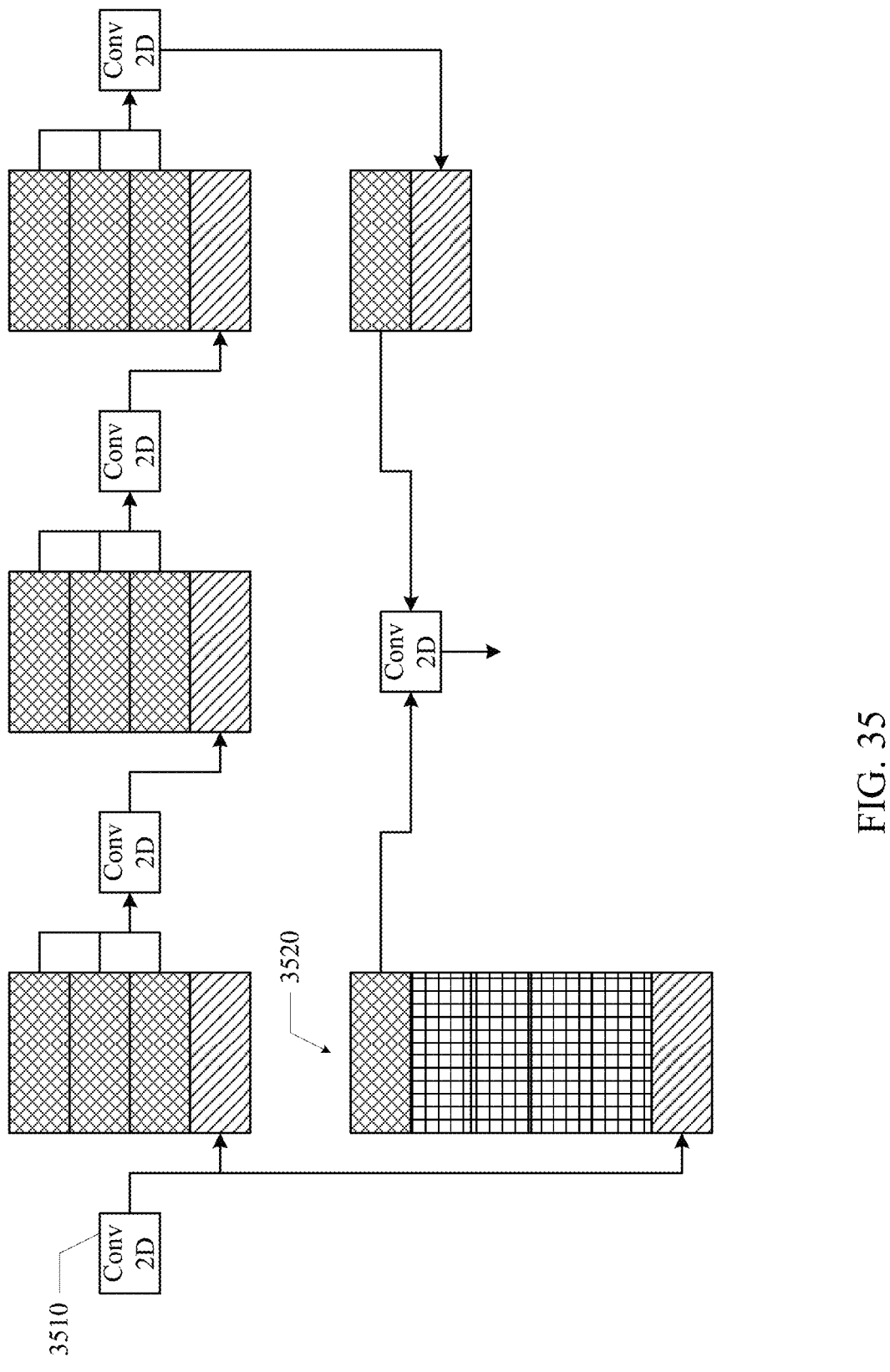
FIG. 35 illustrates an exemplary branching dataflow utilizing a partial feature-map buffer, in accordance aspects of the present technology.
Figure 36:
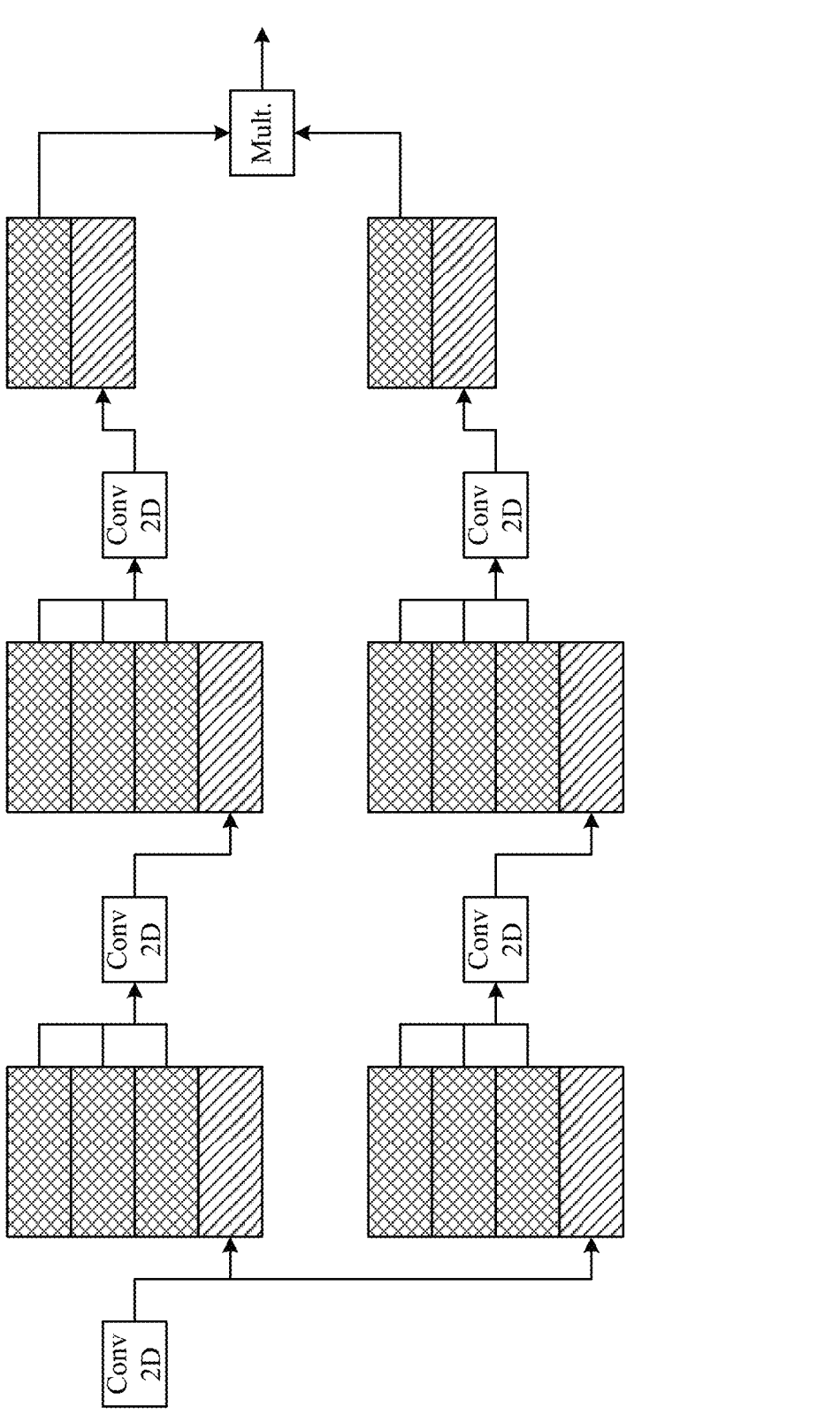
FIG. 36 illustrates an exemplary branching dataflow utilizing a partial feature-map buffer, in accordance aspects of the present technology.

Referring now to FIG. 35, an exemplary branching dataflow utilizing a partial feature-map buffer is illustrated. As illustrated, the producer 3510 at the start of the branch produces two sets of data for consumers (with the aid of bypass operations) of the two branches to facilitate data synchronization. The faster branch is configured to buffer 3520 more data to align with the slower branch, which can be referred to as the branch delay data. It is to be appreciate that not all branches require a delay buffer. For example, balanced branches do not require extra data storage, as illustrated in FIG. 36. As illustrated, each of the two branches can be configured with a typical size of partial buffer as if each branch is the only data path.

The inter-layer-communication (ILC) unit can be configured to synchronize data movement between one or more compute cores producing given data and one or more other compute cores consuming the given data. Data communication within the memory processing unit can include direct and indirect connections between two modules. Direct synchronization can be implemented by direct wire connections with a producer/consumer handshake. The direct synchronization can be implemented by polymorphic connections between compute cores.

The inter-layer-communication unit can also synchronize indirect connections between two modules. Indirect synchronization can be implemented by use of a buffer between two modules. Indirect synchronization by the inter-layer-communication unit can be implemented as communication between compute cores and volatile memory (e.g., SRAM). In such an implementation, a producer compute core can write to a shared buffer in a corresponding first memory region and a consumer compute core can read from the shared buffer. The data can be synchronized to avoid data hazards that can occur in the buffer. Exemplary data hazards can include a producer core overwriting data to a buffer before a consumer core can read data from the buffer, or a consumer core reading data from a buffer before the producer core can write the data to the buffer. In one implementation, indirect synchronization can be implemented by the compute cores sending appropriate signals to the buffer to provide visible synchronization. In visible indirect synchronization, the buffers between the compute cores can act as a simple memory used for writing and reading data. The producer core can be configured to ensure that the consumer core is ready for data, and the consumer core can be configured to ensure that there is enough data in the memory so that it can perform a computation operation.

In another implementation, indirect synchronization can be implemented by the ILC unit to provide invisible synchronization. In the invisible indirect synchronization the ILC unit is responsible for keeping producer compute cores and consumer compute cores in synchronization.

Figure 37:
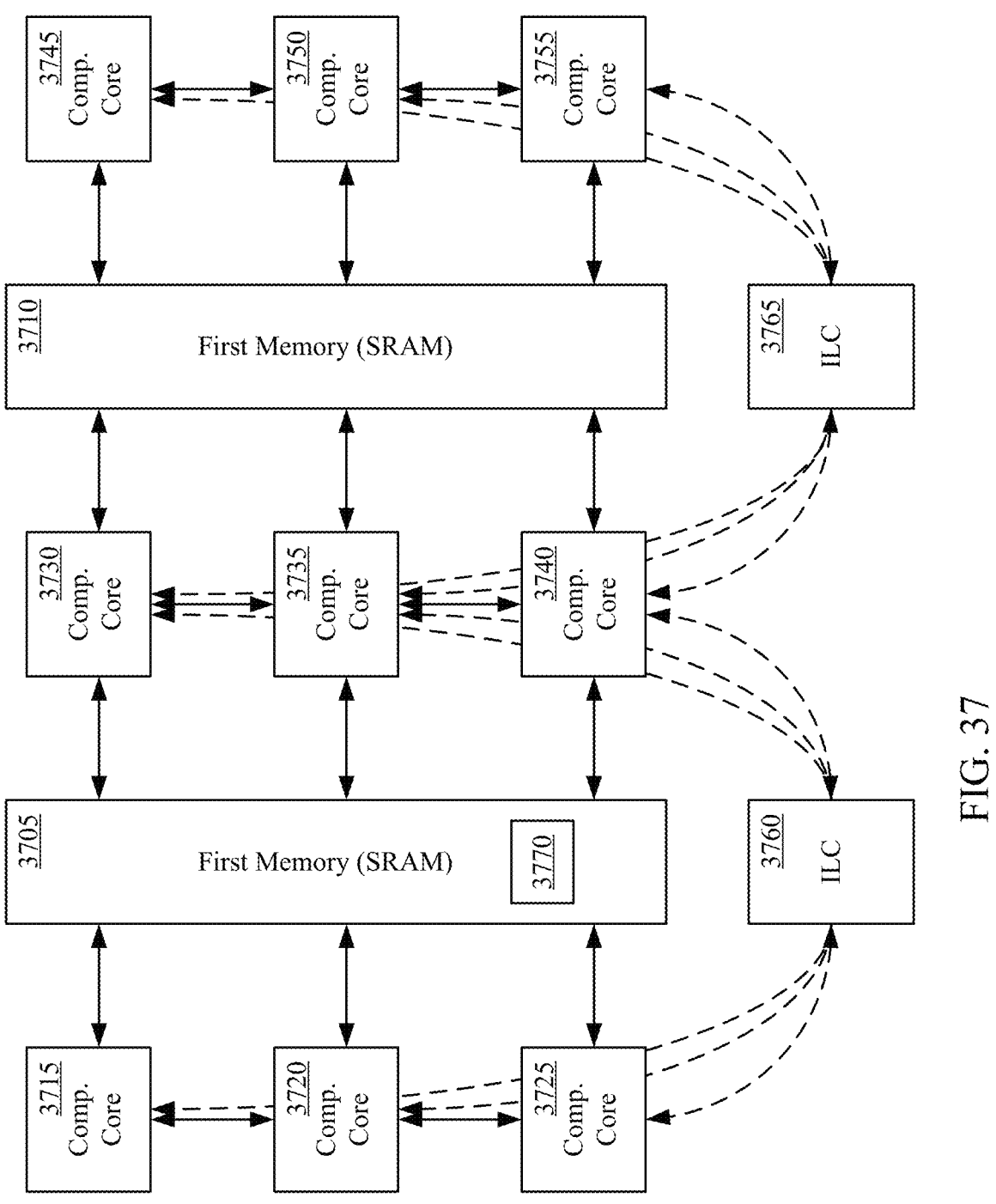
FIG. 37 shows a memory processing unit (MPU), in accordance with aspects of the present technology.

Referring now to FIG. 37, a memory processing unit (MPU), in accordance with aspects of the present technology, is shown. The memory processing unit can include a first memory including a plurality of regions 3705-3710, a plurality of compute cores 3715-3755 organized in a plurality of processing regions, a second memory (not shown) and an inter-layer-communication (ILC) unit 3760-3765. The memory processing unit MPU can be arranged as described above with reference to FIGS. 2-5. In one implementation, the inter-layer-communication (ILC) unit 3760-3765 can include a plurality of inter-layer-communication (ILC) modules, wherein each inter-layer-communication (ILC) module 3760, 3765 controls data movement through a corresponding regions of the first memory 3705, 3710, between one or more compute cores producing given data and one or more other compute cores consuming the given data.

In one implementation, data flow between compute cores 3715-3725 of one or more of a plurality of processing regions and corresponding adjacent ones of the plurality of regions of the first memory 3705 can be configured utilizing direct synchronization between the compute cores and the first memory. Similarly, data flow between the second memory (not shown) and the compute cores 3715-3755 of the one or more of the plurality of processing regions can be configured utilizing direct synchronization between the compute cores 3715-3755 and the second memory. Data flow between compute cores 3715-3725 within respective ones of the one or more of the plurality of processing regions can also be configured utilizing direct synchronization between adjacent compute cores within the respective processing region.

The inter-layer-communication (ILC) unit 3760-3765 can synchronize data movement between one or more compute cores 3715-3725 producing given data and one or more other compute cores 3730-3740 consuming the given data utilizing indirect invisible synchronization. Data movement synchronization by the inter-layer-communication (ILC) unit 3760-3765 will be further described with reference to FIGS. 38-40. Referring now to FIG. 38, an inter-layer-communication method, in accordance with aspect of the present technology, is shown. The inter-layer-communication (ILC) unit 3760-3765 can be configured to receive synchronization commands related to respective buffers 3770 of respective ones of the plurality of regions of the first memory 305 from respective compute cores 3715-3755 of the plurality of processing regions, at 3810. For example, inter-layer-communication (ILC) unit 3760-3765 can receive synchronization commands from a first one 3720 of the plurality of compute cores 3715-3755 related to writing data to a shared buffer 3770 in a first portion of the first memory 3705. In one implementation, a producer compute core can send an increment synchronization command when it finishes writing a whole feature-memory row to the buffer. The inter-layer-communication (ILC) unit 3760-3765 can also receive access commands from a second one 3730 of the plurality of compute cores 3715-3755 related to reading data from the shared buffer 3770 in a first portion of the first memory 3705. In one implementation, a consumer compute core can send a decrement synchronization command when it finishes reading a whole feature-memory row from the buffer.

At 3820, the inter-layer-communication (ILC) unit 3760-3765 can track read and write accesses to the respective buffers of respective ones of the plurality of regions of the first memory. In one implementation tracking is done on a coarse grain level, such as a whole feature-map row level. In one implementation, the inter-layer-communication (ILC) unit 3760-3765 can track access to respective buffers with corresponding respective indexes to point to an ILC entry. The inter-layer-communication (ILC) unit 3760-3765 does not need to store buffer region boundaries or other information about the buffer. Instead, the compute cores 3715-3755 can be responsible for accessing the correct ILC entry index that corresponds to a respective shared buffer. In one implementation, an identifier of a given compute core 3720 received in a synchronization command can be mapped to a count associated with a given region (e.g., buffer) of a given portion of the first memory 3705.

Figure 39:
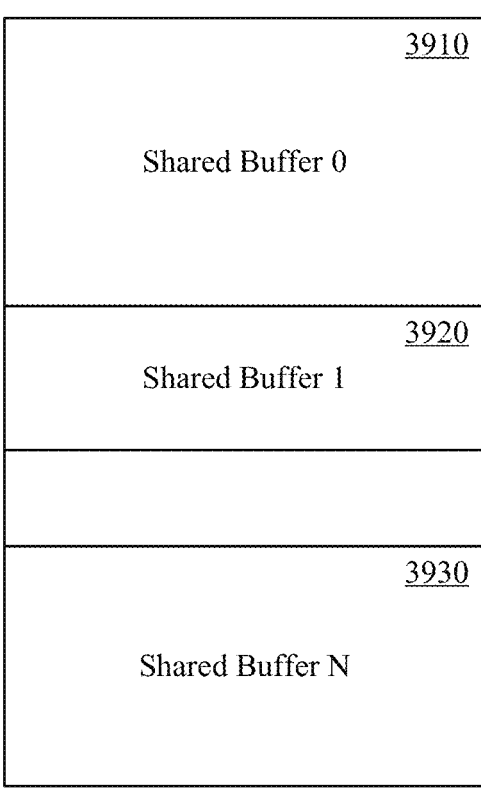
FIG. 39 shows respective shared buffers and corresponding respective ILC entry indexes, in accordance with aspects of the present technology.

Referring now to FIG. 39, respective shared buffers 3910-3930 and corresponding respective ILC entry indexes 3940-3960, in accordance with aspects of the present technology, are shown. Each ILC entry index can include a count of the number of synchronization units that one or more producer compute cores have produced (e.g., written) to the corresponding respective shared buffer, and one or more consumer compute cores have yet to consume (e.g., read) from the corresponding respective shared buffer. In one implementation, the ILC entry index can include a current unit count $(i_c)$, a maximum count $(i_x)$, a minimum count $(i_y)$, and an initial count $(i_o)$.

Figure 40:
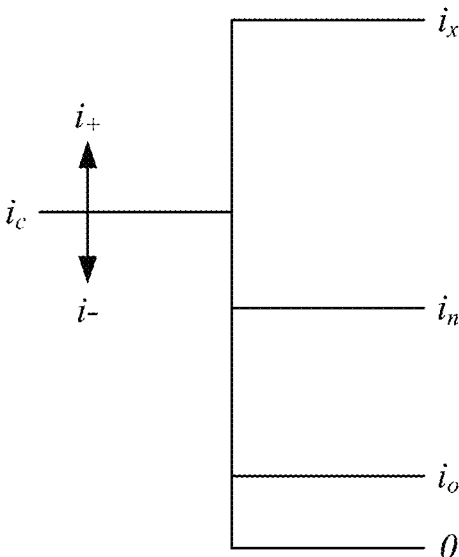
FIG. 40 illustrates tracking of access to a shared respective buffer in a respective ILC entry index, in accordance with aspects of the present technology.

At 3830, the inter-layer-communication (ILC) unit 3760-3765 can control access to the buffers of the respective one of the plurality of regions of the first memory 3750, 3710 by the respective compute cores 3715-3755 based on the respective read and write accessing tracking associated with the buffers. In one implementation, the inter-layer-communication (ILC) unit 3760-3765 can allow or block requests to a corresponding respective shared buffer 3770 from one or more respective producer compute cores 3720 and one or more respective consumer compute cores 3740 based on the corresponding ILC entry index. For example, the inter-layer-communication (ILC) unit 3760-3765 can allow write access to a respective shared buffer 3770 as long as the current unit count $(i_c)$ in the corresponding ILC entry index is less than the maximum count $(i_x)$. If the given write access is allowed, the inter-layer-communication (ILC) unit 3760-3765 increments the current unit count $(i_c)$ by an amount of units $(i_+)$ for the given write access, as illustrated in FIG. 40. If the current unit count $(i_c)$ in the corresponding ILC entry index is greater than or equal to the maximum count $(i_x)$, the inter-layer-communication (ILC) unit 3760-3765 blocks the given write access to the respective shared buffer 3770, and does not increment the current unit count $(i_c)$. Similarly, the inter-layer-communication (ILC) unit 3760-3765 can allow read access to a respective shared buffer 3770 as long as the current unit count $(i_c)$ in the corresponding ILC entry index is greater than the minimum count $(i_n)$. If the given read access is allowed, the inter-layer-communication (ILC) unit 3760-3765 decrements the current unit count $(i_c)$ by an amount of units $(i_-)$ for the given read access. If the current unit count $(i_c)$ in the corresponding ILC entry index is less than the minimum count $(i_n)$, the inter-layer-communication (ILC) unit 3760-3765 blocks the given read access to the respective shared buffer 3770, and does not decrement the current unit count $(i_c)$. The difference between the initial count $(i_o)$ and the minimum count $(i_n)$ represents the amount of data that must be produced (written to the corresponding shared buffer) by one or more producer compute cores before one or more consumer compute cores may start to consume data from the corresponding shared buffer. If there are multiple producer compute cores writing to the same shared buffer, the inter-layer-communication (ILC) unit 3760-3765 may require multiple increment synchronization commands for the compute cores before incrementing the current unit count $(i_c)$. Furthermore, the inter-layer-communication (ILC) unit 3760-3765 may need to know from the corresponding compute core when a new data set, such as a new feature map, is received to reset the counter values. Similarly, as compute cores reach the end of a data set, such as a feature map, as indicated by the current unit count $(i_c)$ reaching a "o" value, the inter-layer-communication (ILC)

unit 3760-3765 can consider the next write command to be the start of a new data set, such as a feature map frame.

Figure 41:
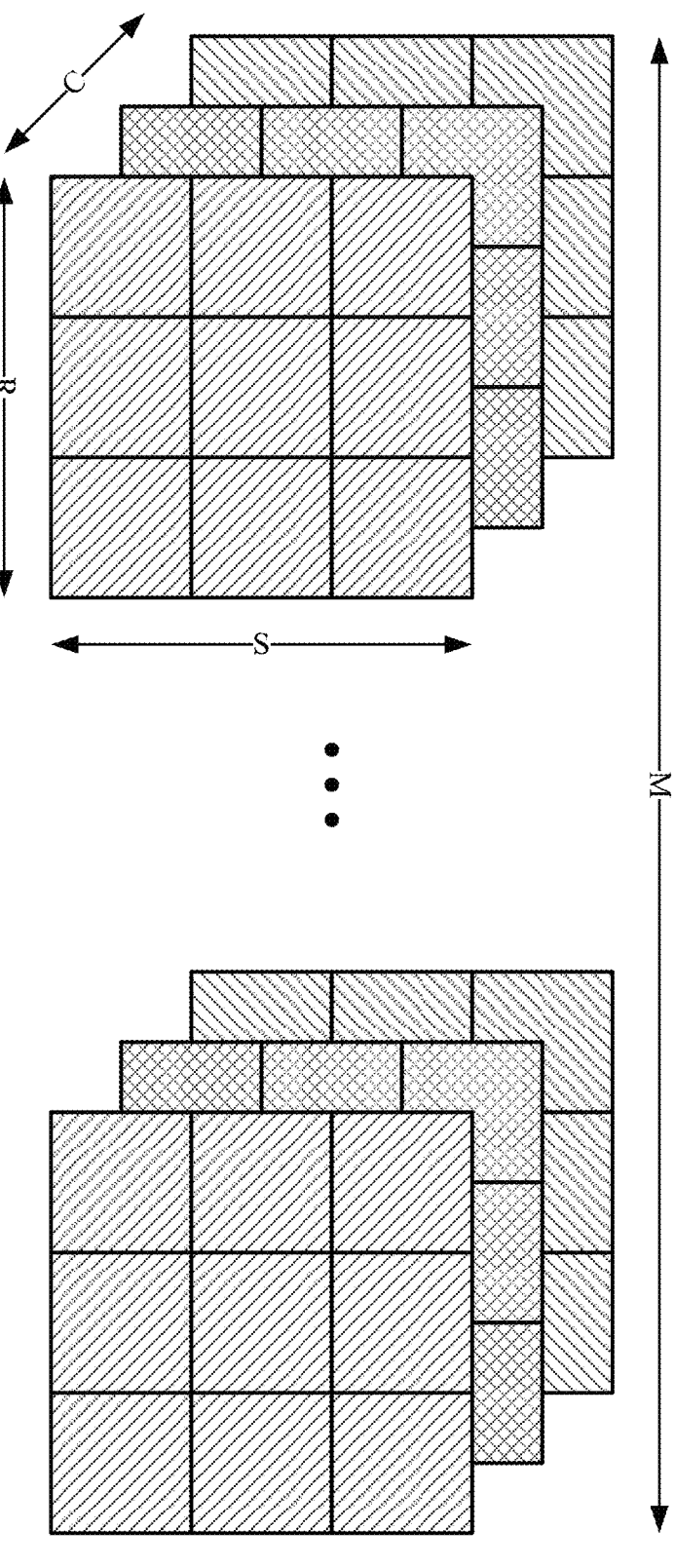
FIG. 41 illustrates a 4-dimension array, in accordance with aspects of the present technology.

Referring now to FIG. 41, a 4-dimension array, in accordance with aspects of the present technology, is illustrated. In one implementation, the 4-dimension array may be a weight array utilized in artificial intelligence computations, such as but not limited to convolution neural network computations. In one implementation, the 4-dimensional array can be utilized in 2-dimension convolution layers of a neural network model. The 4-dimension array can be characterized by a kernel width (S), a kernel height (R), input channels (C) and output channels (M) (e.g., number of kernels per layer). Accordingly, the filters (or kernels) have a dimension of R×S×C, and there are M filters. The weight arrays can also be applied to one-dimensional convolution, depth-wise convolution and the like functions by assuming one or more dimensions are singleton dimensions.

Figure 42:
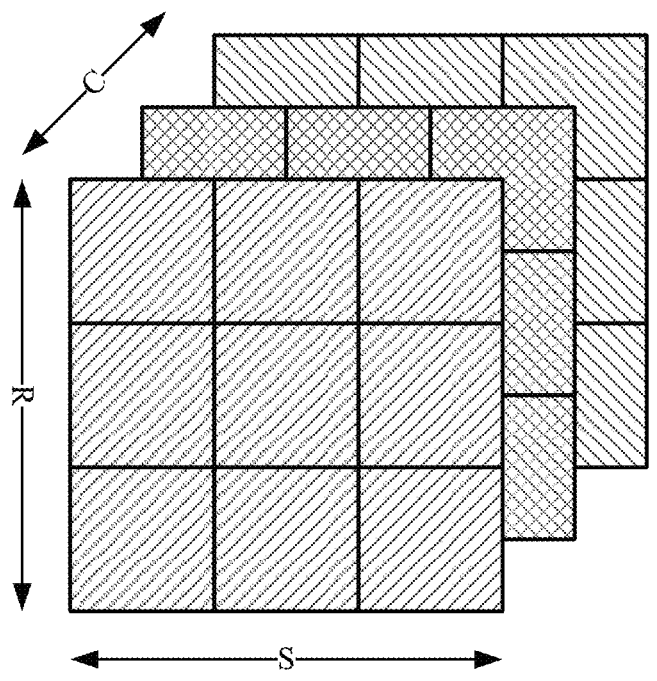
FIG. 42 illustrates a 3-dimension array, in accordance with aspects of the present technology.

Referring now to FIG. 42, a 3-dimension array, in accordance with aspects of the present technology, is illustrated. In one implementation, the 3-dimension array can be utilized in a 2-dimensional depth-wise convolution layer of a neural network model. The 3-dimensional array can be characterized by a kernel width (S), a kernel height (R) and input channels (C). Each kernel has a dimension of R×S, and acts on each input channel separately to produce an output feature map with C output channels.

Figure 43:
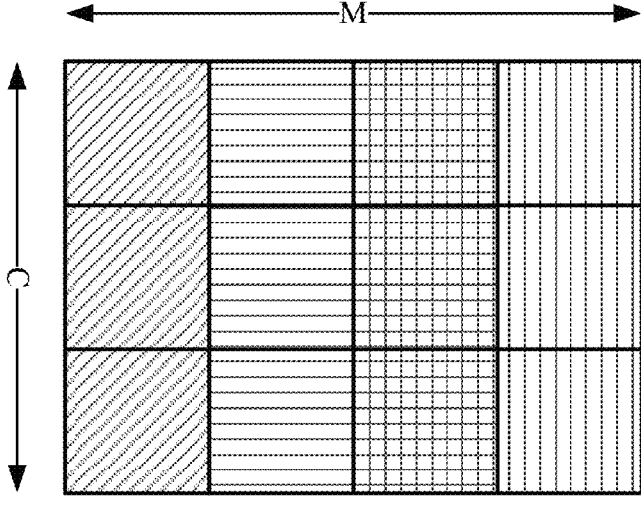
FIG. 43 illustrates a 2-dimension array, in accordance with aspects of the present technology.

Referring now to FIG. 43, a 2-dimension array, in accordance with aspects of the present technology, is shown. In one implementation, the 2-dimension array can be a dense weight array utilized in a fully connected layer of a neural network model. The 2-dimension array can be characterized by flattened input channels (C) and output channels (M).

Figure 44:
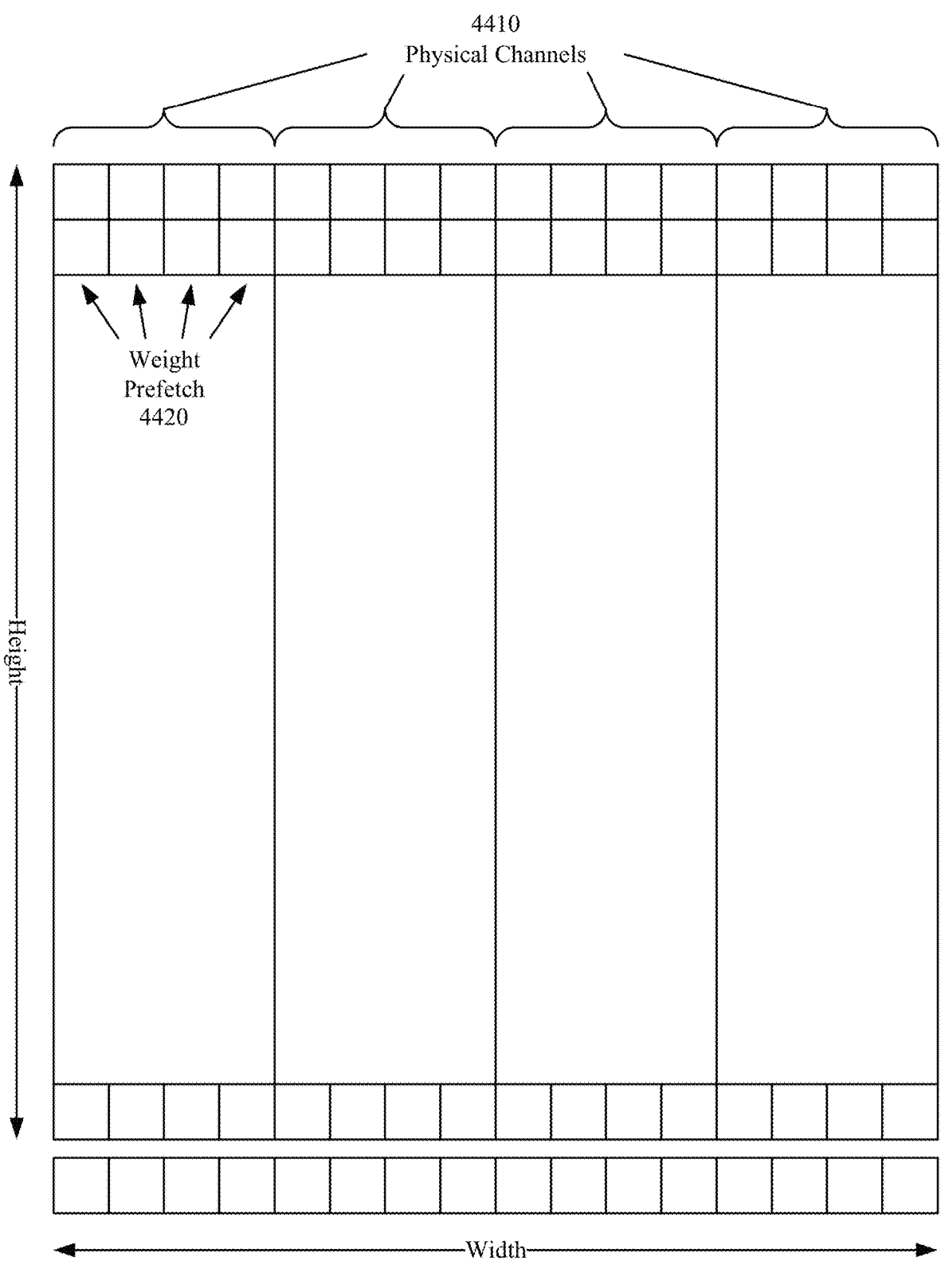
FIG. 44 shows a memory macro of a memory processing unit (MPU), in accordance with aspects of the present technology.

Referring to FIG. 44, a memory macro of a memory processing unit (MPU), in accordance with aspects of the present technology, is shown. The memory macro can be characterized by a height and a width. The width of the memory macro can be configured to provide a very wide word fetch. The width of the memory macro can be many words per read wide, which can be determined by a needed read bandwidth access for weight arrays. In an exemplary implementation, the access bandwidth of a memory macro can be up to 1024 bits. The height of the memory macro can be a 1-dimensional addressable space. The height of the memory macro can be determined by the total size of the memory macro divided by the width of the memory macro. The memory macro can be logically split into a plurality of physical channels 4410. Each physical channel can be considered a "weight prefetch" wide 4420.

Storage of weight arrays in the memory macros, in accordance with aspects of the present technology, can be configured to improve the performance of the memory processing unit (MPU). One or more memory macros can be configured to store all the weights needed for access by the compute cores of a given group. The one or more memory macros can be configured to provide enough memory access bandwidth for the compute cores in a given group. The memory macros can be optimized for read access by the compute cores. The number of internal memory banks, arrangement and the like of the memory can be transparent to the architectural design of the memory processing unit (MPU).

Referring again to FIGS. 41-43, the weight arrays can be organized for storage in memory macros to improve performance of a memory processing unit (MPU). In one implementation 2-dimension, 3-dimension or 4-dimension arrays can be arranged to optimize the fetch order of the respective near memory (M) cores to reduce their circuitry and increase efficiency. The arrangement of weight arrays can impact data throughput, memory utilization, data reuse, memory access pattern, and mapping. Aspects of the present technology can fit a 4-dimension weight array into a 2-dimension memory macro. Aspects of the present technology can also expand 3-dimension and 2-dimension arrays to look like 4-dimension arrays for storage in 2-dimension memory macros.

Figure 45:
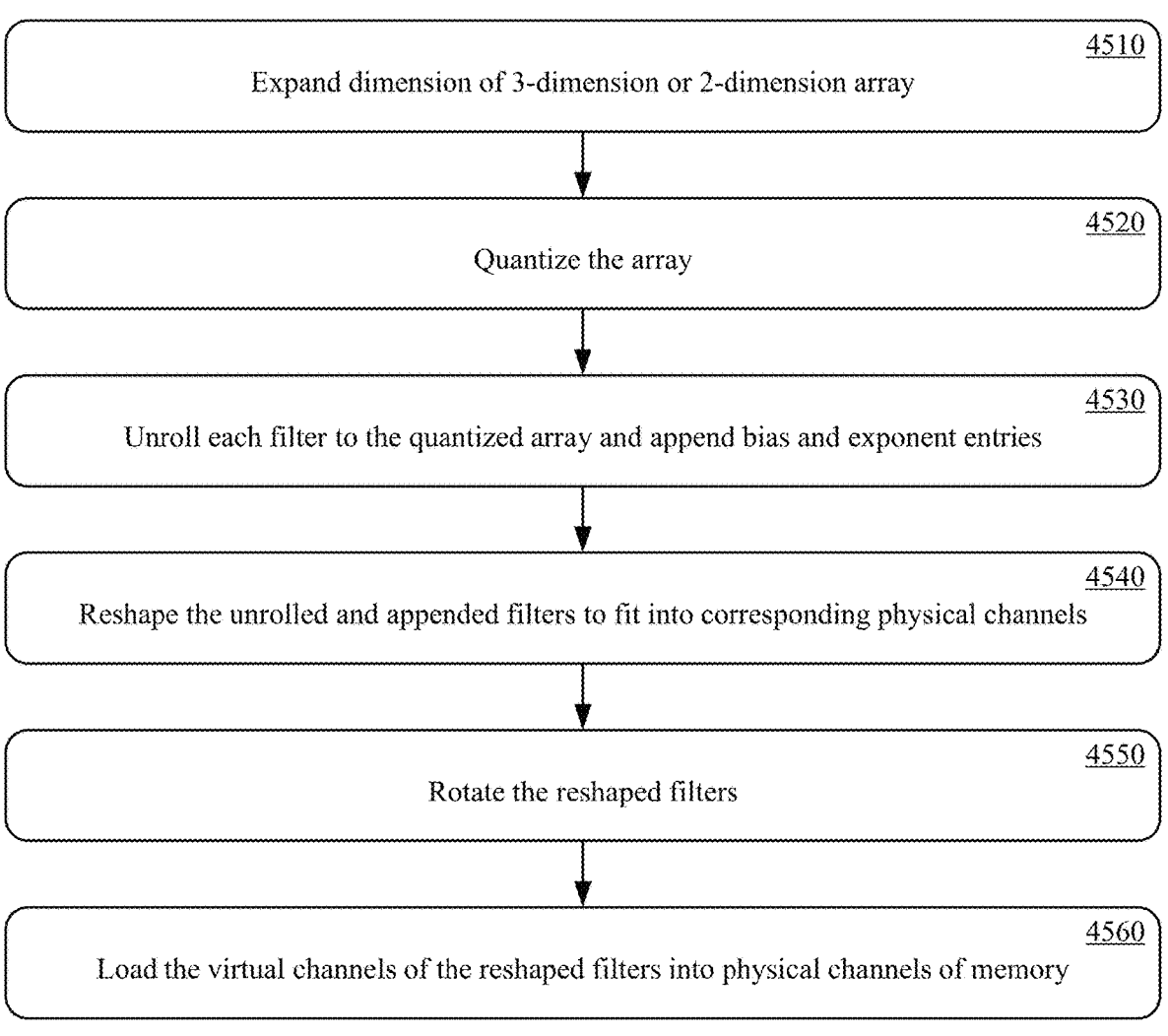
FIG. 45 shows a method of fitting arrays into a 2-dimension memory, in accordance with aspects of the present technology.
Figure 46:
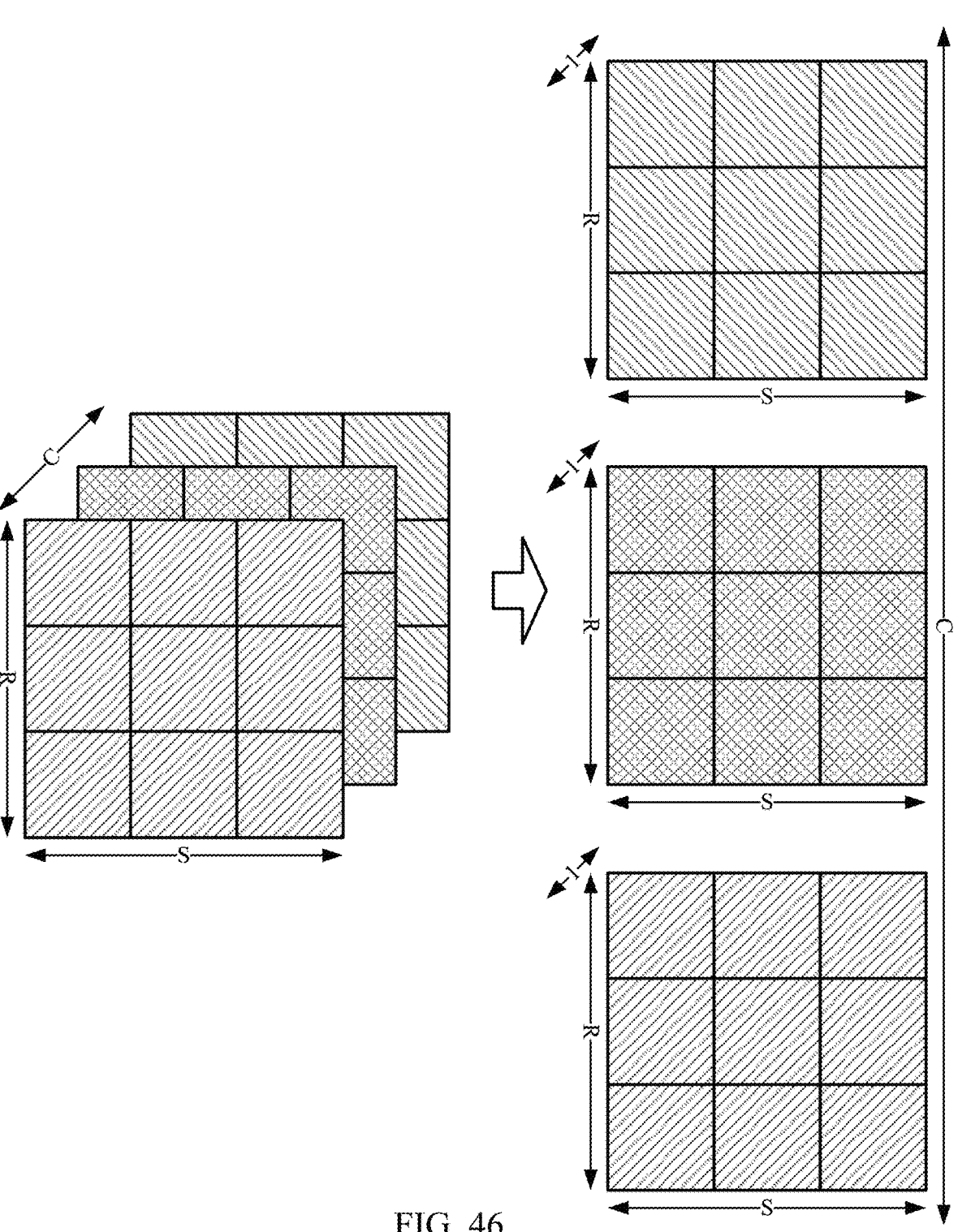
FIG. 46 illustrates expansion of a 3-dimension array, in accordance with aspects of the present technology.
Figure 47:
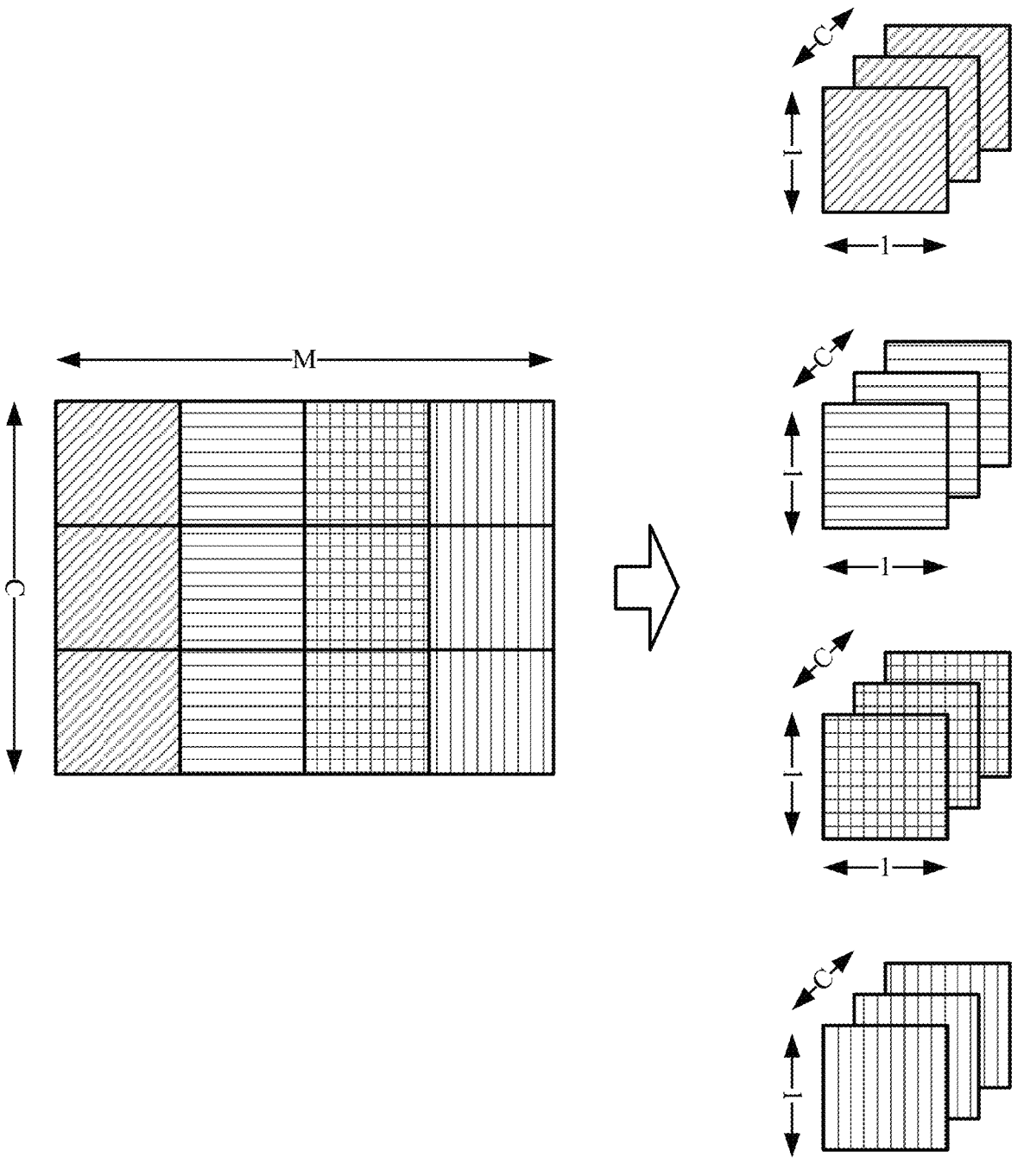
FIG. 47 illustrates expansion of a 2-dimension array, in accordance with aspects of the present technology.

Referring now to FIG. 45, a method of fitting arrays into a 2-dimension memory, in accordance with aspects of the present technology, is shown. In one implementation the array can be a 4-dimension, 3-dimension or 2-dimension weight array and the 2-dimension memory can be a memory macro. The method of fitting the array into a 2-dimension memory will be explained with reference to FIGS. 46-52. The method can include expanding the dimension of a 3-dimension or a 2-dimension array, at 4510. If the array is a 3-dimension array of kernel width (S), kernel height (R) and input channels (C), the array can be expanded to a 4-dimension array of kernel width (S), kernel height (R), one input channel, and output channels (C), as illustrated in FIG. 46. If the array is a 2-dimension array of input channels (C) and output channels (M), the array can be expanded to a 4-dimension array of a single kernel width, a single kernel height, input channels (C) and output channels (M), as illustrated in FIG. 47.

Figure 48:
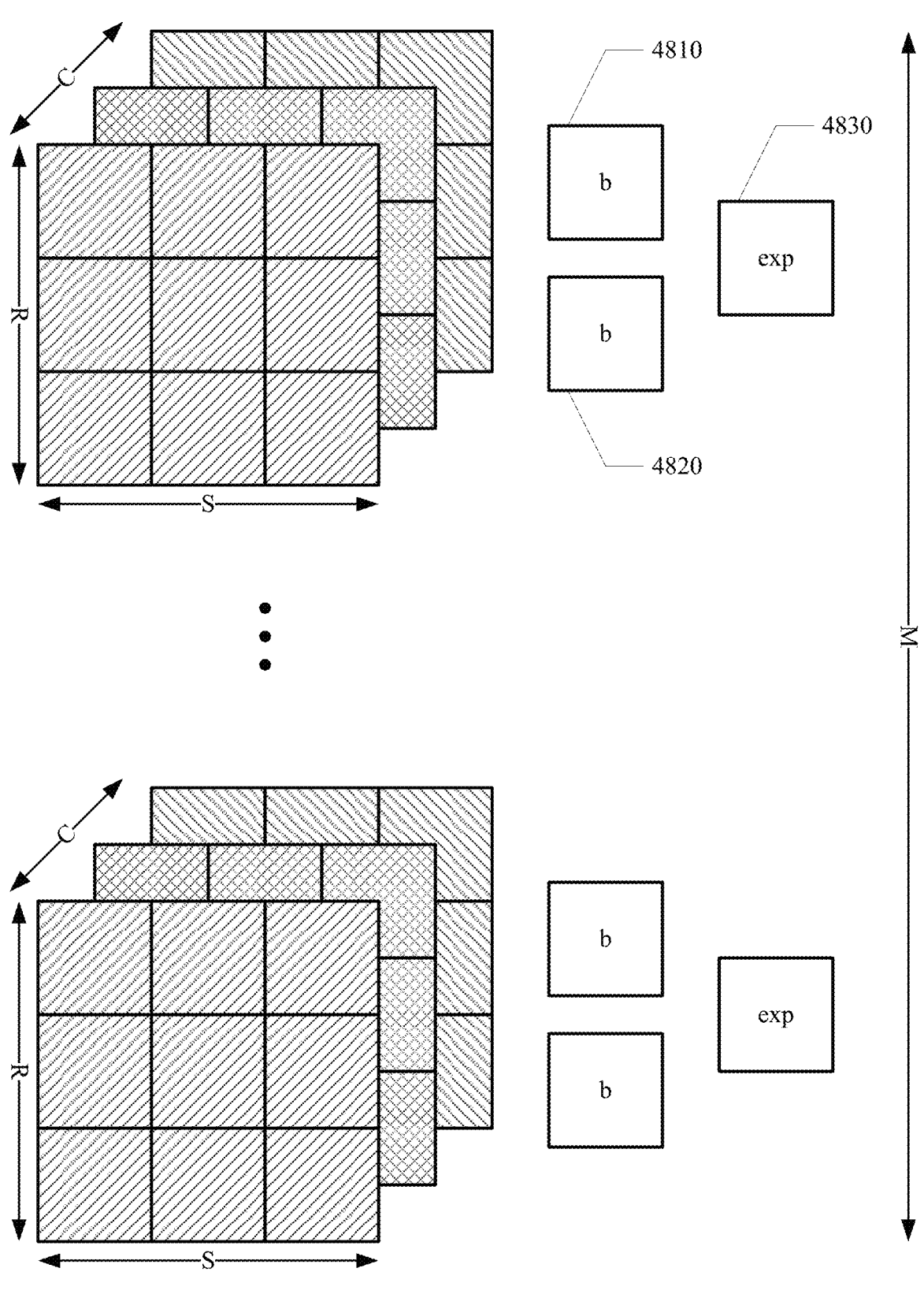
FIG. 48 illustrates quantization of an array, in accordance with aspects of the present technology.

At 4520, the 4-dimension array, expanded 3-dimension array or expanded 2-dimension array can be quantized, as illustrated in FIG. 48. Each array element can be quantized to an 8-bit value. Each filter can also include a single bias value (b) 4810, 4820 and one scaling exponent (exp) 4830. The single bias value 4810, 4820 can comprise two element entries. In one implementation, the single bias value 4810, 4820 can be encoded as a Bfloat16 value.

Figure 49:
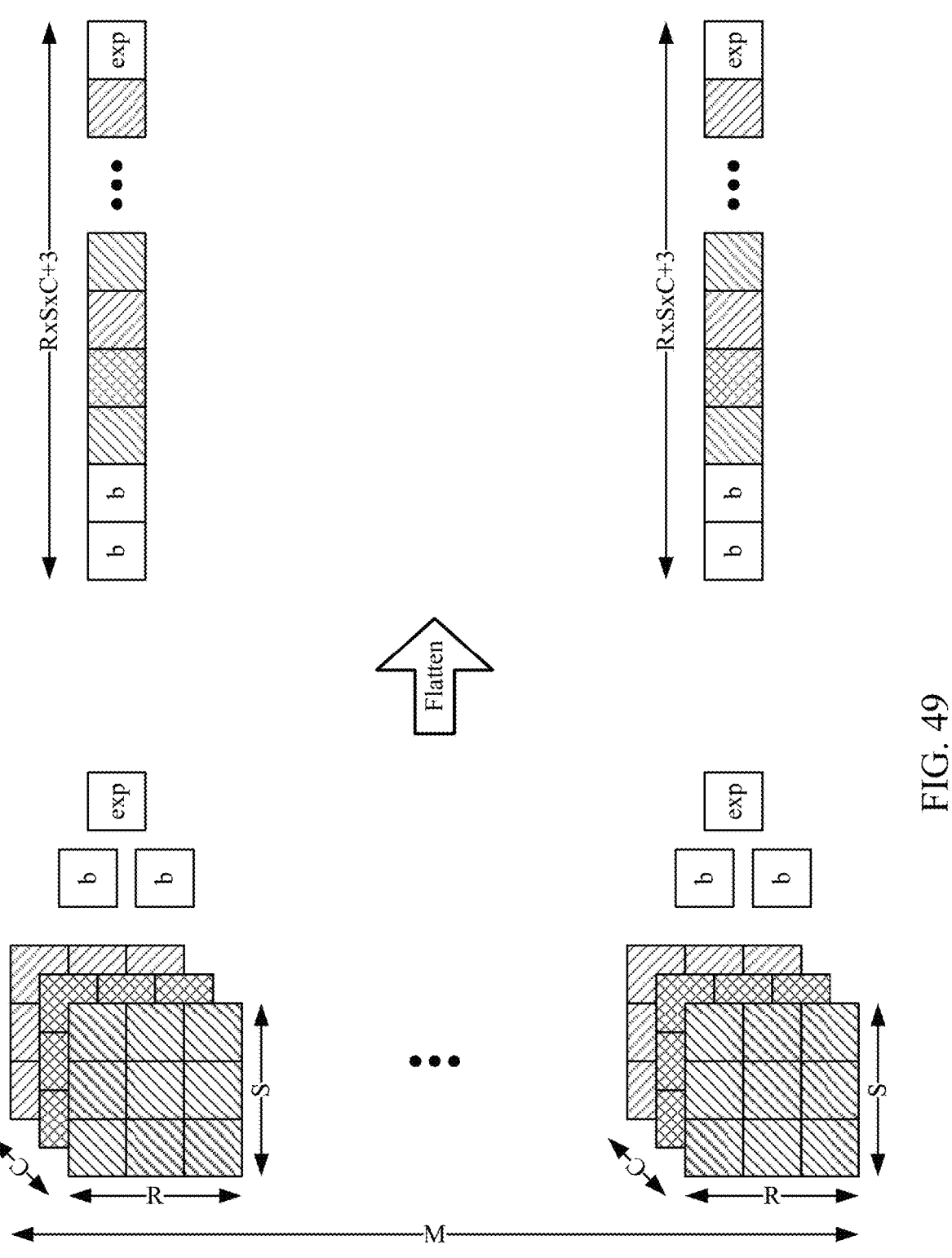
FIG. 49 illustrates flattening of a quantized array, in accordance with aspects of the present technology.

At 4530, the filters of the quantized array can be unrolled and the bias value and scaling exponent can be appended, as illustrate in FIG. 49. In one implementation, corresponding entries from each channel can be sequentially arranged after the bias value 4810, 4820, and the scaling exponent can be added at the end to produce M flattened output channels. The M flattened output channels can be characterized by length R×S×C+3. Each M flattened output channel corresponds to a virtual channel characterized by a virtual channel height (vch) of R×S×C+3.

Figure 50:
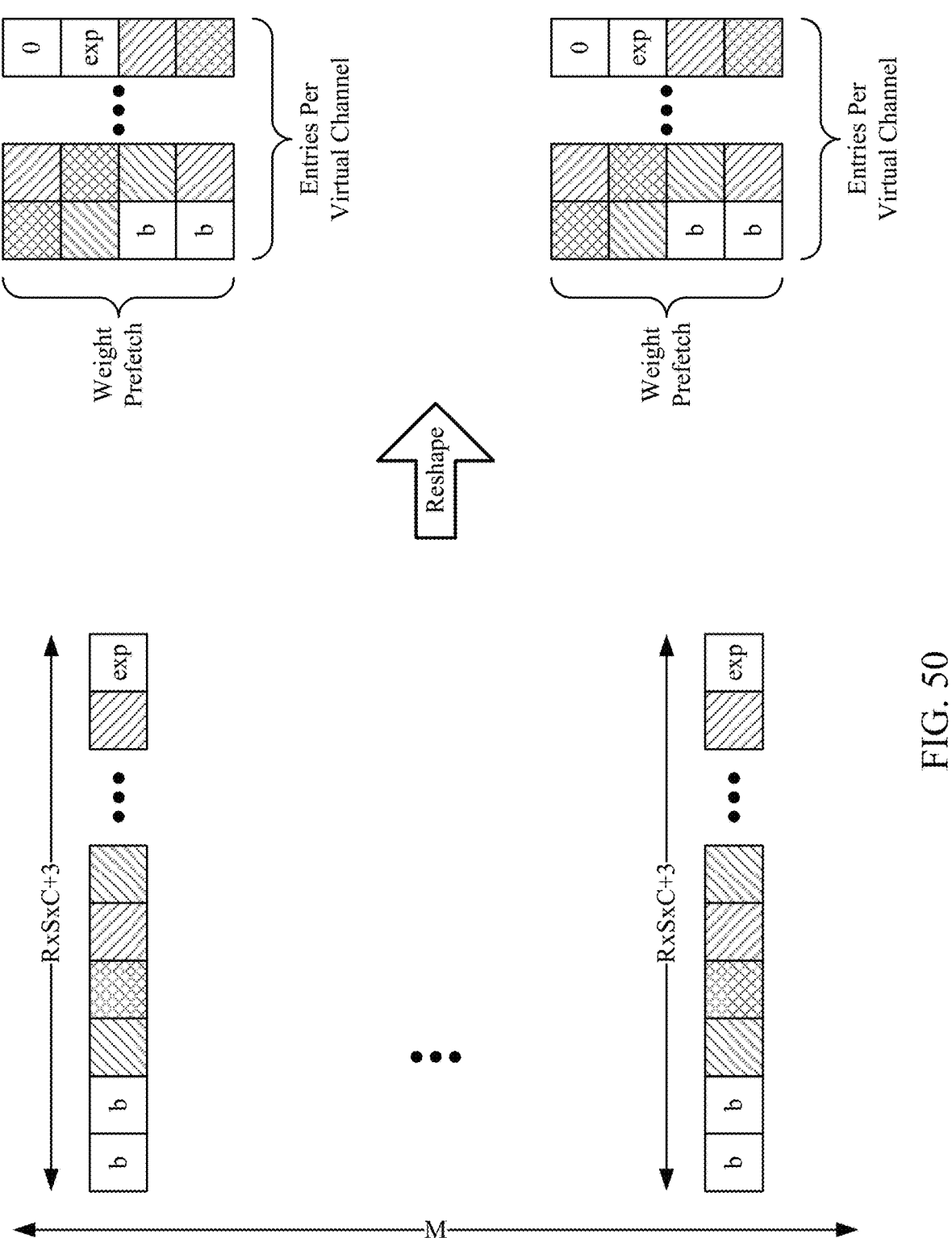
FIG. 50 illustrates reshaping of a flattened array, in accordance with aspects of the present technology.

At 4540, the unrolled and appended filters can be reshaped to fit into a physical channel of a memory, as illustrated in FIG. 50. The reshaped filters can be characterized by a weight prefetch height and an entries per virtual channel width. The reshaped filters can be padded with zero element values if necessary to fit the physical channel of the memory. In one implementation, the physical channel of the memory can be the physical channel of a memory macro.

Figure 52:
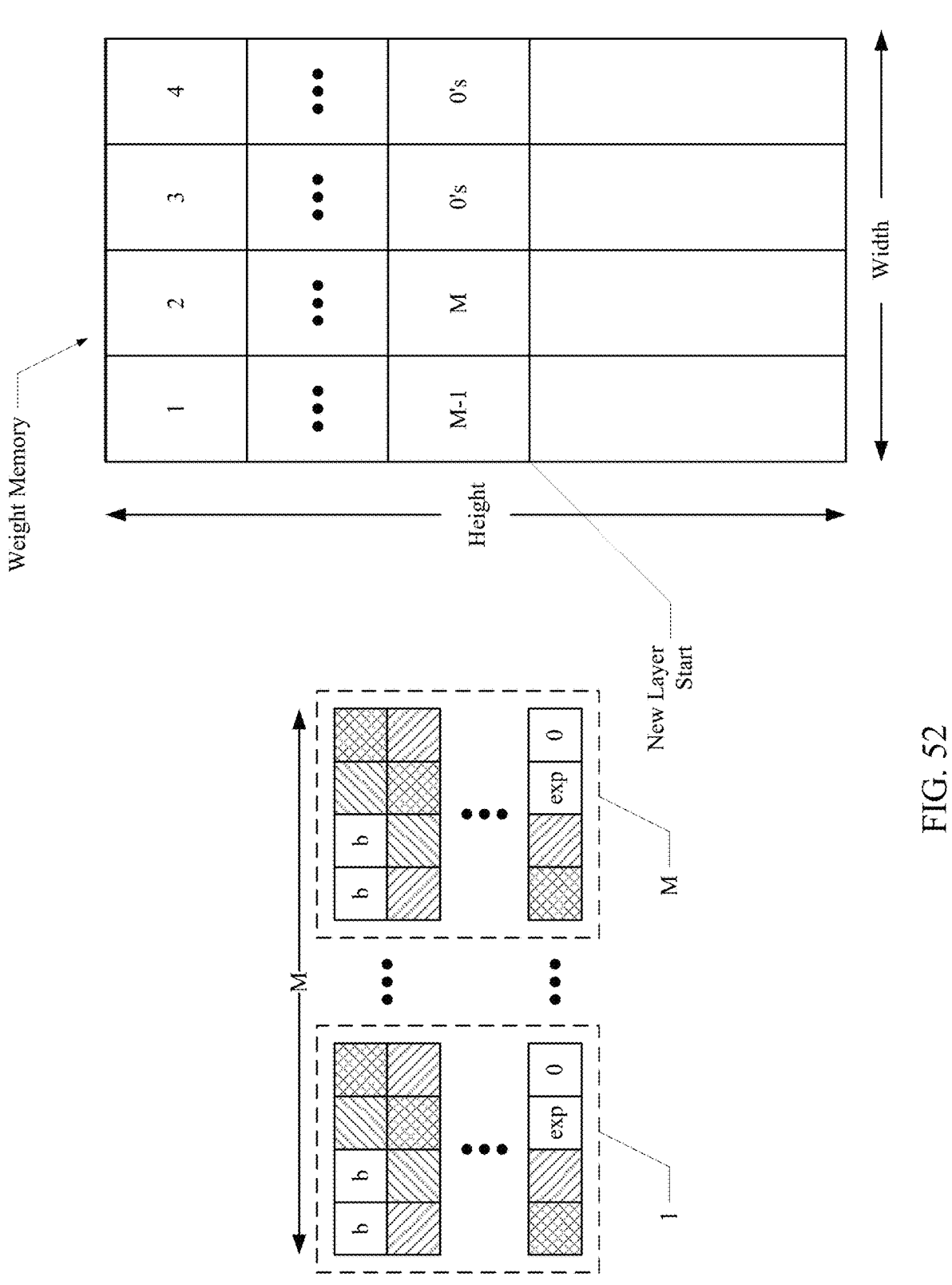
FIG. 52 illustrates loading virtual channels of the reshaped array into physical channels of memory, in accordance with aspects of the present technology.

At 4550, the reshaped filters can be rotated, as illustrated in FIG. 51. The rotated filters can comprise M virtual channels (e.g., output filters). At 4560, virtual channels of the rotated filters can be packed physical channels of the memory, as illustrated in FIG. 52. The M virtual channels of the rotated filters can be sequentially stored in the plurality of physical channels of the memory. Physical channels of the memory can be padded with zero (0) values if necessary, such that a weight array for a new layer starts at a first physical channel boundary of the memory.

Figures 53A, 53B:
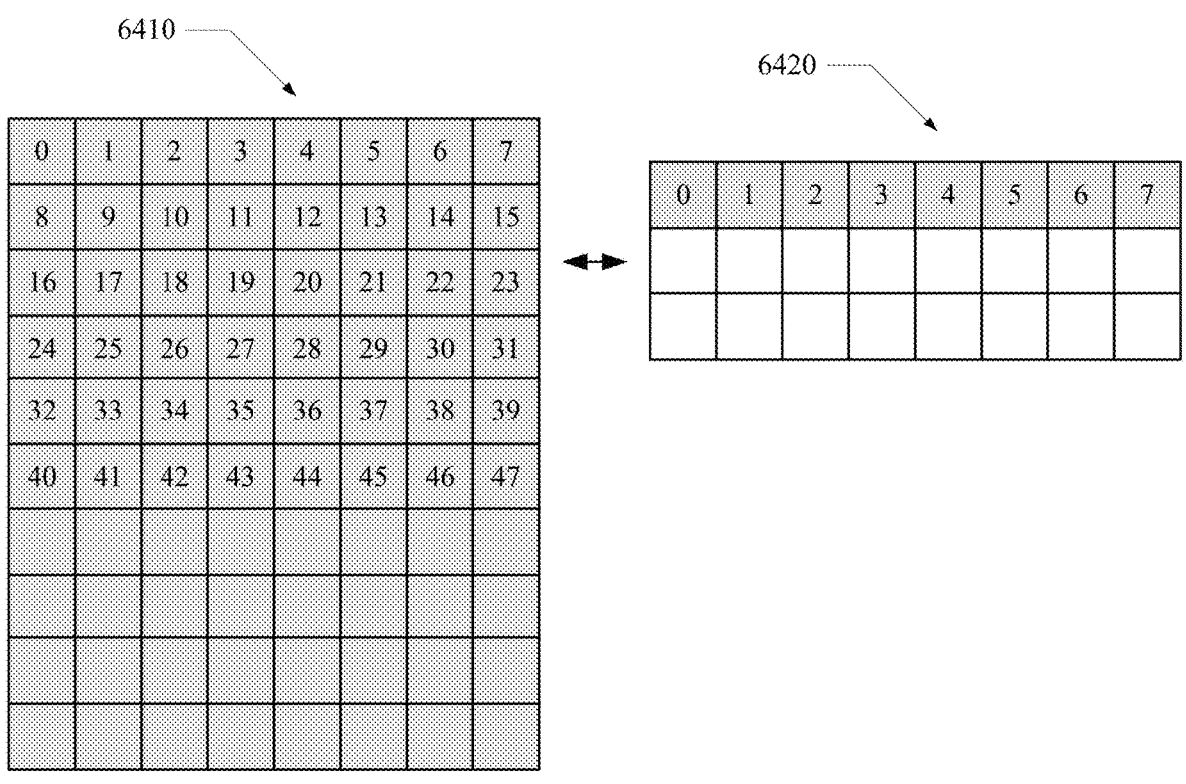
FIGS. 53A-53D illustrate fetching from a wide memory block, in accordance with aspects of the present technology.
Figures 53C, 53D:

Again, organizing each of the memory regions into a plurality of memory blocks and coupling a core group of a respective processing region to a set of memory blocks that are proximate to the given core group, while not coupled to memory blocks in the adjacent memory regions that are distal from the given core group, can increase memory bandwidth throughput. Providing more, but smaller, flat memory blocks by organizing each of the plurality of memory regions into respective set of a plurality of memory blocks can provide increased memory bandwidth for increased performance. Further increasing the number of memory blocks in each of the plurality of first memory regions can further increase the memory bandwidth. Referring to FIGS. 53A-53D, organization of each of the plurality of first memory regions into a plurality of columns and rows, in accordance with aspects of the present technology, is shown. Each memory region 5310 can be organized into a plurality of memory blocks of m blocks wide and n blocks long, wherein m and n can be different or equal. In one implementation, memory regions 110-130, 202-210, 302-310, 402-408, as described above with reference to FIGS. 1-5, can be between 2 and 128 channels wide. In another implementation, the memory regions 110-130, 202-210, 302-310, 402-408 can be between 2 and 128 words wide. A fetch/write back unit can fetch sets of memory blocks from an adjacent one of the plurality of first memory regions and write back sets of memory blocks to another adjacent one of the first memory regions in accordance with a dataflow configuration. For example, a fetch unit of a respective compute core can be configured to fetch from a set of memory blocks of a respective adjacent one of the plurality of first memory regions. In one implementation, the set of memory blocks can correspond to a channel width of the compute core or cache width of the fetch unit as illustrated in FIG. 53A. Additional data from sets of memory blocks can then be fetched into the cache of the fetch unit, as illustrated in FIGS. 53B-53D respectively. Similarly, a write back unit of a respective compute core can be configured to write data back to sets of memory blocks of a respective adjacent one of the plurality of first memory regions, as illustrated in FIG. 54A. For example, data can be written back to a first set of memory block of a respective adjacent one of the plurality of memory regions. Additional data can then be written back to the next set of memory blocks of the respective adjacent one of the plurality of memory regions. The wide plurality of first memory regions organized into a plurality of columns and rows, in accordance with aspects of the present technology, advantageously reduces the number of memory access cycles, which can smother the pipeline, improve arbitration and better latency hiding. However, some compute functions, such as reshape, may need to be based on multiples of the memory block line width.

Referring again to FIGS. 3-5, 10 and 11, the compute cores can be configured to compute functions including, but are not limited to, vector products, matrix-dot-products, convolutions, min/max pooling, averaging, scaling, and or the like. For example, near memory (M) compute cores can compute up-sampling, deconvolution, separable convolution, pointwise convolution, MP convolution, and the like functions. The arithmetic (A) compute cores can be configured to compute maximum, minimum, subtract, multiply, concatenate, sigmoid/logistic activation, hyperbolic tangent, mish, swish, constant add, constant multiply, clip and the like functions. In yet another example, rescale or the like functions can be supported by a graph processing core.

Compute functions such as the reshape function can be implemented by the control circuitry and or inter-layer communication (ILC) units 450-456. Reshaping can be supported by adjusting corresponding increment and decrement counts of the inter-layer communication unit. For example, the increment count can be set to +4 and the decrement count can be set to −6 to reshape a 6×4 producer output to a 4×6 consumer input in a per row ILC synchronization scheme, as illustrated in FIG. 55. A deconvolution, also known as a two-dimension transpose convolution (Conv2Dtranspose), can include kernel transformation and up-sampling. For example, the Conv2Dtranspose can be implemented by transposing (e.g., flipping) kernel weights, while the strides happen on the output feature map instead of the input. This is equivalent to inserting an up-sampling layer with inserted zeros before the two-dimension convolution with transposed kernel weights.

Figure 56:
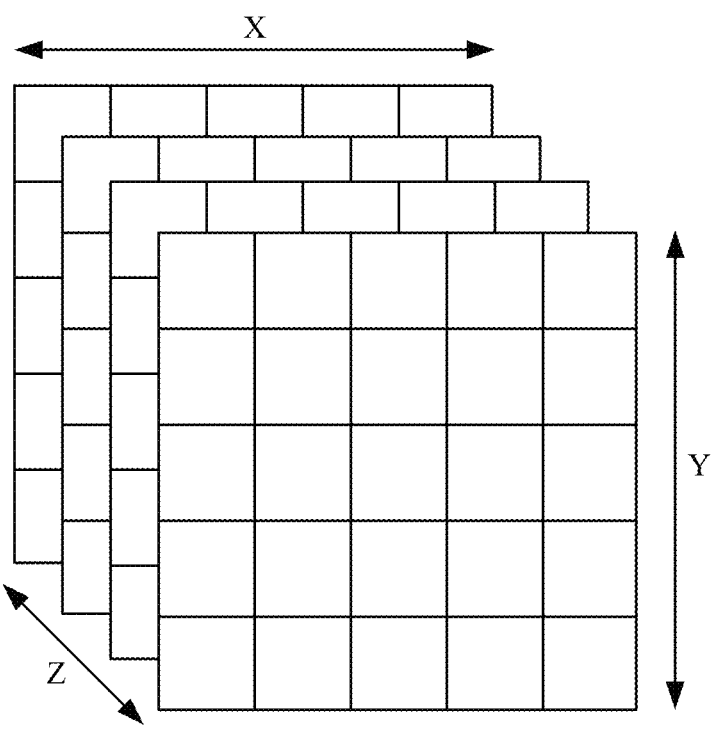
FIG. 56 illustrates a feature map, in accordance with aspects of the present technology.

Generally, feature maps can be encoded as integer data, B-float data, group B-float or the like. Referring now to FIG. 56, a feature map of kernel width (X), a kernel height (Y) and channels (Z), in accordance with aspects of the present technology, is shown. For integer data, feature map pixels can be encoded as n-bit integer values. For example, the feature map pixels can be represented as 8-bit integers. The fixed-point location of the integer can be estimated offline using a pilot data set. The pilot data set can be utilized to encode the data so that the entries share the same exponent (e.g., static exponent). However, if the runtime conditions or data set differs from the pilot data set, the effective precision is significantly degraded, and network branching can be difficult.

In another implementation, the feature map pixels can be encoded as Brain Floating Point (B-float) values, including a base and exponent. For example, the feature map pixels can be represented by 16 bits, including an 8 bit signed fraction and 8 bit exponent. The 8 bit signed fraction can include a sign bit, 7 explicitly stored faction bits and 1 hidden fraction bit. Each B-float encoded entry can have its own dynamic exponent. The B-float encoding advantageously does not need a pilot data phase, and advantageously adapts to runtime conditions. However, B-float encoded data utilizes double the memory storage and memory bandwidth as compared to integer encoded feature map data.

In yet another implementation, the feature map pixels can be represented by as B-float values, wherein each group of n-channels of pixels have their own dynamic exponent. The n-channels should be less than or equal to the number of physical channels. B-float encoding, wherein groups of n-channels are encoded with a given dynamic exponent is referred to herein as Group B-float encoding. Group B-float encoding advantageously does not need a pilot data phase, and advantageously adapts to runtime conditions. In most cases, Group B-float encoding can advantageously utilize substantially the same memory storage and memory bandwidth as integer encoded data, by storing the group B-float encoded data, in accordance with aspects of the present technology.

Figure 57:
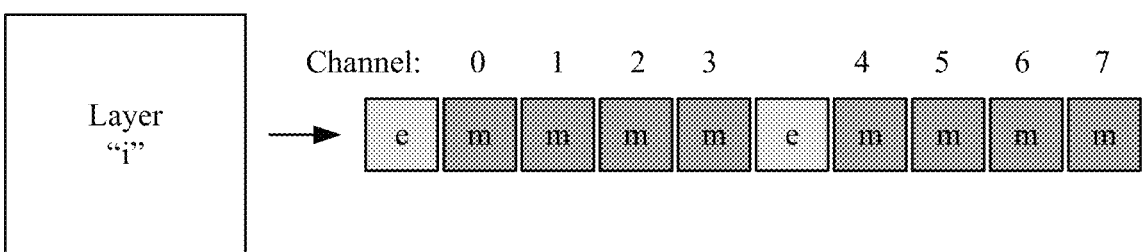
FIG. 57 illustrates a logical view of a feature map encoded in Group B-float from an output side of a compute core, in accordance with aspects of the present technology.
Figure 58:
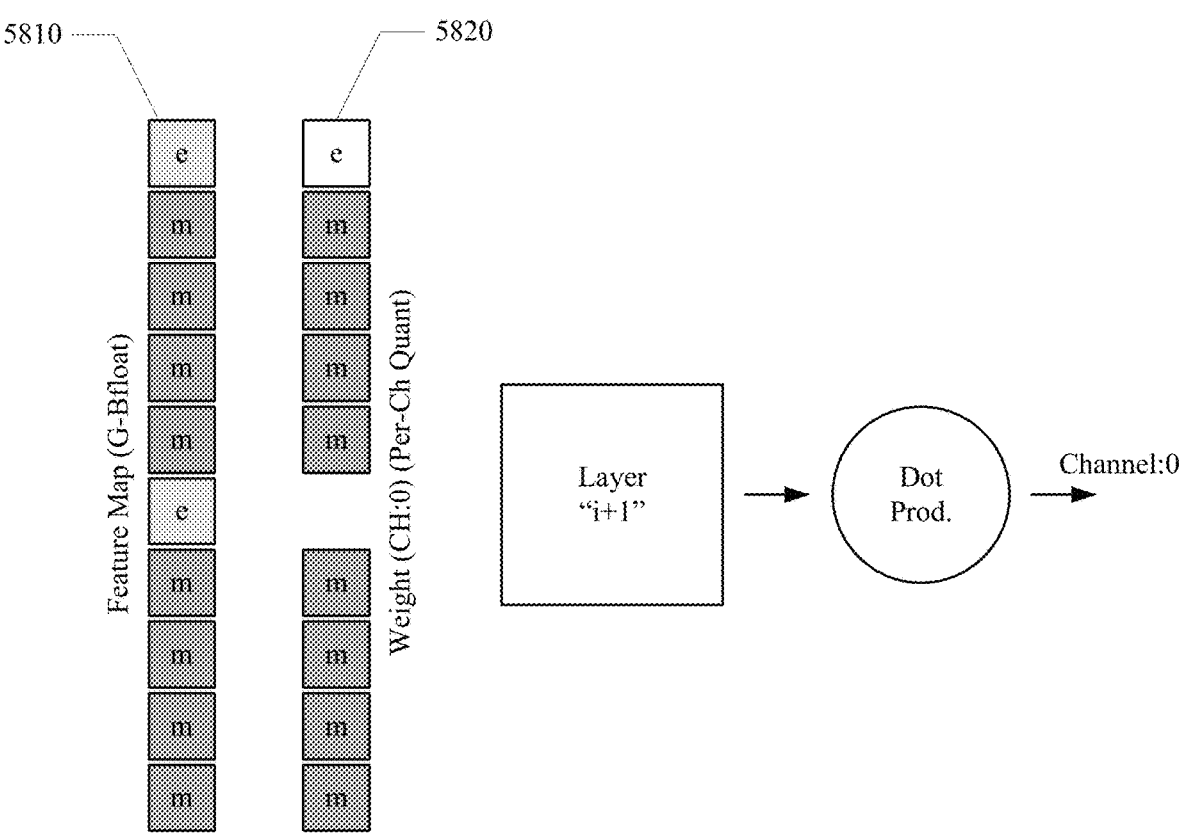
FIG. 58 illustrates a logical view of a feature map encoded in Group B-float from an input side of a compute core, in accordance with aspects of the present technology.
Figure 59:
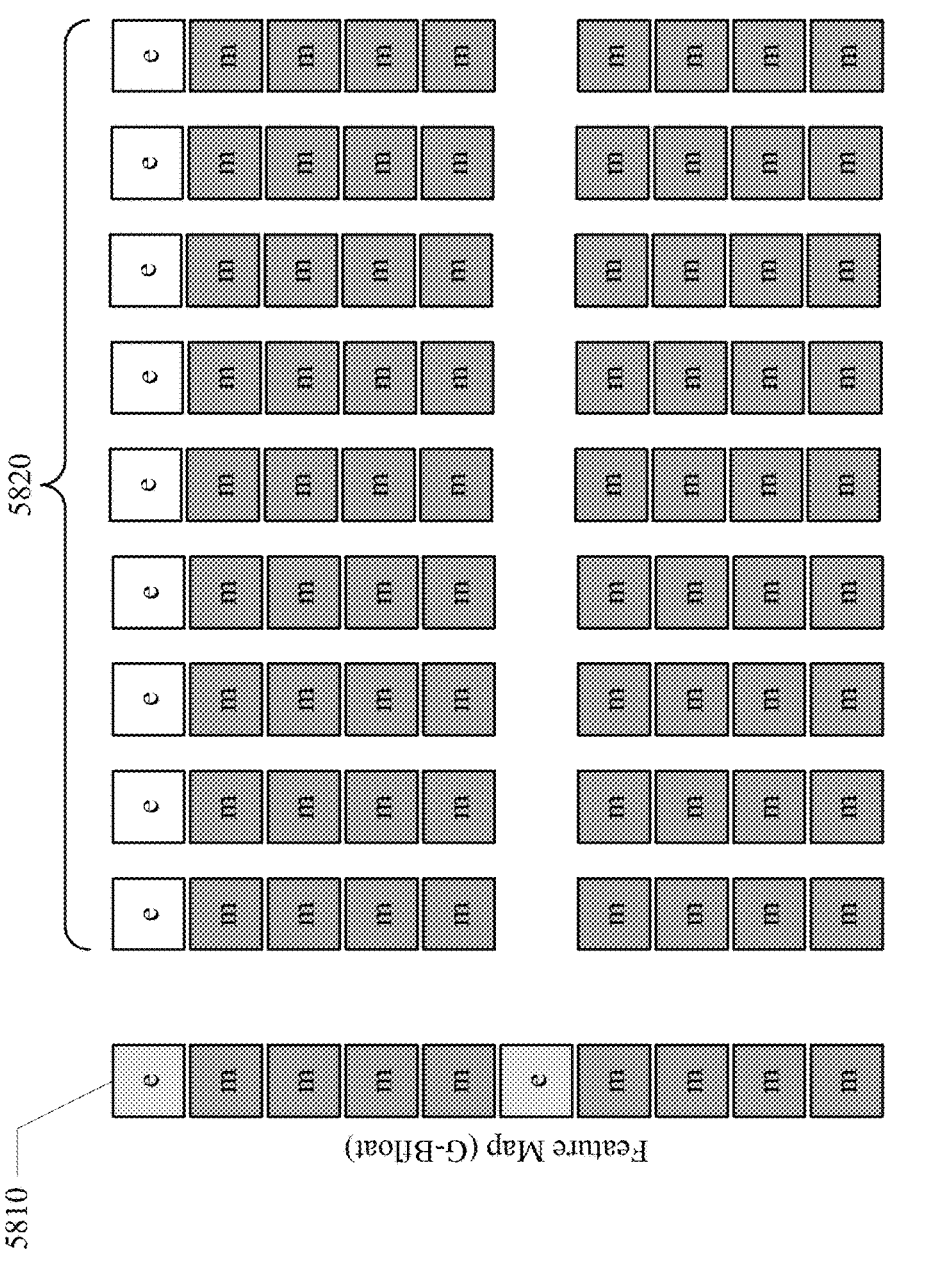
FIG. 59 illustrates another logical view of a feature map and weights encoded in Group B-float from an input side of a compute core, in accordance with aspects of the present technology.

Referring now to FIG. 57, a logical view of a feature map encoded in Group B-float from an output side of a compute core, in accordance with aspects of the present technology, is illustrated. For a layer 'i', the output channels 0-8 can be encoded by 8-bit exponents e, and 8-bit mantissa m (8 bits+1 sign bit). The exponent is across multiple channels, since each output channel has one output entry per pixel. Referring now to FIG. 58 a logical view of a feature map encoded in Group B-float from an input side of a compute core, in accordance with aspects of the present technology, is illustrated. For a layer 'i+1', the exponent of the feature map 5810 are shared along a same axis as weights per-channel quantization 5820. Referring now to FIG. 59, another logical view of a feature map and weights encoded in Group B-float from an input side of a compute core, in accordance with aspects of the present technology, is illustrated. The combination of Group B-float encoding and wide memory organization for use in memory regions 110-130, 202-210, 302-310, 402-408, as described above with reference to FIGS. 1-5, can advantageously provide almost two times (2×) the memory bandwidth for the same memory width. The combination of Group B-float encoding and wide memory organization can also advantageously reduce the on-chip memory storage need by almost one half (½). The accuracy achievable for computations utilizing Group B-float encoded, including but not limited to neural network computations, can be substantially equal to B-float encoded values.

Figure 60A:
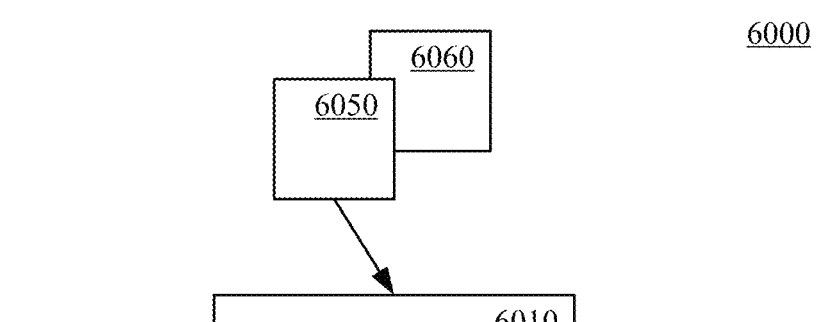
FIGS. 60A-60B show a multi-accumulator implementation of a multiply-and-accumulate (MAC), in accordance with aspects of the present technology.
Figure 60B:
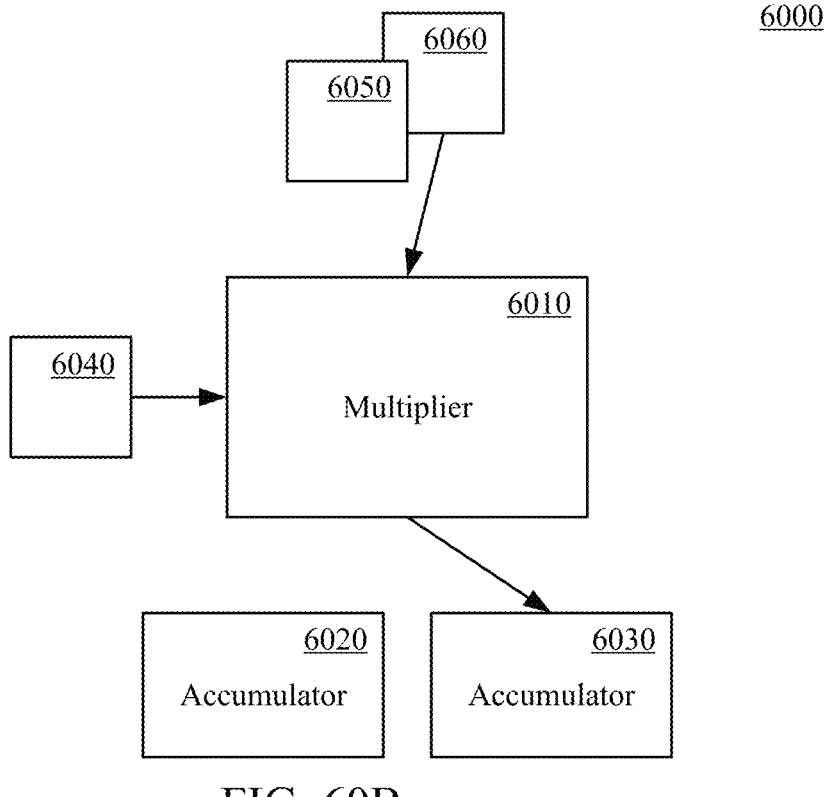

Referring now to FIGS. 60A-60B, a multi-accumulator implementation of a multiply-and-accumulate (MAC), in accordance with aspects of the present technology, is shown. In one implementation, the multi-accumulator MAC can be implemented in compute cores, such as the near-memory (M) compute cores described above. The multi-accumulator MAC 6000 can include a multiplier 6010 and a plurality of accumulators 6020-6030. The multiplier 6010 can be configured to receive a first element 6040 and a plurality of second elements 6050-6060. In one implementation, the multiplier 6010 can receive an element of a corresponding column of a first matrix A and elements of a corresponding row of a second matrix B. For example, the multiplier 6010 can receive a first element of a corresponding column of a feature map (FMAP) 6040 and a first and second elements 6050, 6060 of a corresponding row of a weight matrix. The multiplier 6010 can multiply the element of the corresponding column of the first matrix A 6040 and the first element of the corresponding row of the second matrix B 6050 to generate a first partial sum element output to a first one of the plurality of accumulators 6020, as illustrated in FIG. 60A. The multiplier 6010 can then reuse the element of the corresponding column of the first matrix A 6040 to multiply the element of the corresponding column of the first matrix A 6040 and the second element of the corresponding row of the second matrix B 6060 to generate a second partial sum element output to a second one of the plurality of accumulators 6030, as illustrated in FIG. 60B. The multi-accumulator MAC can time multiplex the computation of a matrix dot product, wherein element values of a first matrix A are reused and corresponding partial products are accumulated in respective accumulators of the multi-accumulator MAC. The number of accumulators in each MAC effectively increases the number of physical channels of the compute core. Although FIGS. 60A-60B illustrate reuse of element values of a weight matrix, it is appreciated that the multi-accumulator MAC can be similarly configured for reuse of feature map element values.

It is to be appreciated that bandwidth utilized for receiving the elements of the first matrix A by the multiply-and-accumulate (MAC) can be reduced by reusing the corresponding element of matrix A. The plurality of accumulators of the multiply- and accumulate (MAC) 6000 enable the corresponding element of matrix A to be reused, and therefore do not need to be reloaded thereby reducing bandwidth utilization and/or reducing energy consumption associated with loading data from memory into the MAC. The width of the compute cores (e.g., the number of accumulators of the multi-accumulator MAC and the number of channels) can be balanced against the number of compute cores to optimize the utilization of the compute cores.

It is to be appreciated that the memory processing architectures, in accordance with aspects of the present technology, advantageously enable the design selection of the number of compute cores, the number of multiply-and-accumulate (MAC), the number of physical channels, the number of accumulators, the memory size and the like.

Figure 61:
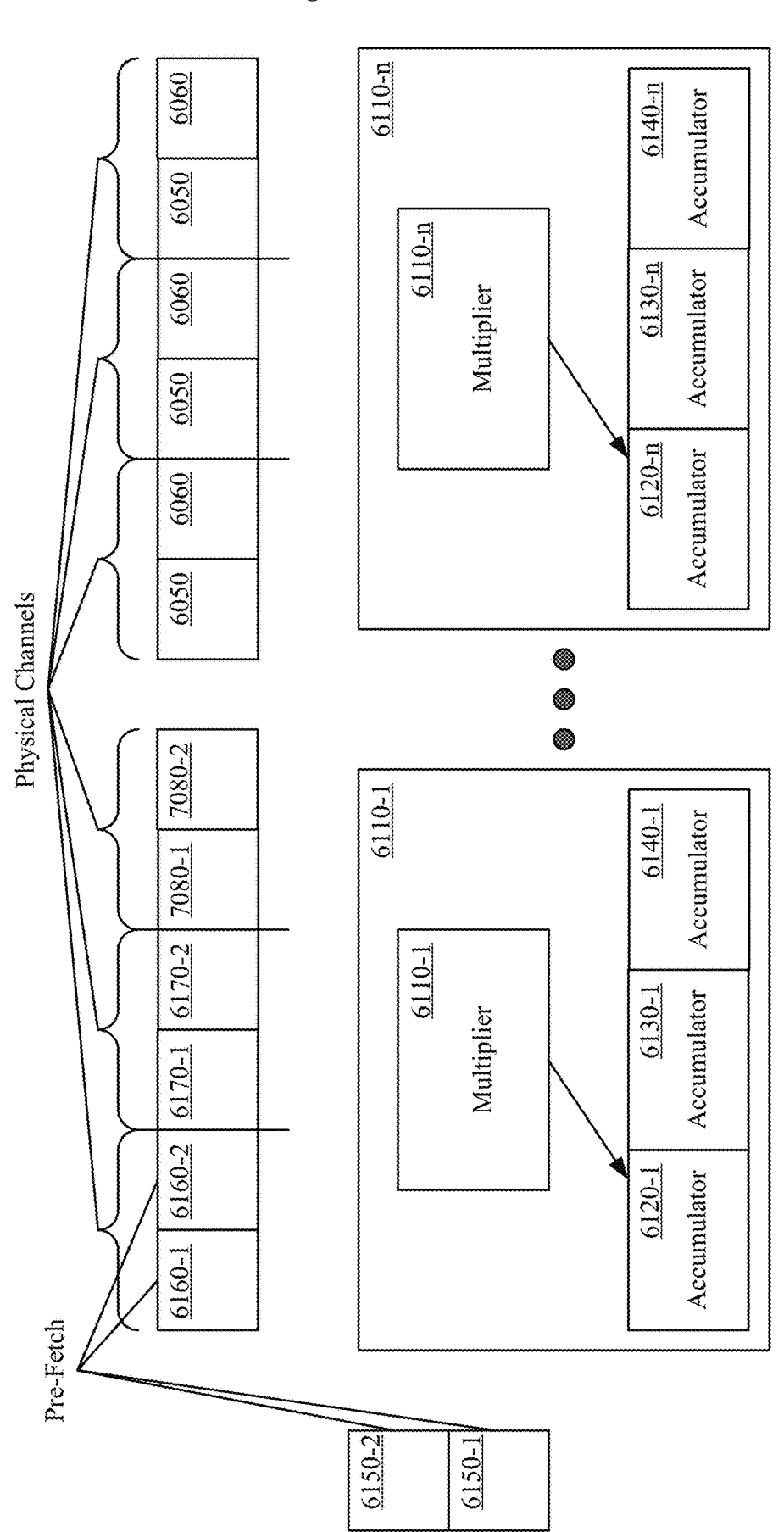
FIG. 61 shows data reuse in a near memory (M) compute core including a plurality of multi-accumulator multiply-and-accumulate (MAC) units, in accordance with aspects of the present technology.

Referring now to FIG. 61, data reuse in a near memory (M) compute core including a plurality of multi-accumulator multiply-and-accumulate (MAC) units, in accordance with aspects of the present technology, is shown. To compute the convolution of a first matrix (e.g., weights) and a second matrix (e.g., input feature map), every output value (e.g., output feature map) in an output channel requires access to all the values of the first matrix in one filter. Accordingly, the plurality of multiply and accumulate units 6110-1, 6110-n can be configured to receive a current data value of a first matrix read in from a memory. The plurality of multiply and accumulate units 6110-1, 6110-n can also be configured to receive respective ones of a plurality of adjacent values from a second matrix. In one implementation, the first matrix can be a weight matrix and the second matrix can be an input feature map. The input feature map can for example comprise a plurality of image pixel values. The third matrix generated by the convolution of the weight matrix and the input feature map can be an output feature map. Each multiply and accumulate unit 6110-1, 6110-n can multiply data values of the weight matrix with the corresponding adjacent data values in the input feature map and sum the product with the content of the respective accumulator buffers to generate a current data value in the output feature map.

Figure 62:
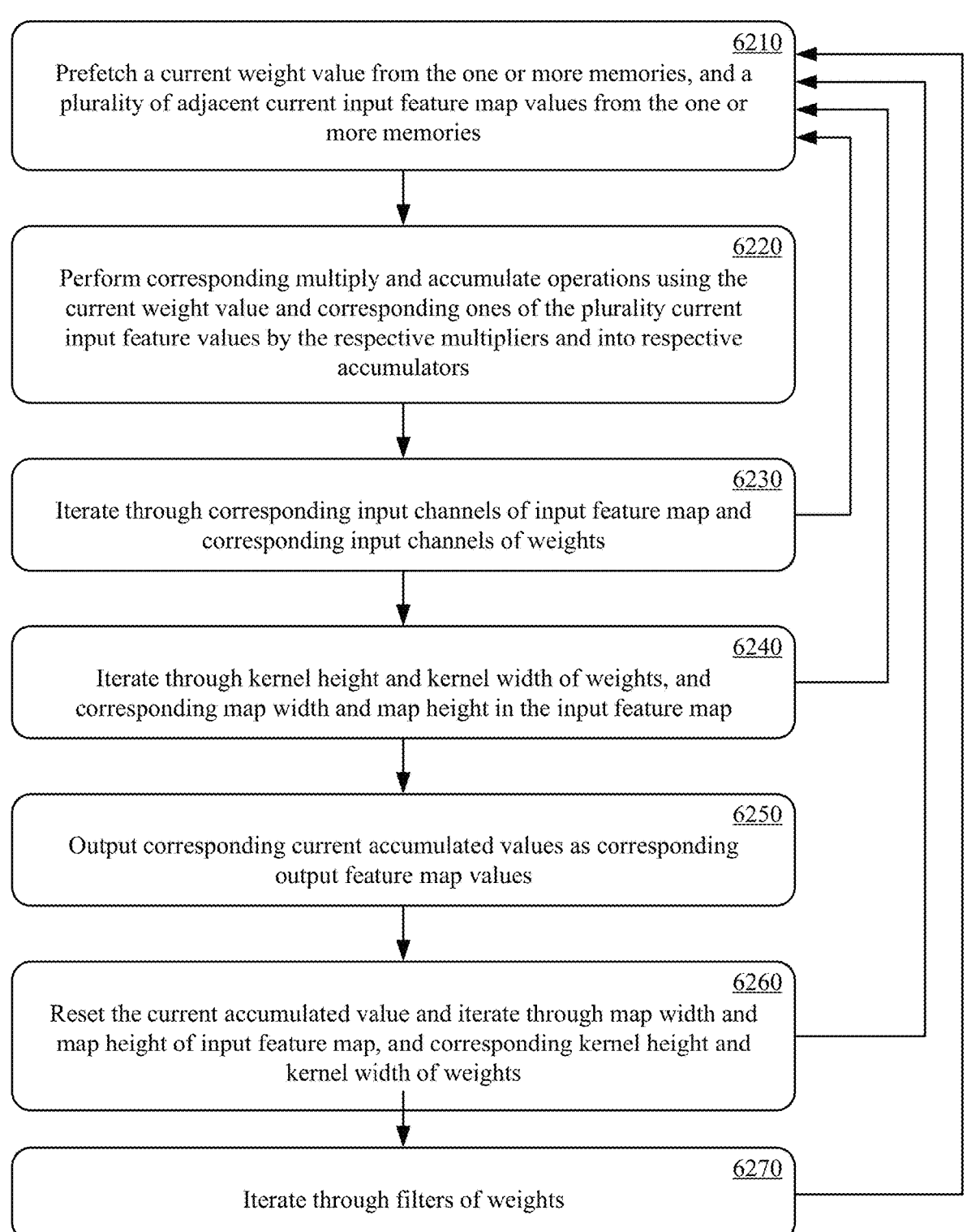
FIG. 62 shows a method of data reuse in multi-accumulator multiply-and-accumulate (MAC) units, in accordance with aspects of the present technology.

Operation of the near memory (M) compute core including a plurality of multi-accumulator multiply-and-accumulate (MAC) units will be further explained with reference to FIG. 62. The operation can begin with pre-fetching a current weight value and a plurality of adjacent input feature map values, at 6210. For example, the weight value can be loaded from a first memory such as static random access memory (SRAM), resistive random access memory (RRAM), magnetic random access memory (MRAM), phase change random access memory (PCRAM), or flash memory, and the plurality of adjacent input feature map values can be loaded from a second memory such as SRAM, RRAM, MRAM, PCRAM or flash memory into respective ones of the multiply and accumulate units during a first cycle (T=0). Prefetching the weight values and feature map values can hide memory access latency. For example, if the weight values are reused four times (e.g., for four cycles) and memory access is performed in two cycles, the next two weight values can be fetched while computations using the current weight value are being performed.

At 6220, corresponding multiply and accumulate operations can be performed using the current weight value and respective ones of the plurality of current input feature values to generate corresponding current accumulated values by the respective multiply and accumulate units during the first cycle (T=0). Therefore, during the first cycle (T=0), the current weight value is reused in the plurality of multiply and accumulate units. For example, a first multiply and accumulate unit can accumulate the product of the weight value (0,0,0) and the input feature map value (0,0,0), and the second multiply and accumulate unit can accumulate the product of the weight value (0,0,0) and the adjacent input feature map value (0,1,0) during the first cycle. The weight value (0,0,0) is loaded once from memory and used by the first multiply and accumulate unit, and also "reused" by the second multiply and accumulate unit without the need to reload the value from memory.

At 6230, the operations at 6210 and 6220 can be iterated through corresponding input channels of the input feature map and corresponding input channels of the weights. At 6240, the operations at 6210-6230 can be iterated through the kernel height and kernel width of the weights, and the corresponding map width and map height in the input feature map. For example, at a second cycle (T=1), a second weight value (0,1,0) can be loaded from memory and third and fourth input feature map values (0,1,0) and (0,2,0) can be loaded from the memory. The product of the current weight value and the current respective input feature map values can be added to the accumulated value from the first cycle.

After iterating through the kernel height and kernel width of the weights and corresponding map width and map height in the input feature map, the corresponding current accumulated values from the respective multiply and accumulate units can be output as corresponding output feature map values, at 6250. For example, at cycle R×C×S, the accumulated value of the first multiply and accumulate unit can be output as a corresponding output feature map value (1,1,0), and the accumulated value in the second multiply and accumulate unit can be output as a corresponding output feature map value (1,2,0) in a first output channel of the output feature map.

At 6260, the current accumulated values in the respective multiply and accumulate units can be reset, and the operations at 6210-6250 can be iterated through the map width and map height of the input feature map and the corresponding kernel height and kernel width of the weights. At 6270, the operations at 6210-6260 can be iterated through the filters of the weights to generate the complete output feature map.

Data reuse in the multiply-and-accumulate (MAC) units advantageously keep the units busy. The increased utilization, increases performance (e.g., frames per second (FPS)), and or reduces energy consumption (e.g., increases frame per second processing per Watt of energy consumed by the compute cores (FPS/W)). The near memory (M) compute cores, in accordance with aspects of the present technology, can advantageously be configured to parallelize computation over output channels. Input feature map data can be shared among output channel computations. The plurality of accumulators for each multiply-and-accumulate (MAC) unit to store extra partial sums, reduces the input feature map bandwidth utilization by reusing a single input feature map over many cycles.

Figures 63A, 63B:
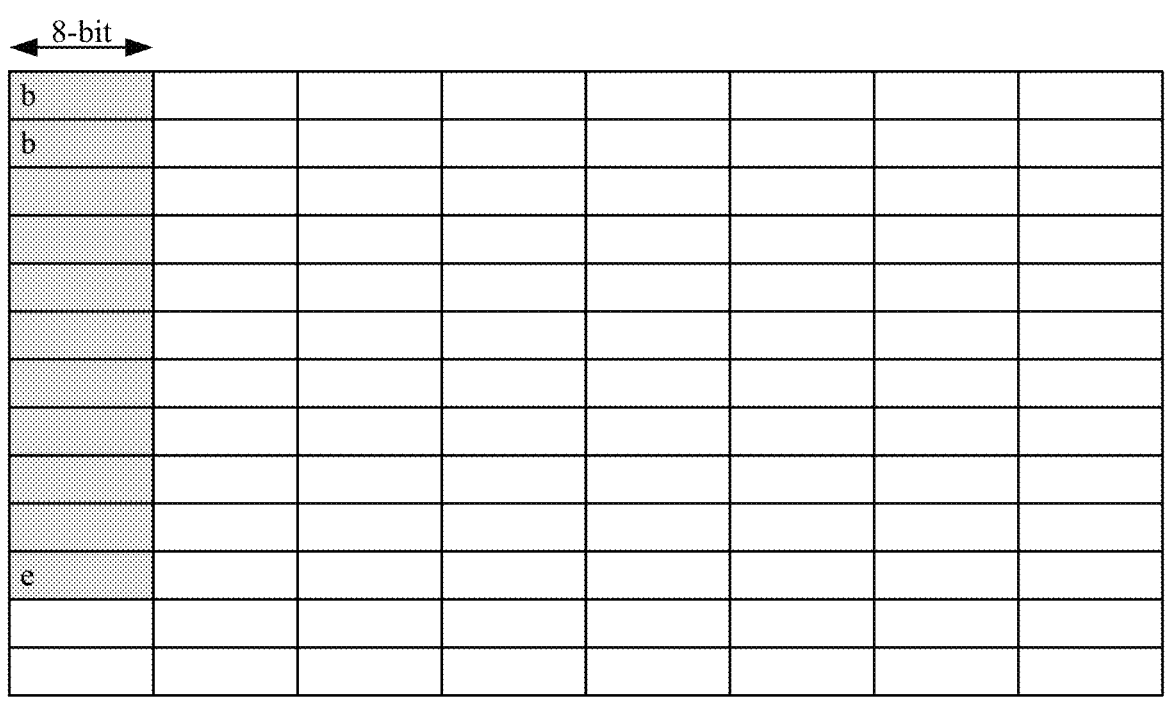
FIGS. 63A-63D illustrate storage of weight values having a first precision, in accordance with aspects of the present technology.
Figures 63C, 63D:
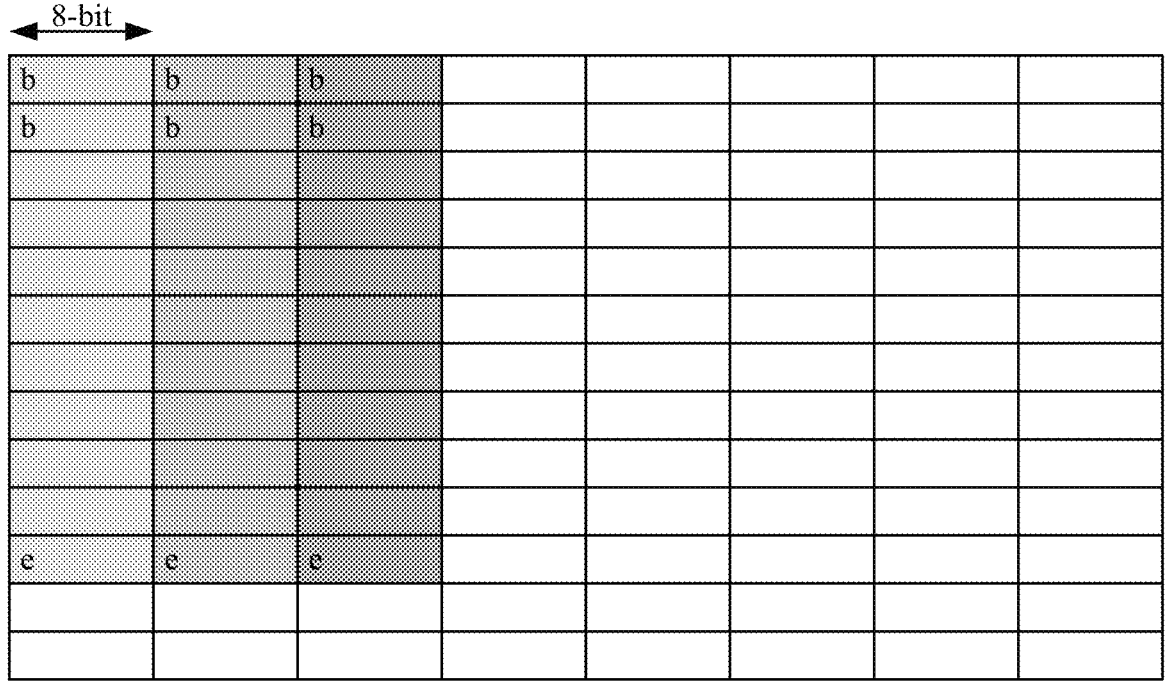
Figures 64C, 64D:
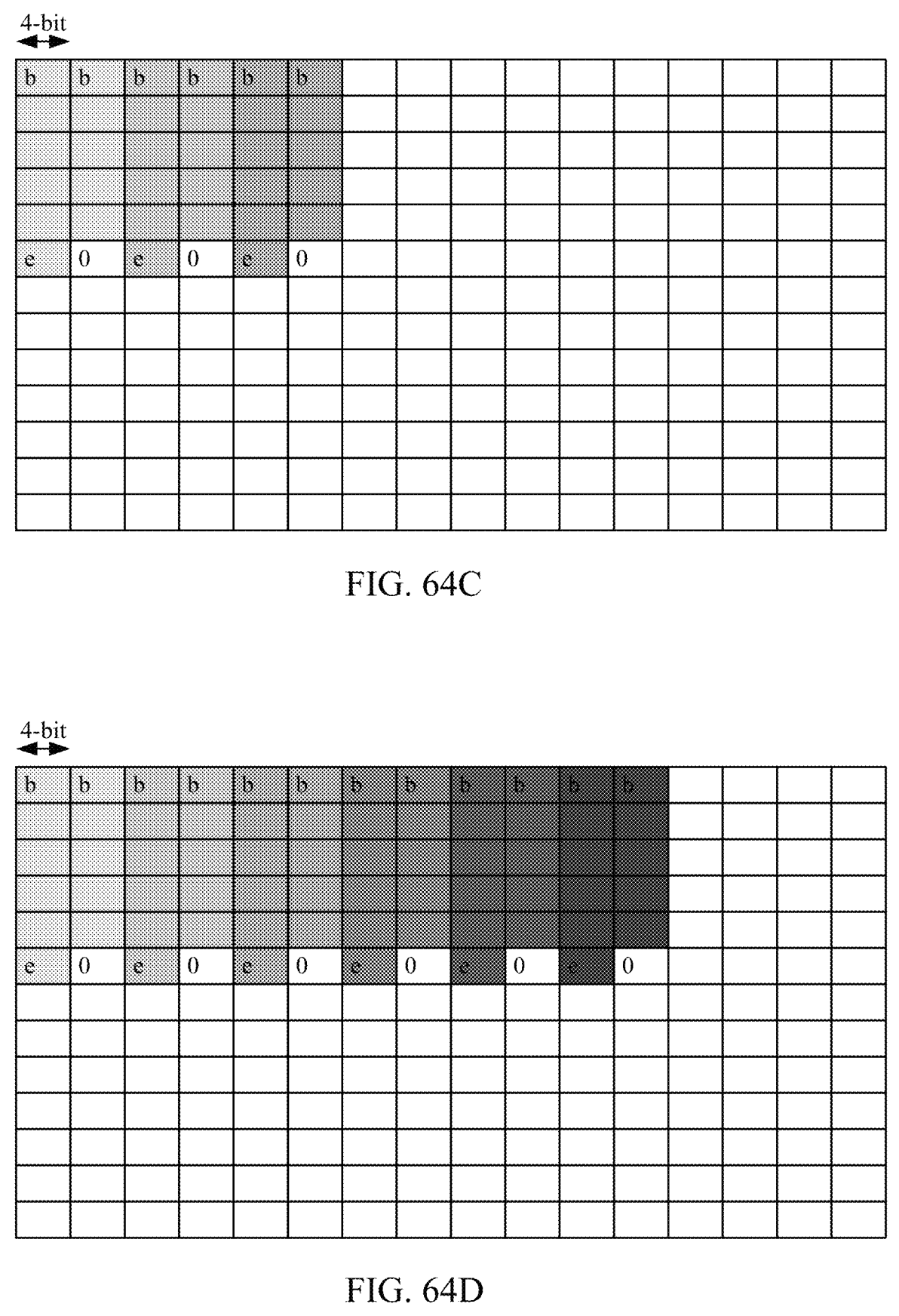

The memory processing unit (MPU), in accordance with aspects of the present technology, can support weights having two or more different precisions. For example, the MPU can support weights having a first precision of 8 bits and a second precision of 4 bits. Referring now to FIGS. 63A-63B, storage of weight values having a first precision, in accordance with aspects of the present technology, is illustrated. The weight values, for example, can be 8-bit values. The weight values having a first precision can be stored including a bias value (b) and a scaling exponent (e). The bias value can comprise two element entries, as described above with reference to FIGS. 48-52 above. Referring now to FIGS. 64A-64D, storage of weight values having a second precision, in accordance with aspects of the present technology, is illustrated. The weight values, for example, can be stored as 4-bit values. Although the above examples describe the support of two different bit precisions, it is appreciated that the number of different bit-precisions supported by the MPU can be a design choice. In principle, the MPU can support in hardware any number of bit-precisions. The precision of the weight values can be decided by a software routine on a layer-by-layer basis for a neural network. The precision of the weight values (e.g., number of bits used to encode the weight values) can reduce the amount of memory needed to store the weight values. Referring now to FIG. 65, a fetch line for a weight having a first precision (e.g., 8-bit length weight values) as compared to a fetch line for a weight having a second precision (e.g., 4-bit length weight values), is illustrated. Halving the precision, for example, can be used to reduce the memory needed for storing the weight valued by 50%. The reduced precision can also decrease the memory access bandwidth utilization because twice as many weight values can be fetched during each cycle for the reduced 4-bit precision, as compared to 8-bit precision weight values. Multi-precision weights can provide for multi-precision weight packing in the memory. The reduced precision, however, does not improve the throughput of the multiply-and-accumulate (MAC) unit operating on the reduced precision weight values. Instead, the MAC unit is typically optimized for full-precision computation cases.

The memory processing unit (MPU), in accordance with aspects of the present technology, can be further configured to extend use of multi-precision weights. In one implementation, higher precision weights can be implemented by combining two 8-bit element entries in software to provide 16-bit values. For example, a first 8-bit element entry representing the most-significant-bits (MSB), a second 8-bit element entry representing the least-significant-bits (LSB), along with the bias value (b) and the scaling exponent (e), can be combined in software to implement 16-bit weight values. Similarly, even higher precision weights can be implemented by combining three 8-bit element entries in software to provide 24-bit values. In another example, through application of a software layer, it can be possible to multiply the hardware' precision. For example, a 16-bit precision can be obtained by dividing a neural network layer into two separate layers, each with 8-bit precision. Each of the layers can have its own bias and exponent. Having a unique exponent facilitates the addition of the outputs from two sublayers.

Memory processing architectures, in accordance with aspects of the present technology, advantageously enable the design selection of the number of processing regions, the number of groups of compute cores, the number of compute cores, the number of compute clusters, the types of compute cores, the organization of memories, the types of memories, the size of the memories, the number of memory regions, the number of memory blocks and the like. In addition, the memory processing architectures advantageously enable the design selection of the number of multiply-and-accumulate (MAC), the number of physical channels, the number of accumulators and the like.

Figure 66:
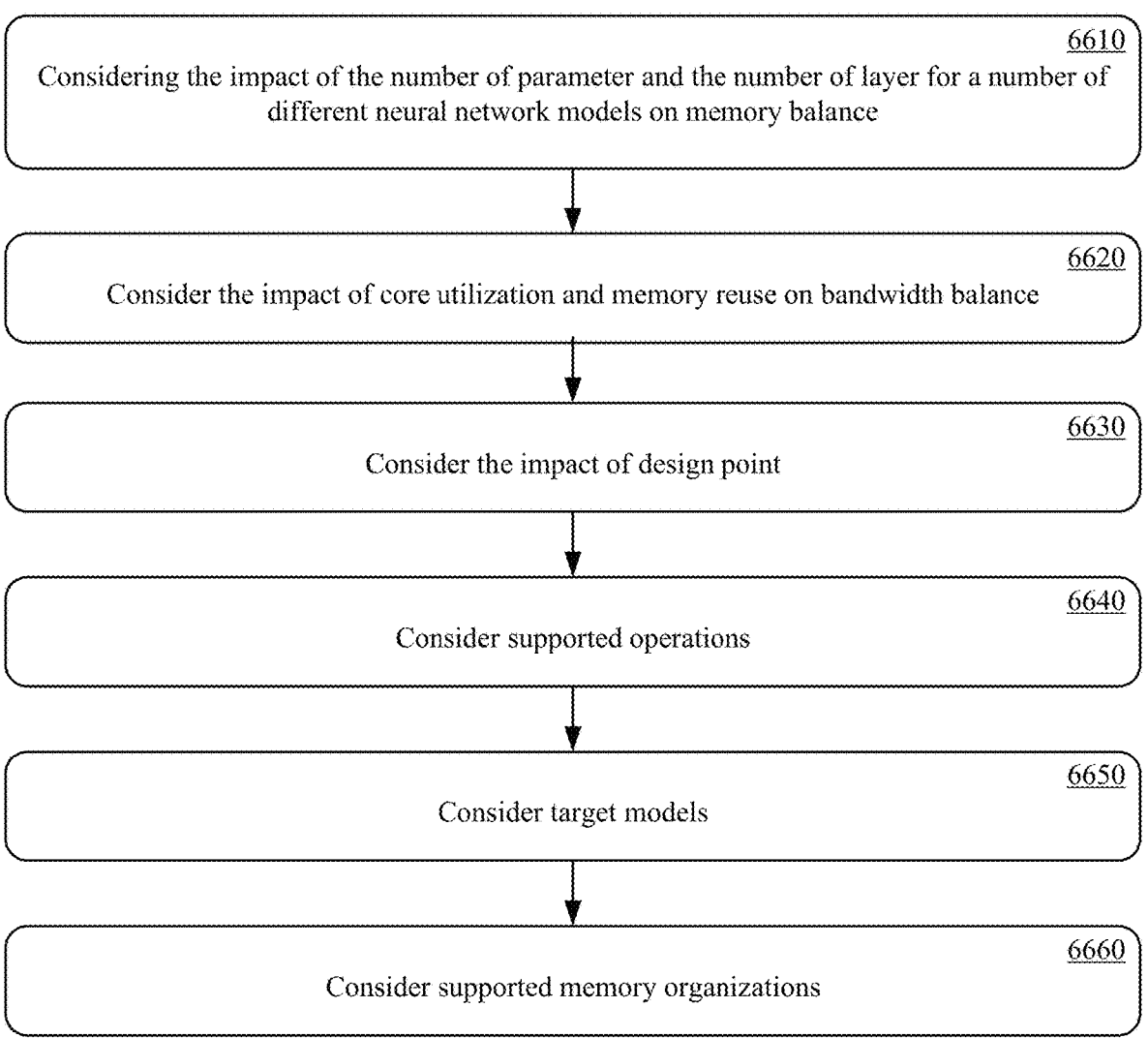
FIG. 66 shows a memory processing unit (MPU) design process, in accordance with aspects of the present technology.

Referring now to FIG. 66, a memory processing unit (MPU) design process, in accordance with aspects of the present technology, is shown. The design process can include memory balancing, bandwidth balancing, design point, consideration of supported operations, consideration of target models, and memory organization.

Figure 67:
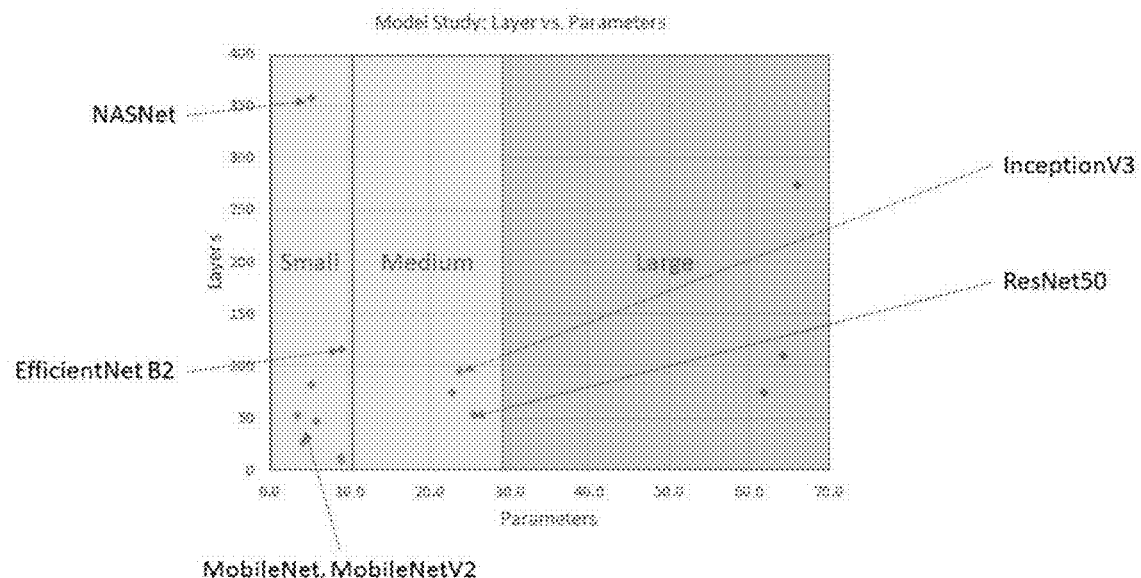
FIG. 67 illustrates memory size as a function of layers versus parameters for a number of neural network models, in accordance with aspects of the present technology.
Figure 68:
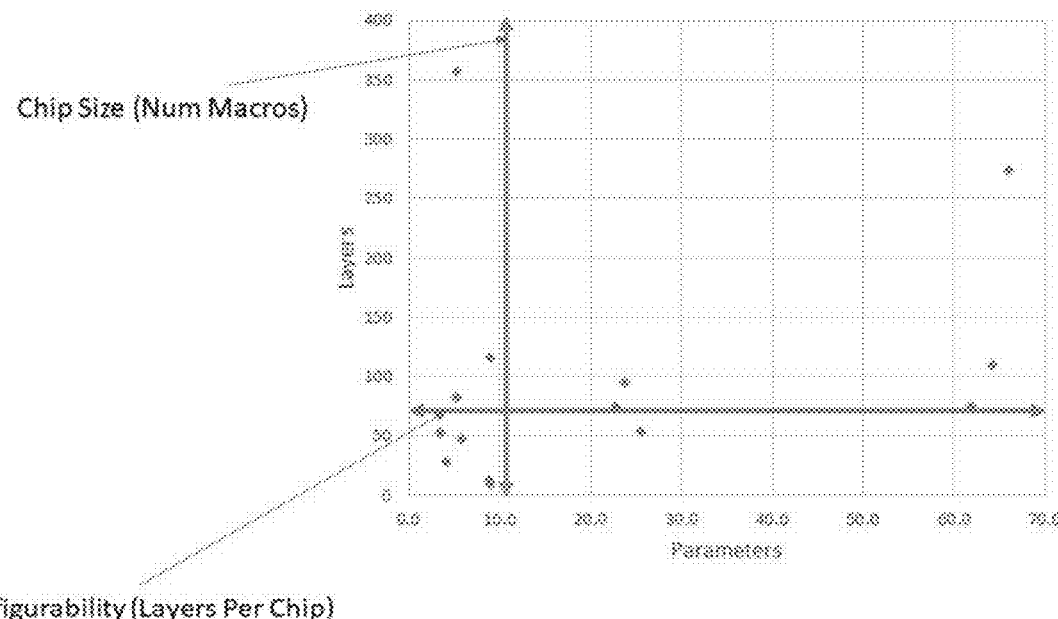
FIG. 68 illustrates a relationship between chip size and configurability, in accordance with aspects of the present technology.
Figure 69:
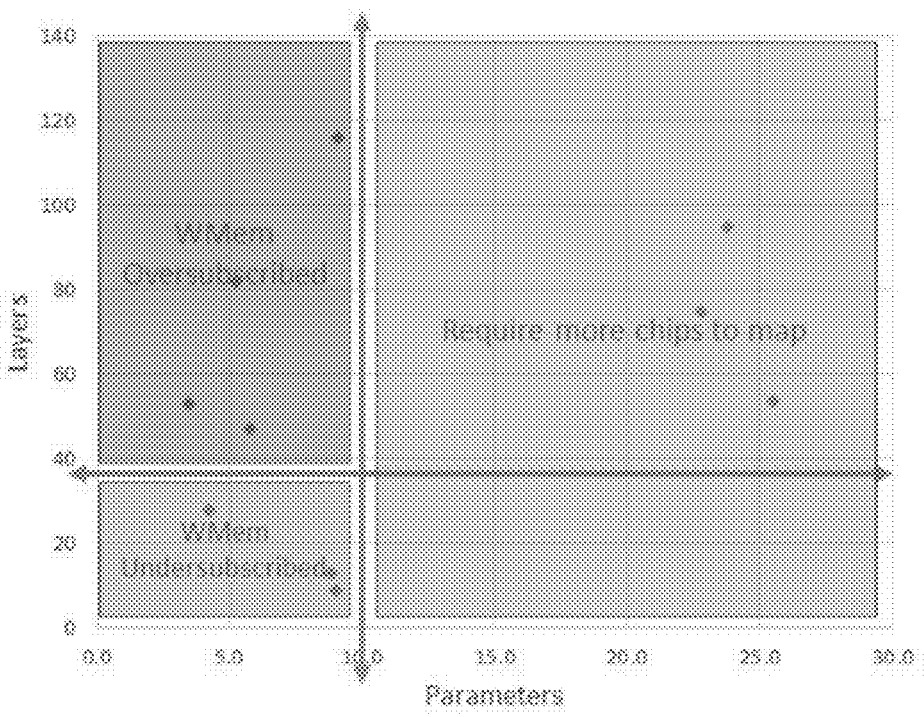
FIG. 69 illustrates a relationship between memory utilization and activity factor for multiply-and-accumulate (MAC) units, in accordance with aspects of the present technology.
Figure 70:
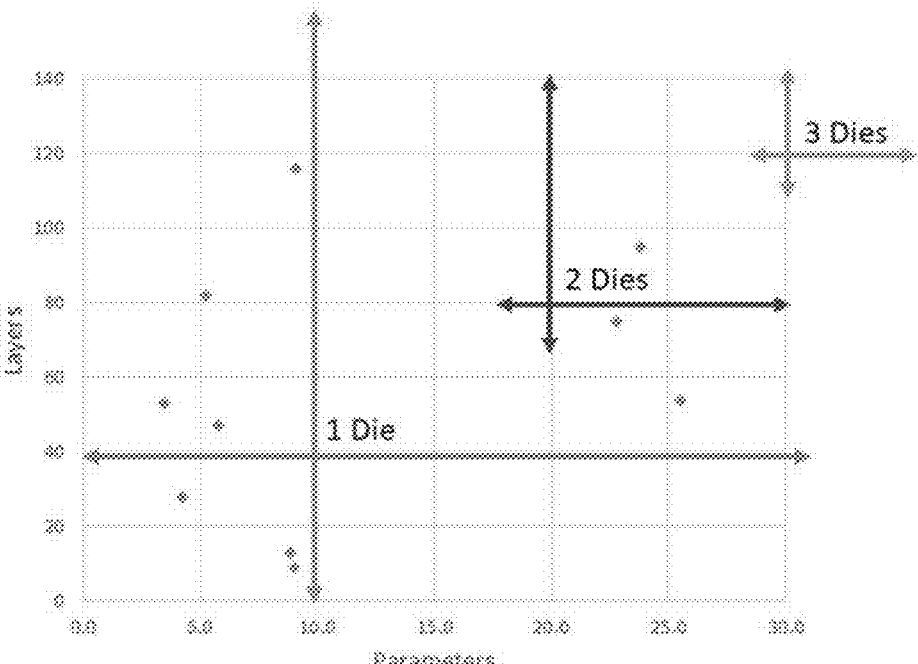
FIG. 70 illustrates a relationship between the number of memory processing unit (MPU) dies with regard to chip size and configurability, in accordance with aspects of the present technology.

At 6610, memory balancing can consider the impact on memory based on the number of parameters and the number of layers for a number of different neural-network models. In an exemplary implementation, the neural network models can include MobileNet, MobileNetV2, EfficientNet B2, NASNet, InceptionV3, ResNet 50, VGG, Xception, DenseNet, ConvNEXT, BiT-L, NoisyStudent EfficientNet, Meta Pseudo Labels and other similar neural networks, as illustrated in FIG. 67. The consideration of the number of parameters and the number of layers on the impact on memory can indicate a chip size (e.g., number of macros)

and configurability (e.g., layers per chip), as illustrated in FIG. 68. If there are too many layers the memory bandwidth can be stresses to 100% utilization, and the multiply-and-accumulate (MAC) of the compute cores can have an activity factor of less than 100% because the MACs cannot be fed data fast enough, as illustrated in FIG. 69. If there are not enough layers the memory bandwidth may not be fully utilized and the activity factor of the MACs can substantially approach a factor of 100%. Memory balancing can be improved by adding memory processing unit (MPU) dies as the number of parameter and number of layers increase, as illustrated in FIG. 70. Considering the impact of the number of parameter and the number of layer for a number of different neural network models on memory balance can include configuring one or more of the plurality of memory regions of the first memory, memory bocks of the memory regions, the plurality of processing regions, the plurality of core groups, the compute cores, and the dataflow between adjacent compute groups in respective ones of the plurality of processing regions through one or more corresponding memory blocks of the corresponding memory regions including determining the number of layers based on utilization of the second memory storing weight values. Considering the impact of core utilization and memory reuse on bandwidth balance can also include configuring one or more of the plurality of memory regions of the first memory, the memory bocks of the memory regions, the plurality of processing regions, the plurality of core groups, the compute cores, and the dataflow between adjacent compute groups in respective ones of the plurality of processing regions through one or more corresponding memory blocks of the corresponding memory regions, including determining a number of dies for implementing the MPU based on the impact of the number of parameters and the number of layers. Considering the impact of core utilization and memory reuse on bandwidth balance can also include configuring one or more of the plurality of memory regions of the first memory, the memory bocks of the memory regions, the plurality of processing regions, the plurality of core groups, the compute cores, and the dataflow between adjacent compute groups in respective ones of the plurality of processing regions through one or more corresponding memory blocks of the corresponding memory regions, including determining a number of physical channels of the first memory based on a width of the first memory, a granularity of the one or more compute cores, and the number of core per core groups. Considering the impact of core utilization and memory reuse on bandwidth balance can also include configuring one or more of the plurality of memory regions of the first memory, the memory bocks of the memory regions, the plurality of processing regions, the plurality of core groups, the compute cores, and the dataflow between adjacent compute groups in respective ones of the plurality of processing regions through one or more corresponding memory blocks of the corresponding memory regions, including determining weight data sharing between cores, feature map data reuse, amount of the second memory, and number of cores per core groups.

Figure 71:
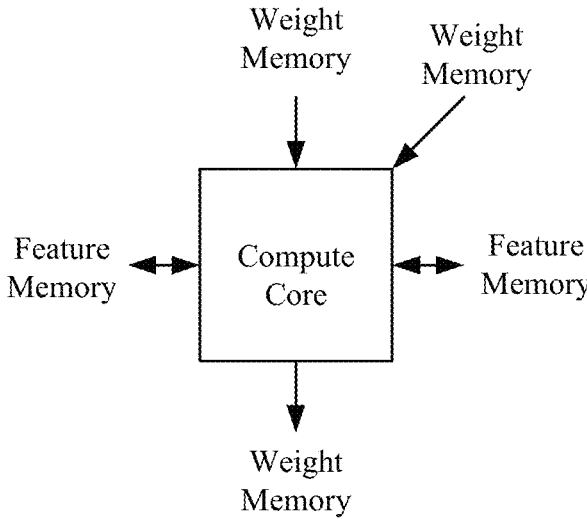
FIG. 71 illustrates memory accesses for a compute core, in accordance with aspects of the present technology.
Figure 72:
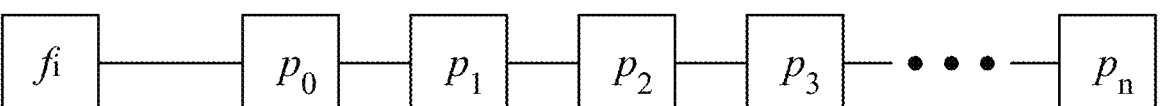
FIG. 72 illustrates a relationship between utilization of feature map memory and physical channels, in accordance with aspects of the present technology.
Figure 73:
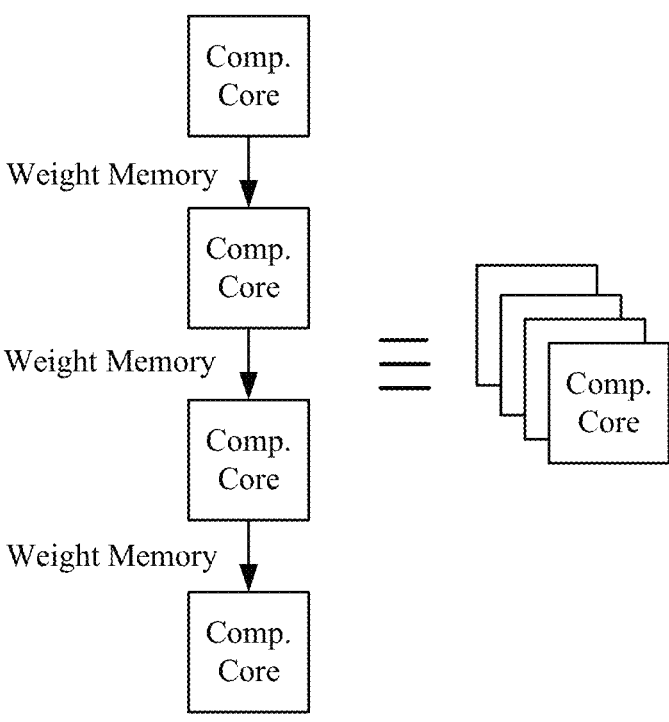
FIG. 73 shows weight memory data sharing between cores using pixel workers, in accordance with aspects of the present technology.

At 6620, bandwidth balancing can consider the impact of core utilization and memory reuse. A design goal can be to allow as much as 100% utilization of the core time. The core time utilization depends upon several factors including good mapping. However, with reference to FIG. 71, high utilization is not possible without enough feature map memory and weight memory. Typically, a single feature memory entry can be shared among the core physical channels. More physical channels per core allows more feature map data reuse, as illustrated in FIG. 72. In turn, the increased data reuse reduces feature map fetches and reduces bandwidth utilization. However, more physical channels lead to a wider weight memory bus, which increases the challenge of the weight memory design. More physical channels also lead to finer grain cores, that results in less optimized mapping. More physical channels can also lead to less cores per group, and therefore less weigh memory reuse. The weight memory data can be shared between cores using pixel workers, as illustrated in FIG. 73. The weight memory reuse can reduce the weight memory bandwidth utilization significantly. Typically, more cores per group allows more weight memory reuse. However, the more cores per group lead to slimmer cores, or less feature memory reuse and higher control overhead. More cores per group can also lead to less core groups, smaller number of blocks and smaller feature memory bandwidth utilization. Considering the impact of core utilization and memory reuse on bandwidth balance can include configuring one or more of the plurality of memory regions of the first memory, memory bocks of the memory regions, the plurality of processing regions, the plurality of core groups, the compute cores, and the dataflow between adjacent compute groups in respective ones of the plurality of processing regions through one or more corresponding memory blocks of the corresponding memory regions, including determining the number of layers based on utilization of the second memory storing weight values.

At 6630, the impact of design point can be considered. For the memory processing unit (MPU), the number of computer towers, communication towers, core groups, feature memory blocks, inter-layer-communication (ILC) unit, input ports, output ports, total weight memory, total feature memory and the like can be considered. For the core group, the number of near-memory (M) cores, the number of arithmetic (A) cores, the weight memory, the weight memory data bus width, the weight memory address size, the number of weight memory arbiters, the number of feature memory read ports, the number of feature memory write ports, the feature memory address size per port, the number of feature map arbiters, the number of ILC ports, the number of ILC arbiters, and the like can be considered. For the feature map memory, the memory size, the number of read ports, the number of parallel accesses, the banks, the address domain, the address granularity, the address bit length the data width, the expected latency, the number of ports, the number of parallel access and the like can be considered. For the weight memory, the memory size, the total entries, the number of read ports, the number of write ports, the number of parallel access, the banks, the address domain, the address granularity, the address/port bit width, the data/ort bit width, the expected latency, and the like can be considered. For the near-memory (M) cores, the number of MAC units, the number of accumulators of the MAC units, the number of physical channels, the number of weight memory buffer, the number of feature map memory buffers, the number of weight memory ports, the number of feature map memory ports, the number of feature map writeback ports, the number of TLC ports, the MAC sequence, the zero skipping, the group B-float encoding, and the like can be considered. For the arithmetic (A) cores, the number of ALUs, the number of physical channels, the number of output buffers, the number of feature map memory buffers, the number of feature map memory fetch ports, the number of ILC ports and the like can be considered. For the inter-layer-communication (TLC) unit, the number of ports, the number of parallel access, the maximum layers per ILC the index bit width, the index domain, the number of bits of the counters, the access, and the like can be considered. Considering the impact of design points can include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining a number of processing regions, the number of memory regions of the first memory, the number of core groups per processing regions, the number of memory blocks per memory regions, the number of inter-layer communication units per memory regions, the number of input ports coupled to a first predetermined first memory region, the number of output ports coupled to a second predetermined first memory region, the total memory size of the first memory and a total memory size of the second memory. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions including determining one or more parameters of the core groups including a number of near memory cores, a number of arithmetic cores, the size of the second memory, the data bus size of the second memory, the address size of the second memory, the number of arbiters of the second memory, the number of read ports of the memory regions of the first memory, the number of write ports of the memory regions of the first memory, the data size per port of the memory regions of the first memory, the address size per port of the memory regions of the first memory, the number of arbiters of the first memory, the number of ports of the inter-layer communication unit, and the number of arbiters of the inter-layer communication unit. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining one or more parameters of the memory regions of the first memory including a size of the memory regions, the number of read ports of the memory regions of the first memory, the number of parallel accesses of the memory regions of the first memory, the number of banks of the memory regions of the first memory, the address domain of the memory regions of the first memory, the address granularity of the memory regions of the first memory, the address width of the memory regions of the first memory, the data width of the memory regions of the first memory, and the latency of the memory regions of the first memory. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining one or more parameters of the memory regions of the second memory including the size of the second memory, the number of entries of the second memory, the number of read ports of the second memory, the number of write ports of the second memory, the number of parallel access ports, the number of banks of the second memory, the address domain of the second memory, the address granularity of the second memory, the address width of the ports of the second memory, the data width of the ports of the second memory, and the latency of the second memory. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining one or more parameters of the near memory cores including the number of multiply accumulation units, the number of accumulators, the number of physical channels, the second memory buffer size, the first memory buffer size, the number of ports for the second memory, the number of fetch ports for the first memory, the number of writeback ports for the first memory, the number of inter-layer communication ports, the multiply accumulator sequence, the zero skipping, and the group B-float encoding size. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining one or more parameters of the arithmetic cores, including determining the number of arithmetic logic units, the number of physical channels, the first memory output buffer entry size, the first memory input buffer entry size, the number of fetch ports for the first memory, and the number of inter-layer communication ports. Considering the impact of design points can also include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining one or more parameters of the inter-layer communication units including the number of ports, the number of parallel accesses, the number of layers per inter-layer-communication units, and the bit size of the index, the index domain, the counter bit width, and the access type.

At 6640, the support operations can be considered. The supported operation for 2D convolutions can include convolution, depth-wise convolution, separable convolution, pointwise convolution, MP convolution, deconvolution, and the like. For fully connected, dense operations and the like can be supported. Supported scaling operations can include max pooling, average pooling, global average pooling, up-sampling, zero-padding, and the like. For branch and merge, supported operations can include, add, subtract, multiply, maximum, minimum, concatenate, and the like. For activation, supported operations can include linear, ReLU, Leaky ReLU, P-ReLU, Threshold ReLU, ReLU-Max, ReLu-6, sigmoid/logistic, Hyperbolic Tangent, Mish, Swish, and the like. Other supported operations can include flatten, reshape, batch normalization, rescale, constant add, constant multiply, clip and the like. Considering support operations can include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining supported two-dimensional (2D) convolution operations, supported fully connected convolution operations, supported scaling operations, supported branch and merge operations, supported activation operations, and flattening, reshape, batch normalization, rescaling, constate add, constant multiply, and clip operations.

At 6650, target models can be considered. Target models can include MobileNet including versions 1, 2 and 3, ResNet including 34, 50 and 101, SSD, Tiny Yolo including versions 1, 3, and 7, Yolo including versions 3, 4, and 5, OpenPose, Xception, Inception, EfficientNet and the like. Considering target models can include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining applicability of MobileNet models, ResNet Models, SSD model, Tiny YOLO models, YOLO models, OpenPose model, Xception model, Inception model, and EfficientNet model.

At 6660, supported memory organizations can also be considered. For feature memories, each feature map entry can be made of one exponent and 8 mantissas. The exponent can be 8-bits and the mantissa can be 9-bits. A successive number of entries can have the same exponent depending on the group-B float size. For the weight memory, the precision can be 8 bits, 4 bits or any other bit-precision. Considering supported memory organizations can include configuring one or more of the plurality of memory regions of the first memory, the memory bocks of the memory regions, the plurality of processing regions, the plurality of core groups, the compute cores, and dataflow between adjacent compute groups in respective ones of the plurality of processing regions through one or more corresponding memory blocks of the corresponding memory regions, including determining feature map value encoding, feature map value packing in the first memory, weight value encoding and weigh value packing in the second memory.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method of designing a memory processing unit (MPU), wherein the MPU includes:

a first memory including a plurality of memory regions, wherein one or more of the plurality of memory regions are configured in a corresponding pluralities of memory blocks; and a plurality of processing regions, wherein each processing region of the plurality of processing regions is interleaved between two adjacent memory regions of the plurality of memory regions of the first memory, wherein the processing regions include a plurality of core groups, wherein the core groups include one or more compute cores, and wherein one or more of the plurality of core groups of a respective one of the plurality of processing regions are coupled between adjacent ones of the memory blocks of adjacent ones of the plurality of memory regions of the first memory;

the method comprising configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of corresponding memory regions, based on one or more of an impact of a number of parameters and a number of layers of one or more neural network models on memory balance, core utilization and memory reuse on bandwidth balance, design points, supported operations, target models, and supported memory organizations.

2. The method according to claim 1, wherein:

the MPU further includes a second memory coupled to the plurality of processing regions configured to store weight values; and configuring the second memory, and the dataflow between the second memory and compute cores in respective ones of the plurality of processing regions based on one or more of the impact of the number of parameters and the number of layers of one or more neural network models on memory balance, includes determining the number of layers based on utilization of the second memory storing weight values.

3. The method according to claim 2, wherein configuring one or more of the plurality of memory regions of the first memory, the memory blocks of the memory regions, the plurality of processing regions, the plurality of core groups, the compute cores, and the dataflow between adjacent compute cores in respective ones of the plurality of processing regions through one or more corresponding memory blocks of the corresponding memory regions based on one or more of the impact of the number of parameters and the number of layers of one or more neural network models on memory balance, includes determining a number of dies for implementing the MPU based on the impact of the number of parameters and the number of layers.

4. The method according to claim 2, wherein configuring one or more of the plurality of memory regions of the first memory, the memory blocks of the memory regions, the plurality of processing regions, the plurality of core groups, the compute cores, and the dataflow between adjacent compute cores in respective ones of the plurality of processing regions through one or more corresponding memory blocks of the corresponding memory regions based on one or more of the impact of the number of parameters and the number of layers of one or more neural network models on memory balance, includes determining a number of physical channels of the first memory based on a width of the first memory, a granularity of the one or more compute cores, and the number of cores per core groups.

5. The method according to claim 2, wherein configuring one or more of the plurality of memory regions of the first memory, the memory blocks of the memory regions, the plurality of processing regions, the plurality of core groups, the compute cores, and the dataflow between adjacent compute cores in respective ones of the plurality of processing regions through one or more corresponding memory blocks of the corresponding memory regions based on one or more of the impact of core utilization and memory reuse on bandwidth balance, includes determining weight data sharing between cores, feature map data reuse, amount of the second memory and number of cores per core groups.

6. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining a number of processing regions, a number of memory regions of the first memory, a number of core groups per processing regions, the number of memory blocks per memory regions, a number of inter-layer communication units per memory regions, a number of input ports coupled to a first predetermined first memory region, a number of output ports coupled to a second predetermined first memory region, a total memory size of the first memory and a total memory size of the second memory.

7. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the core groups including a number of near memory cores, a number of arithmetic cores, a size of the second memory, a data bus size of the second memory, an address size of the second memory, a number of arbiters of the second memory, a number of read ports of the memory regions of the first memory, a number of write ports of the memory regions of the first memory, a data size per port of the memory regions of the first memory, an address size per port of the memory regions of the first memory, a number of arbiters of the first memory, a number of ports of the inter-layer communication unit, and a number of arbiters of the inter-layer communication unit.

8. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the memory regions of the first memory including a size of the memory regions, a number of read ports of the memory regions of the first memory, a number of parallel accesses of the memory regions of the first memory, a number of banks of the memory regions of the first memory, an address domain of the memory regions of the first memory, an address granularity of the memory regions of the first memory, an address width of the memory regions of the first memory, a data width of the memory regions of the first memory, and a latency of the memory regions of the first memory.

9. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the memory regions of the second memory including a size of the second memory, a number of entries of the second memory, a number of read ports of the second memory, a number of write ports of the second memory, a number of parallel access ports, a number of banks of the second memory, an address domain of the second memory, an address granularity of the second memory, an address width of the ports of the second memory, a data width of the ports of the second memory, and a latency of the second memory.

10. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the near memory cores including a number of multiply accumulation units, a number of accumulators, a number of physical channels, a second memory buffer size, a first memory buffer size, a number of ports for the second memory, a number of fetch ports for the first memory, a number of writeback ports for the first memory, a number of inter-layer communication ports, a multiply accumulator sequence, a zero skipping, and a group B-float encoding size.

11. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the arithmetic cores, including determining a number of arithmetic logic units, a number of physical channels, a first memory output buffer entry size, a first memory input buffer entry size, a number of fetch ports for the first memory, and a number of inter-layer communication ports.

12. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on design points, includes determining one or more parameters of the inter-layer communication units including a number of port, a number of parallel accesses, a number of layers per inter-layer-communication unit, and bit size of an index, an index domain, a counter bit width, and an access type.

13. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on supported operations, includes determining supported two-dimensional (2D) convolution operations, supported fully connected convolution operations, supported scaling operations, supported branch and merge operations, supported activation operations, and flattening, reshape, batch normalization, rescaling, constate add, constant multiply and clip operations.

14. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on one or more of target models, includes determining MobileNet models, ResNet Models, SSD model, Tiny YOLO models, YOLO models, OpenPose model, Xception model, Inception model, and EfficientNet model.

15. The method according to claim 2, wherein configuring one or more of the plurality of memory regions of the first memory, the memory blocks of the memory regions, the plurality of processing regions, the plurality of core groups, the compute cores, and dataflow between adjacent compute cores in respective ones of the plurality of processing regions through one or more corresponding memory blocks of the corresponding memory regions based on memory organizations, includes determining feature map value encoding, feature map value packing in the first memory, weight value encoding and weigh value packing in the second memory.

16. The MPU of claim 1, wherein a given core group of a respective processing region is coupled to a set of memory blocks that are proximate to the given core group, while not coupled to memory blocks in the adjacent memory regions that are distal from the given core group.

17. The MPU of claim 1, wherein the plurality of core groups of respective ones of the plurality of processing regions are coupled between adjacent ones of the plurality of memory regions of the first memory.

18. The MPU of claim 1, wherein each of the plurality of memory blocks are arranged in a plurality of columns and rows.

19. The MPU of claim 18, wherein each of the plurality of memory regions are a first plurality of blocks wide and a second plurality of blocks long.

20. The MPU of claim 1, wherein compute functions performed by the one or more compute cores and dataflow between the compute cores and the plurality of memory blocks are mapped based on adjacency so that dataflow of shared data is synchronized.

* * * * *